(12) United States Patent
Juarez et al.

(10) Patent No.: US 7,908,208 B2
(45) Date of Patent: Mar. 15, 2011

(54) PRIVATE ENTITY PROFILE NETWORK

(75) Inventors: Richard A. Juarez, Pleasanton, CA (US); Zachary J. J. Brown, North Vancouver (CA)

(73) Assignee: AlphaCap Ventures LLC, Pleasanton, CA (US)

( * ) Notice: Subject to any disclaimer, the term of this patent is extended or adjusted under 35 U.S.C. 154(b) by 1701 days.

(21) Appl. No.: 10/870,732

(22) Filed: Jun. 17, 2004

(65) Prior Publication Data
US 2005/0131830 A1    Jun. 16, 2005

Related U.S. Application Data

(60) Provisional application No. 60/528,749, filed on Dec. 10, 2003.

(51) Int. Cl.
G06Q 40/00    (2006.01)

(52) U.S. Cl. .......................... 705/38; 705/35

(58) Field of Classification Search .................. None
See application file for complete search history.

(56) References Cited

U.S. PATENT DOCUMENTS

| | | | |
|---|---|---|---|
| 5,978,799 A | 11/1999 | Hirsch | |
| 6,151,584 A * | 11/2000 | Papierniak et al. | 705/10 |
| 6,662,192 B1 * | 12/2003 | Rebane | 707/104.1 |
| 6,691,135 B2 | 2/2004 | Pickett et al. | |
| 6,871,220 B1 | 3/2005 | Rajan et al. | |
| 7,334,013 B1 * | 2/2008 | Calinov et al. | 709/201 |
| 2001/0047282 A1 | 11/2001 | Raveis | |
| 2002/0152151 A1 * | 10/2002 | Baughman et al. | 705/36 |
| 2003/0088520 A1 | 5/2003 | Bohrer et al. | |
| 2003/0131235 A1 * | 7/2003 | Wheeler et al. | 713/168 |
| 2003/0145018 A1 * | 7/2003 | Hitchcock et al. | 707/104.1 |
| 2003/0182260 A1 | 9/2003 | Pickett et al. | |
| 2003/0191703 A1 * | 10/2003 | Chen et al. | 705/36 |
| 2003/0216964 A1 * | 11/2003 | MacLean et al. | 705/14 |
| 2003/0220948 A1 | 11/2003 | Green et al. | |
| 2004/0006532 A1 | 1/2004 | Lawrence et al. | |
| 2004/0098285 A1 * | 5/2004 | Breslin et al. | 705/1 |
| 2004/0098729 A1 | 5/2004 | Husain et al. | |
| 2005/0015320 A1 * | 1/2005 | Hayenhjelm et al. | 705/36 |
| 2005/0066037 A1 | 3/2005 | Song et al. | |
| 2005/0144135 A1 | 6/2005 | Juarez et al. | |
| 2005/0171886 A1 * | 8/2005 | Squyres | 705/36 |
| 2007/0288339 A1 * | 12/2007 | Squyres | 705/36 R |

OTHER PUBLICATIONS

Venturelist Inc. Launches Affiliate Marketing Program With Commission Junction Business Editors. Business Wire. New York: Nov. 8, 2000. total pp. =3.*

Venture capital and the art of raising it, Steve Sole, NZ Business; Apr. 1999; 13, 3; ABI/INFORM Trade & Industry, total pp. =10.*

(Continued)

*Primary Examiner* — Alexander Kalinowski
*Assistant Examiner* — Gregory Johnson
(74) *Attorney, Agent, or Firm* — Eppa James Hite; David Lewis

(57) ABSTRACT

In private equity and debt funding operations, resource providers define electronic data collection templates to be filled in by prospective resource consumers to form semi-homogeneous profiles. Providers and/or consumers can assign themselves and/or selected third parties various individualized levels of permissions to access and to perform activities on the profiles. Providers can organize profiles into portfolios to further manage the data. All accesses and activities, such as changes to the data, are tracked and recorded in logs useful for audit purposes.

41 Claims, 58 Drawing Sheets

OTHER PUBLICATIONS

Attracting the private buyer to your equity Ball, Matthew, Corporate Finance; Feb. 1995; 123; ABI/INFORM Global, total pp. =5.*

Software plugs VCs into their investments Dan Gallagher. East Bay Business Times. Pleasanton: Aug. 8, 2003. vol. 5, Iss. 48; total pp. =2.*

AlphaCap Launches Merchant Banking Platform for Wescon/IEEE; PR Newswire, New York; Jul. 21, 2003; 2-pages.*

"Hedge Fund Experts Call for Improved Disclosure by Managers," Jul. 11, 2002, InvestorForce Securities Inc., Wayne PA.

Dan Gallagher, "Software plugs VCs into their investments," East Bay Business Times, Aug. 8, 2003, American City Business Journals Inc.

Ann Grimes, "Venture Firms Feel Overexposed," The Wall Street Journal, Oct. 7, 2003, Dow Jones & Company, Inc.

Ann Grimes, "Private Equity Seeks Clairty—Validation for AlphaCap," The Wall Street Journal, Jan. 4, 2004, p. C5, Dow Jones & Company, Inc.

"PIEGG Reporting and Performance Measurement Survey Results," Feb. 1, 2004, pp. 0-22, Private Equity Industry Guidelines Group.

Ann Grimes, "Venture Capitalists Scramble To Keep Their Numbers Secret," The Wall Street Journal, May 11, 2004, p. A1, Dow Jones & Company, Inc.

Affidavit of Richard Juarez, filed on Jun. 8, 2010.

Affidavit of Donald Reinke, filed on Jun. 8, 2010.

* cited by examiner

FIG. 1 Prior Art
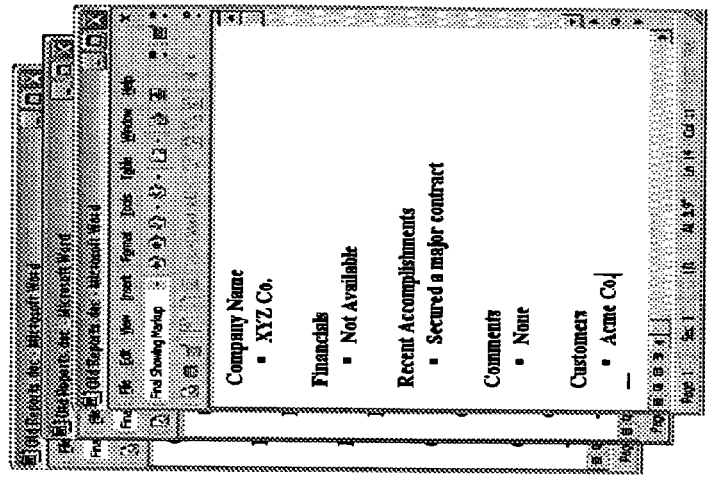
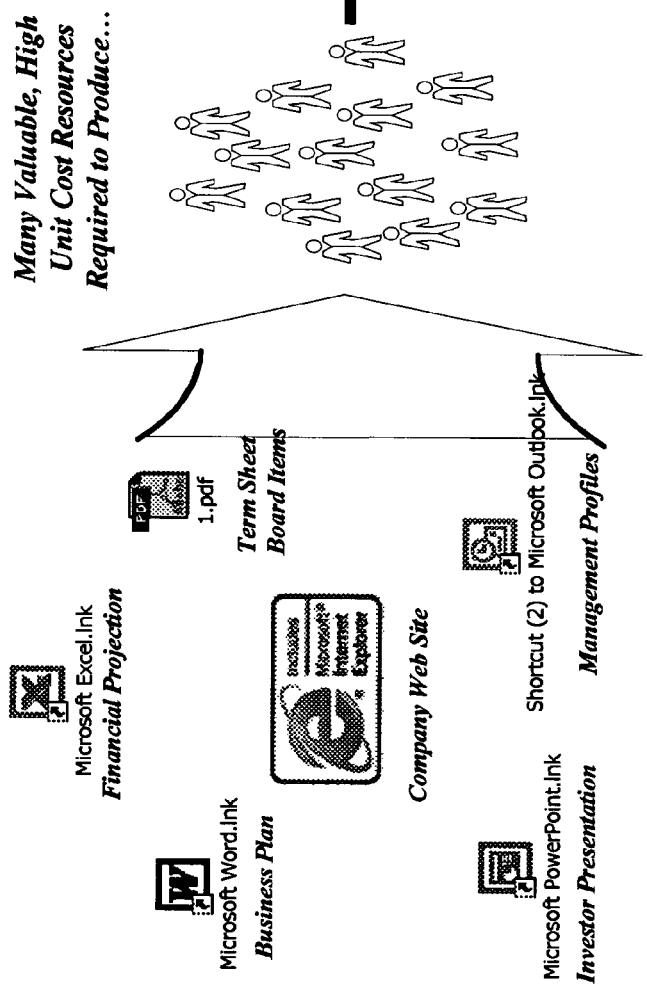

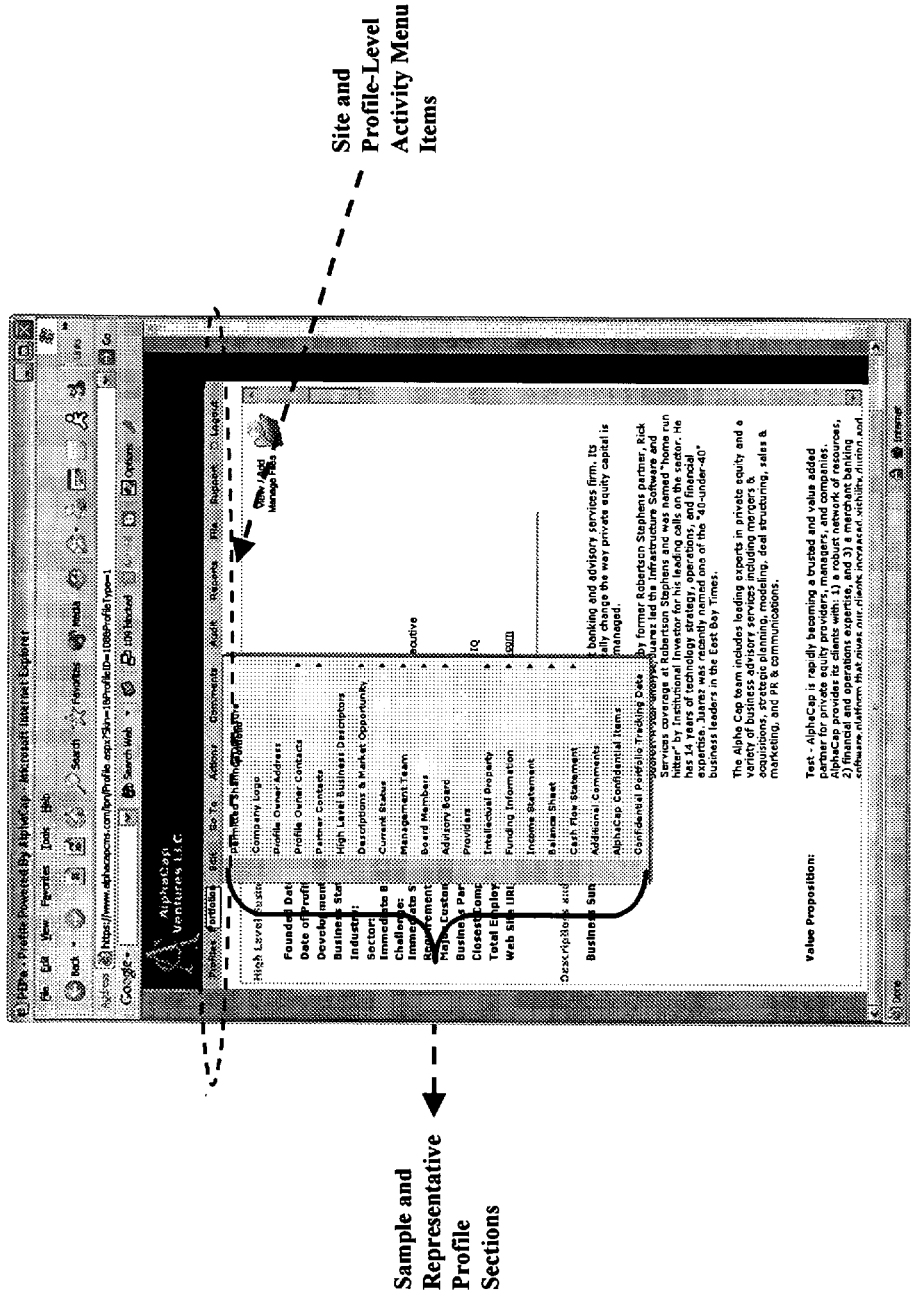
FIG. 2 Profile Sections Screen Shot

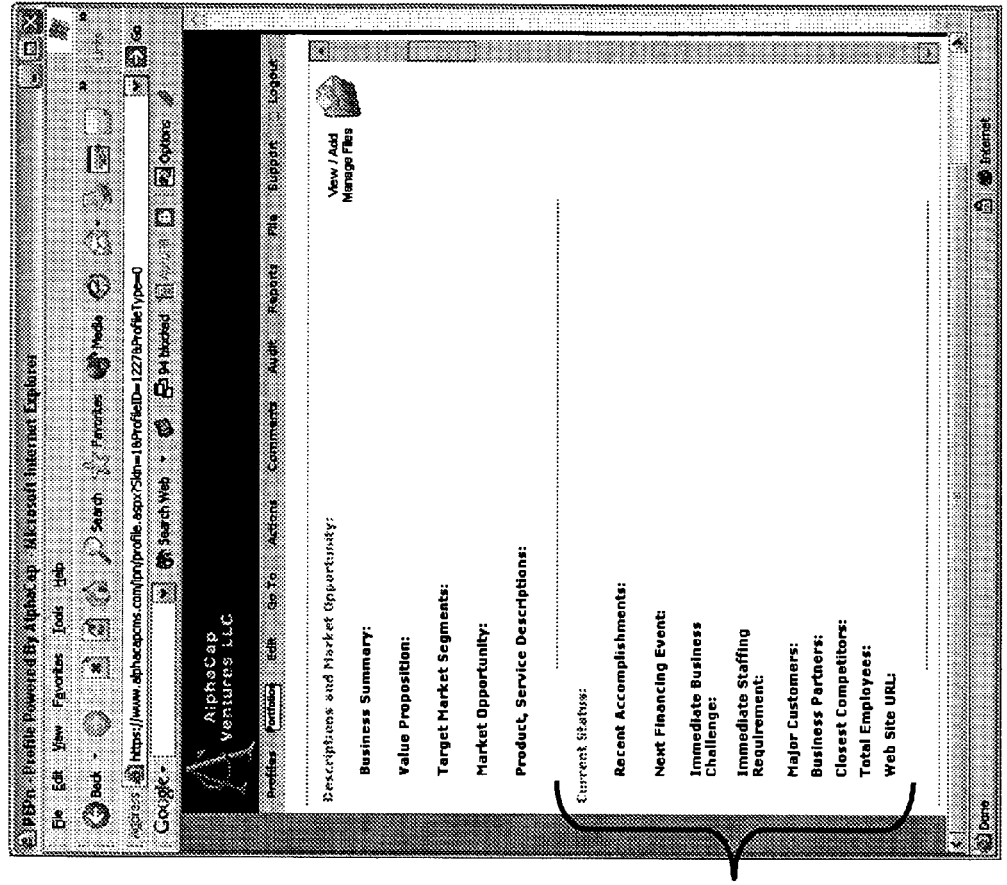
FIG. 3 Fields Contained Within Profile Sections Screen Shot

FIG. 4 Portfolio Record Sections Screen Shot
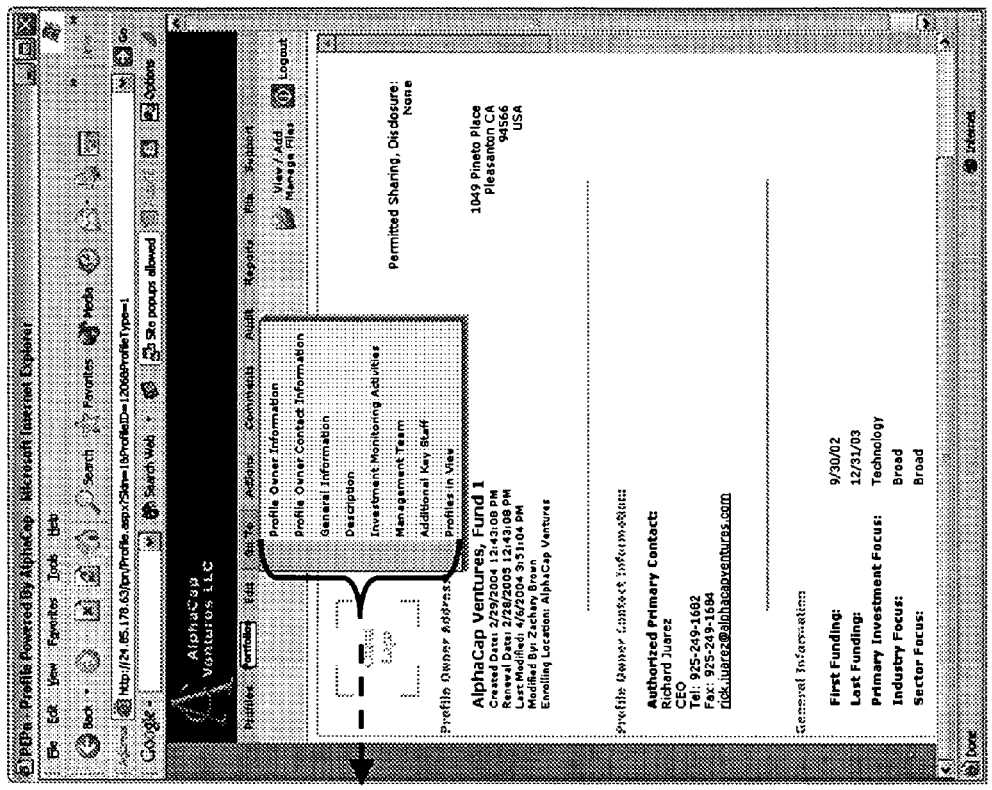

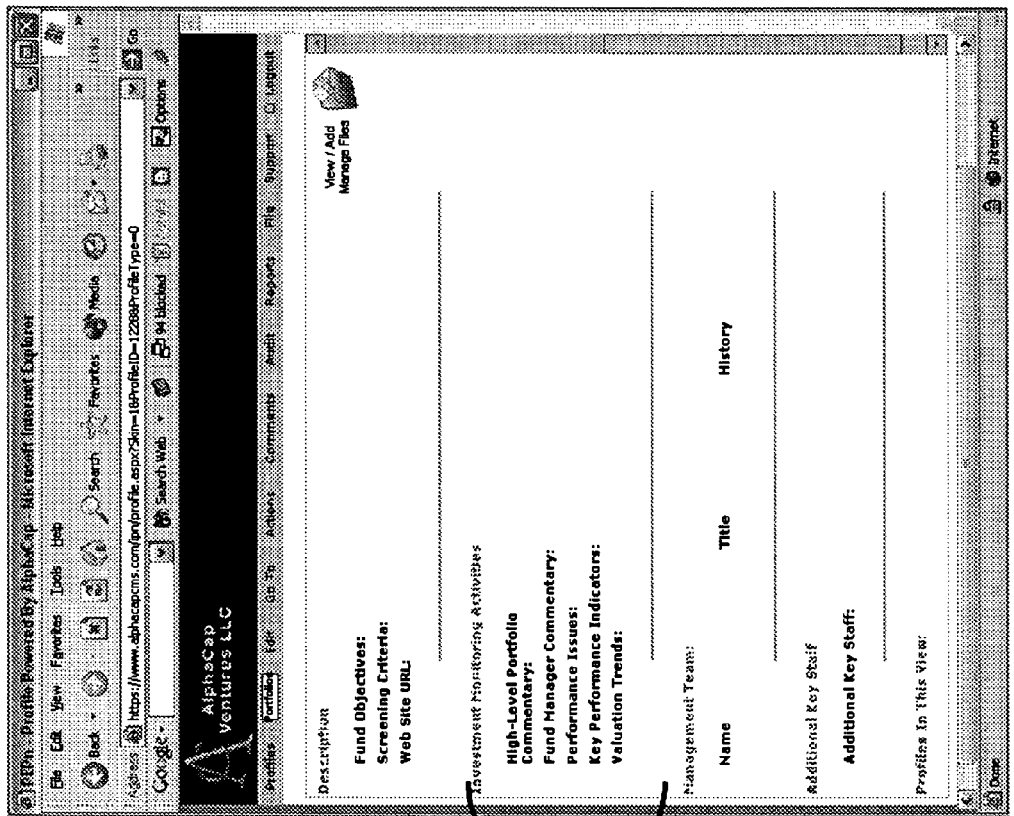
FIG. 5 Fields Within a Portfolio Record Section Screen Shot

FIG. 6b

Summary List of Portfolio Records for a Given Portfolio Category Name

FIG. 6a

Portfolio Category Names

Consumer Profile Associated with a given Provider's Portfolio Record

Portfolio Record: Sections, Fields, and Associated Profiles

FIG. 8 - Logical Architecture
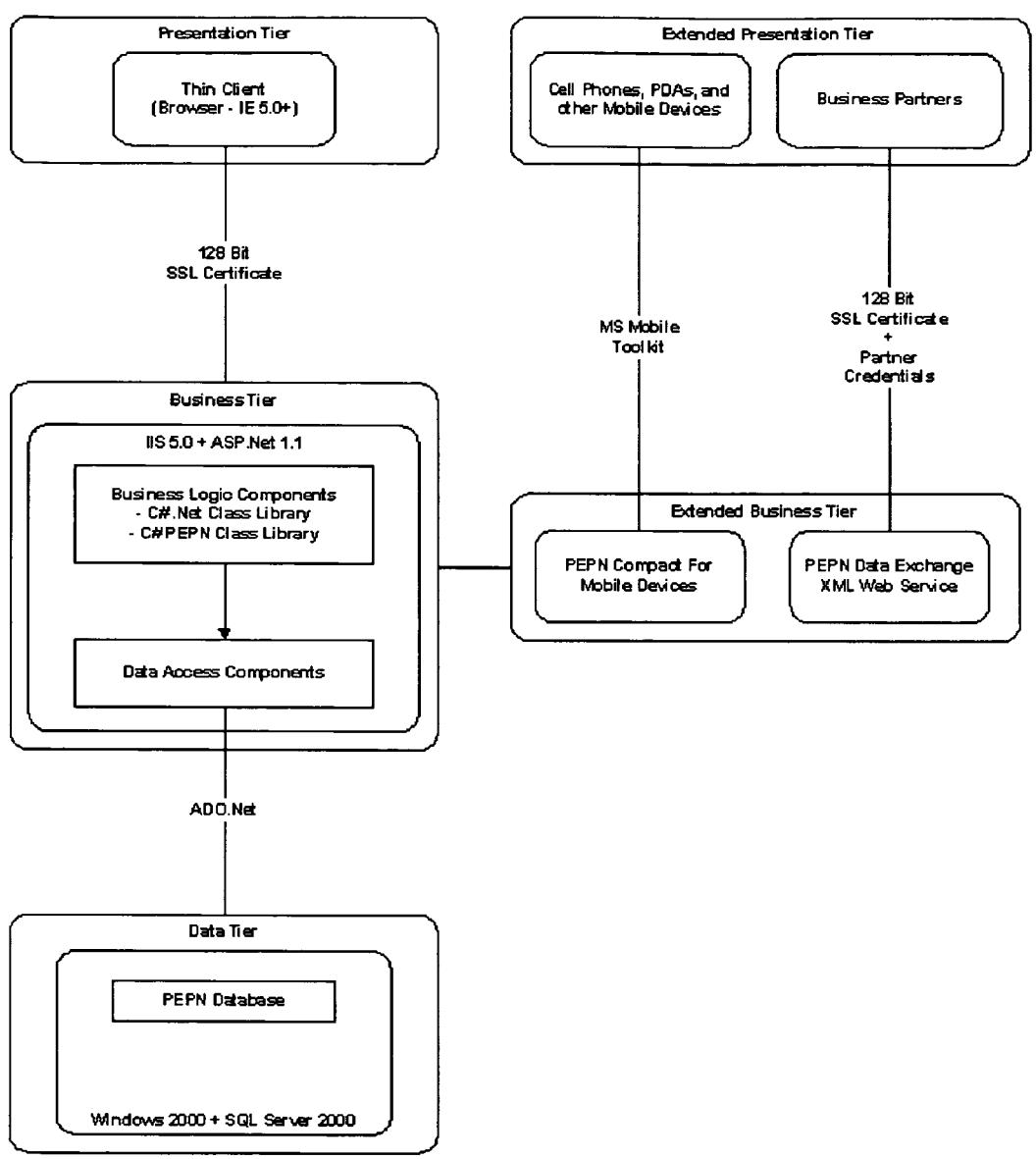

FIG. 9 – Physical Architecture
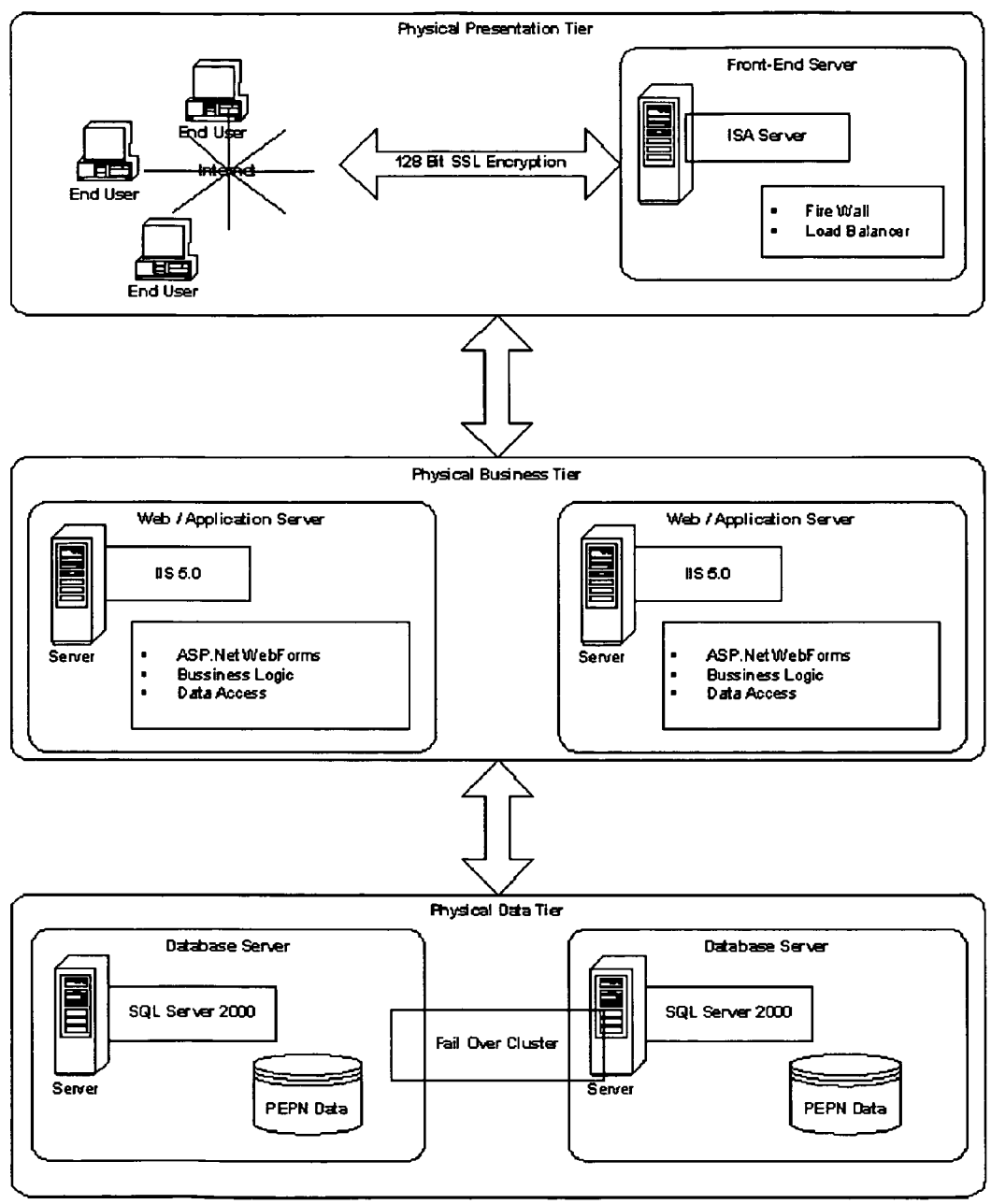

FIG. 10 - Management Tools Site Map
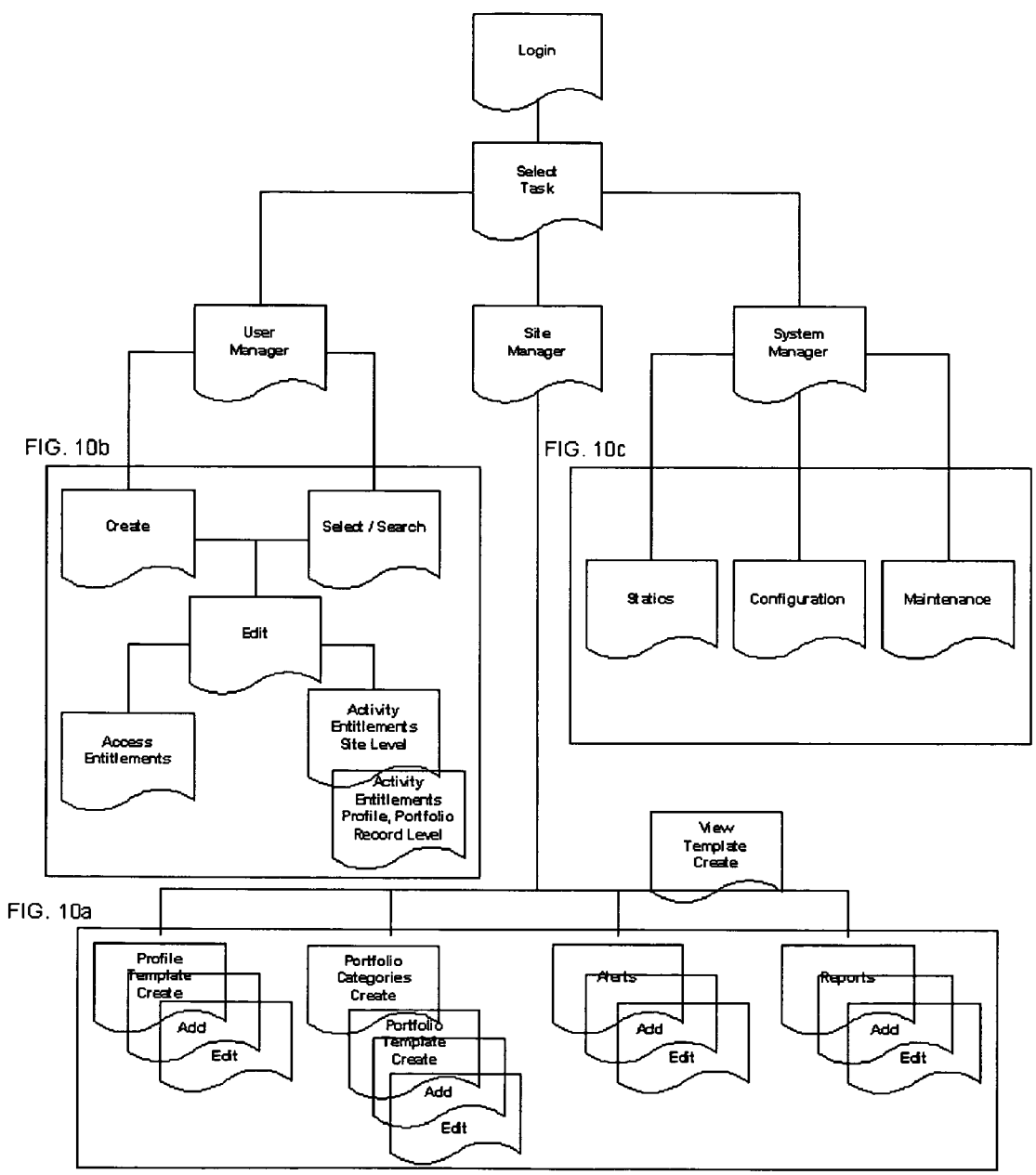

FIG. 11 - Profile Detail (Profile.aspx) Flow Chart
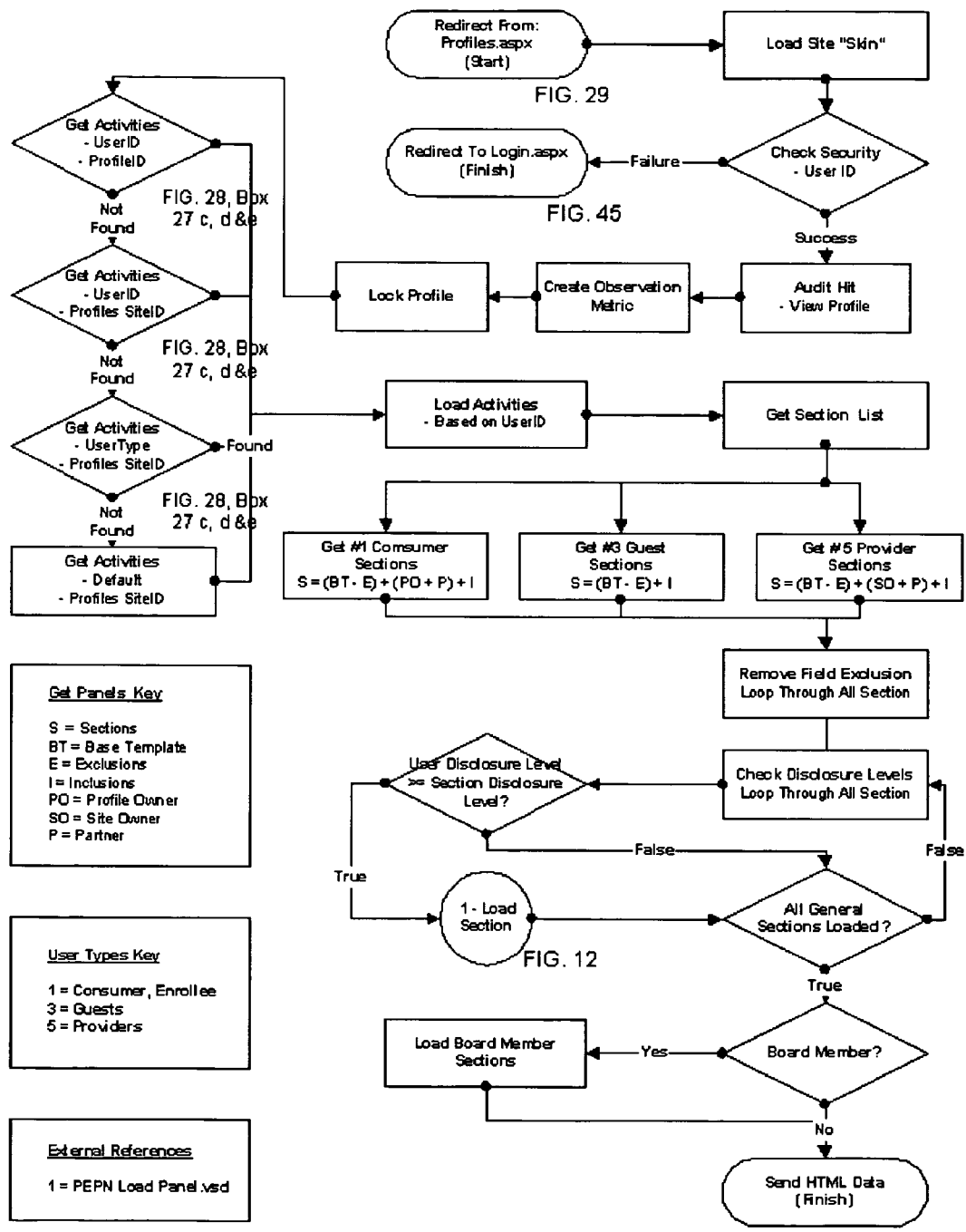

FIG. 12 - Load Section Flow Chart

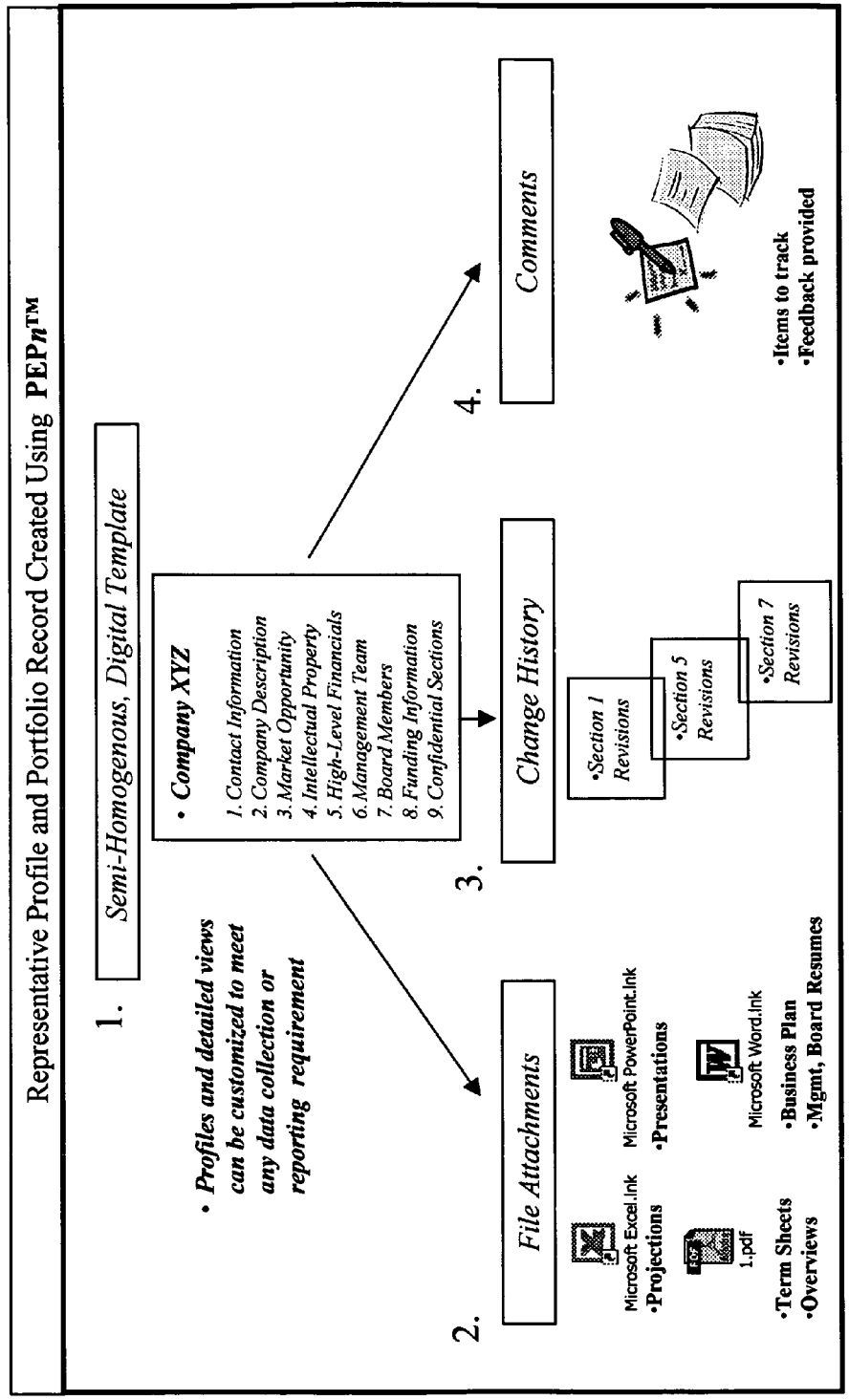
FIG. 13 Major Components of a Profile/Portfolio Record

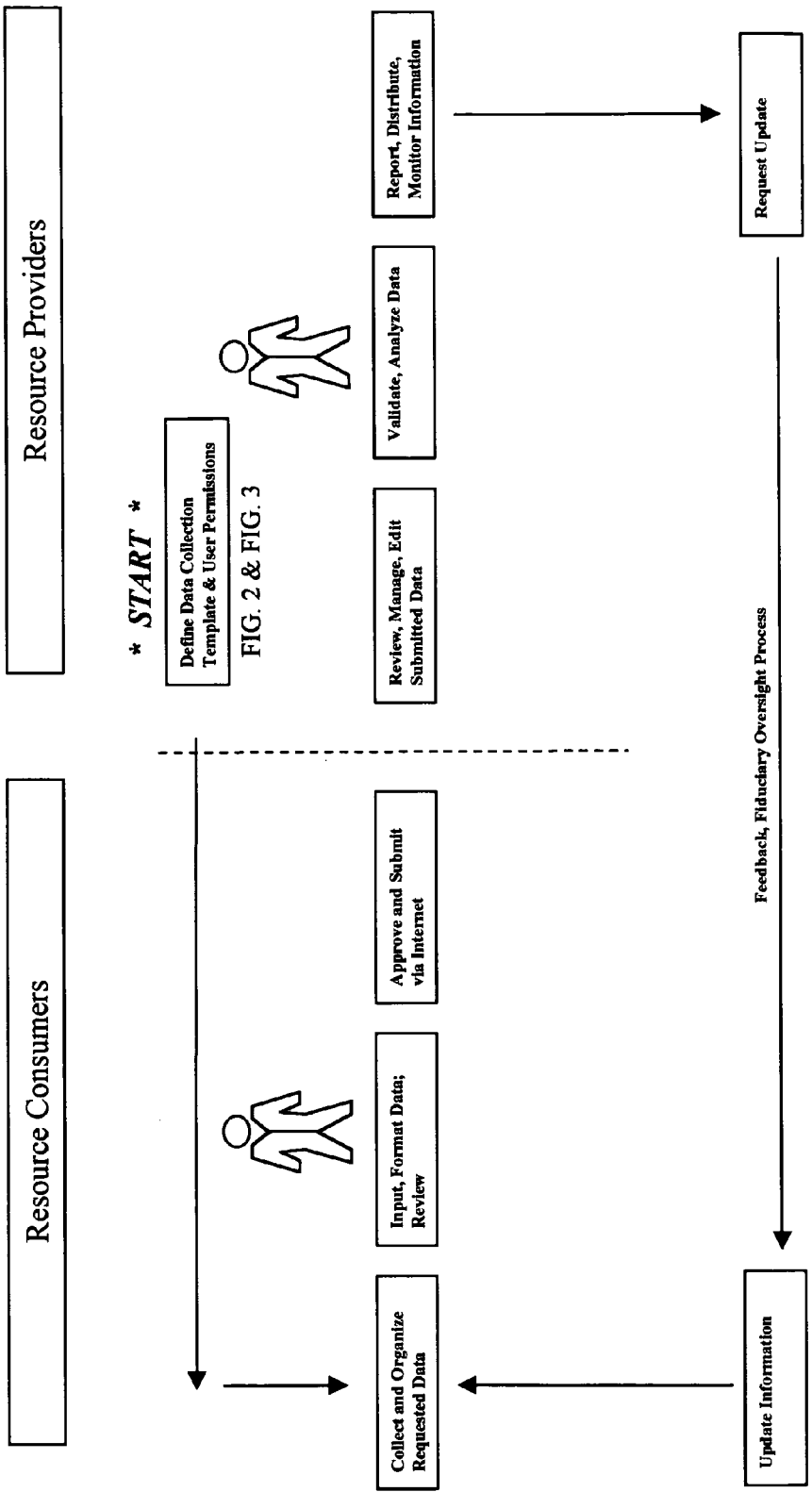
FIG. 14 Streamlined Investment Information Management Enabled by the Invention

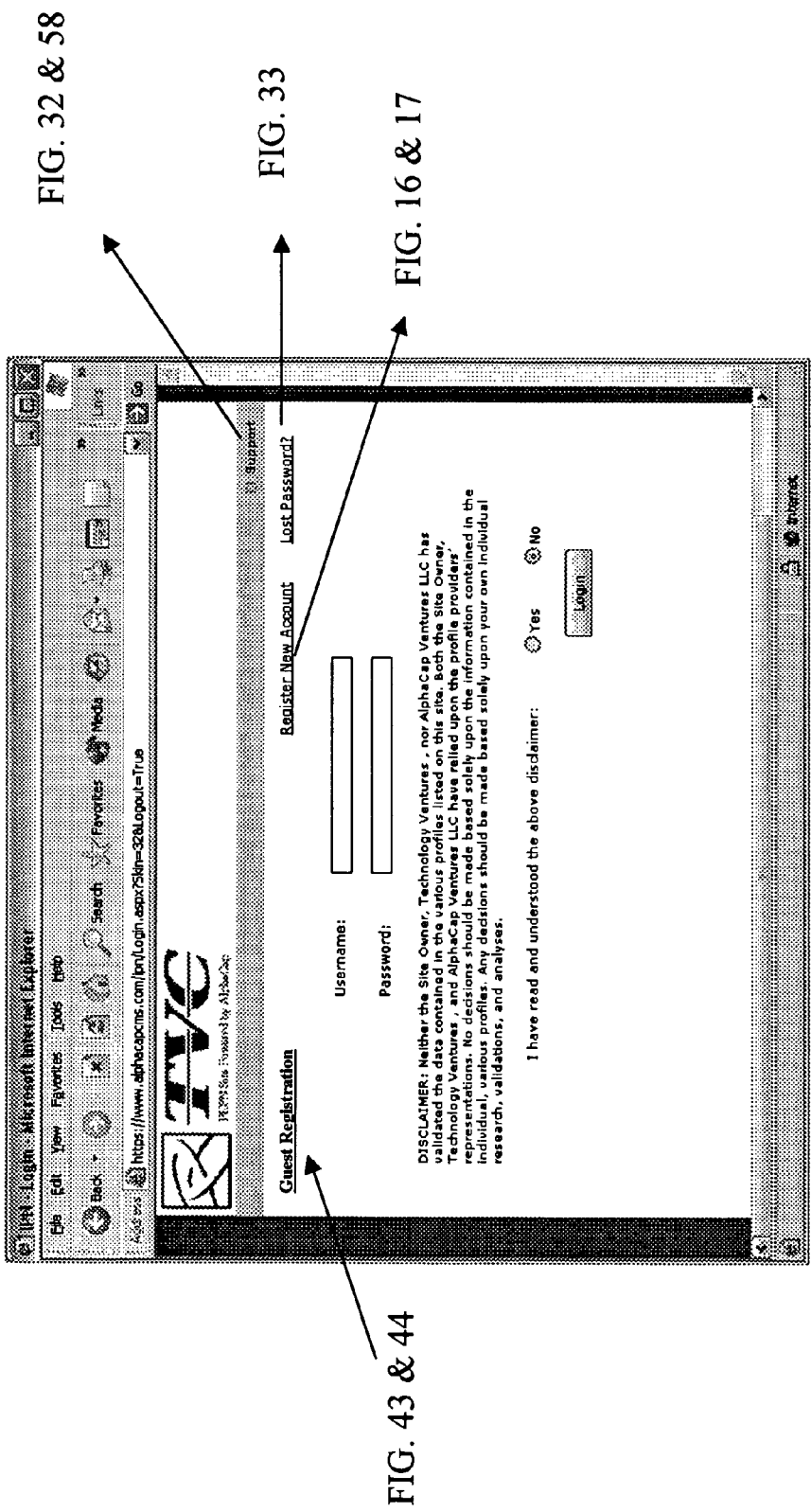
FIG. 15 - Login and New Username/Account Registration Screen Shot

FIG. 16 Consumer Username & Profile Self-Registration Screen Shot

FIG. 17 - Consumer Username and Profile Self-Registration Flow Chart
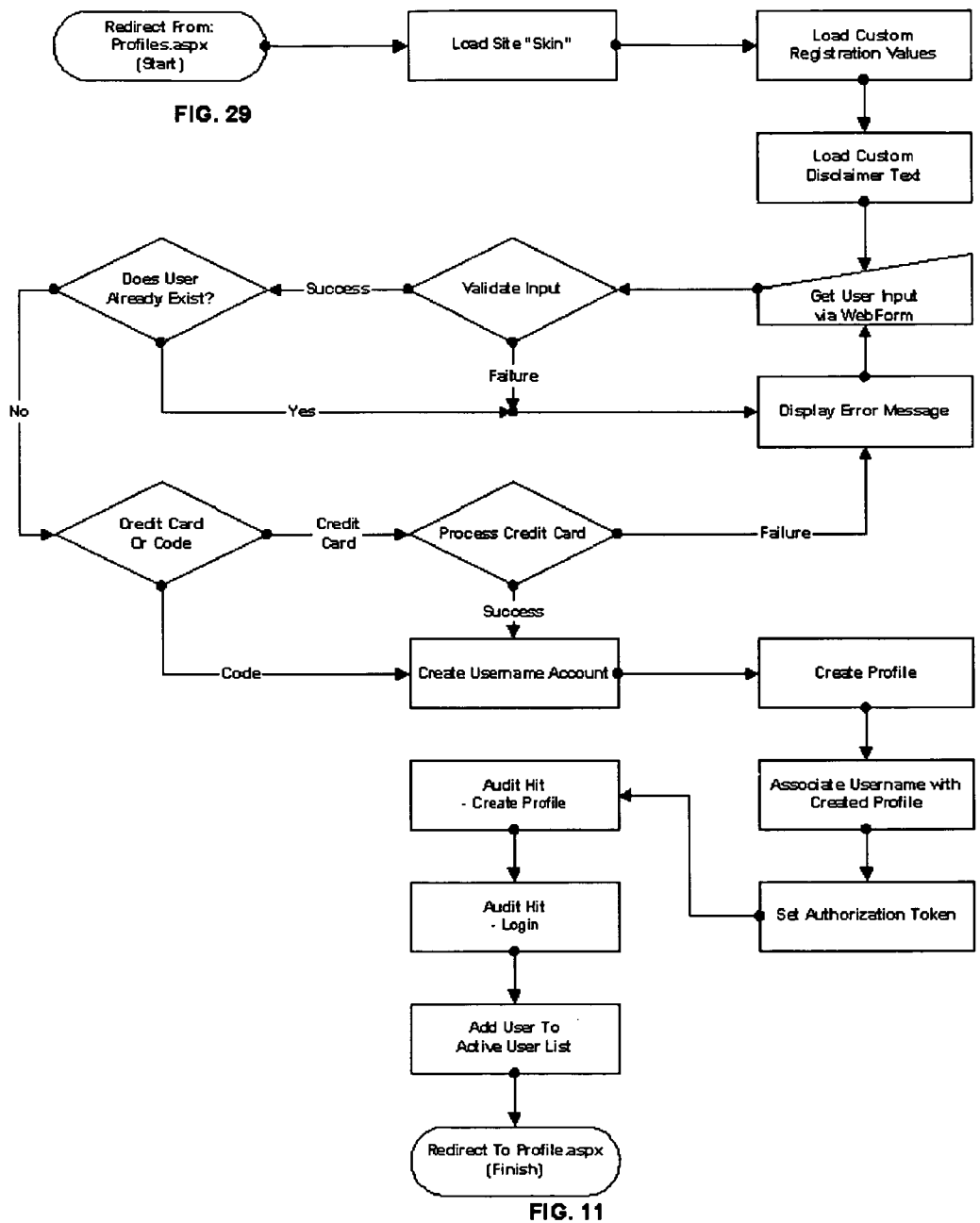

FIG. 18 - Create Profile Flow Chart
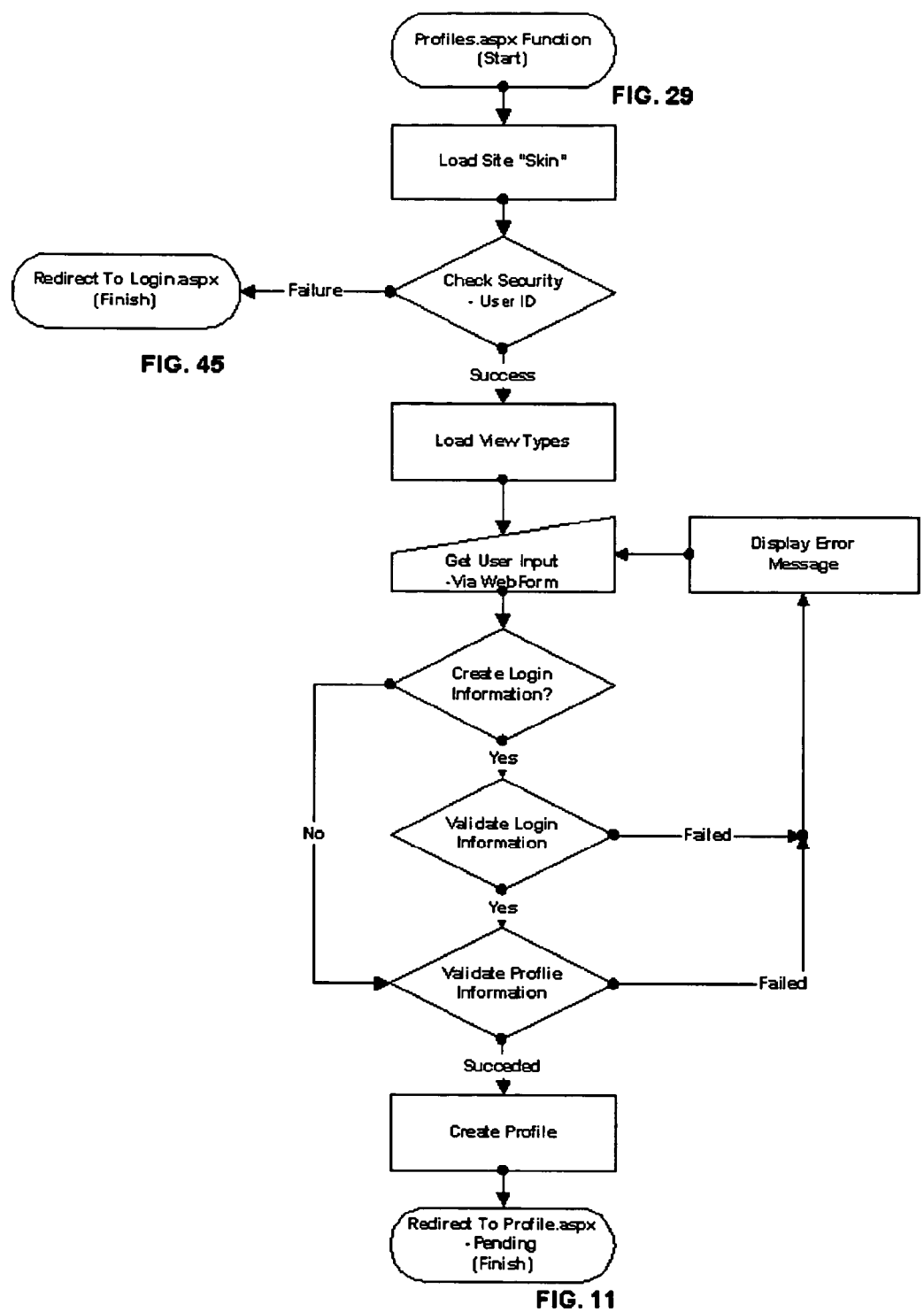

FIG. 19 - Edit Flow Chart
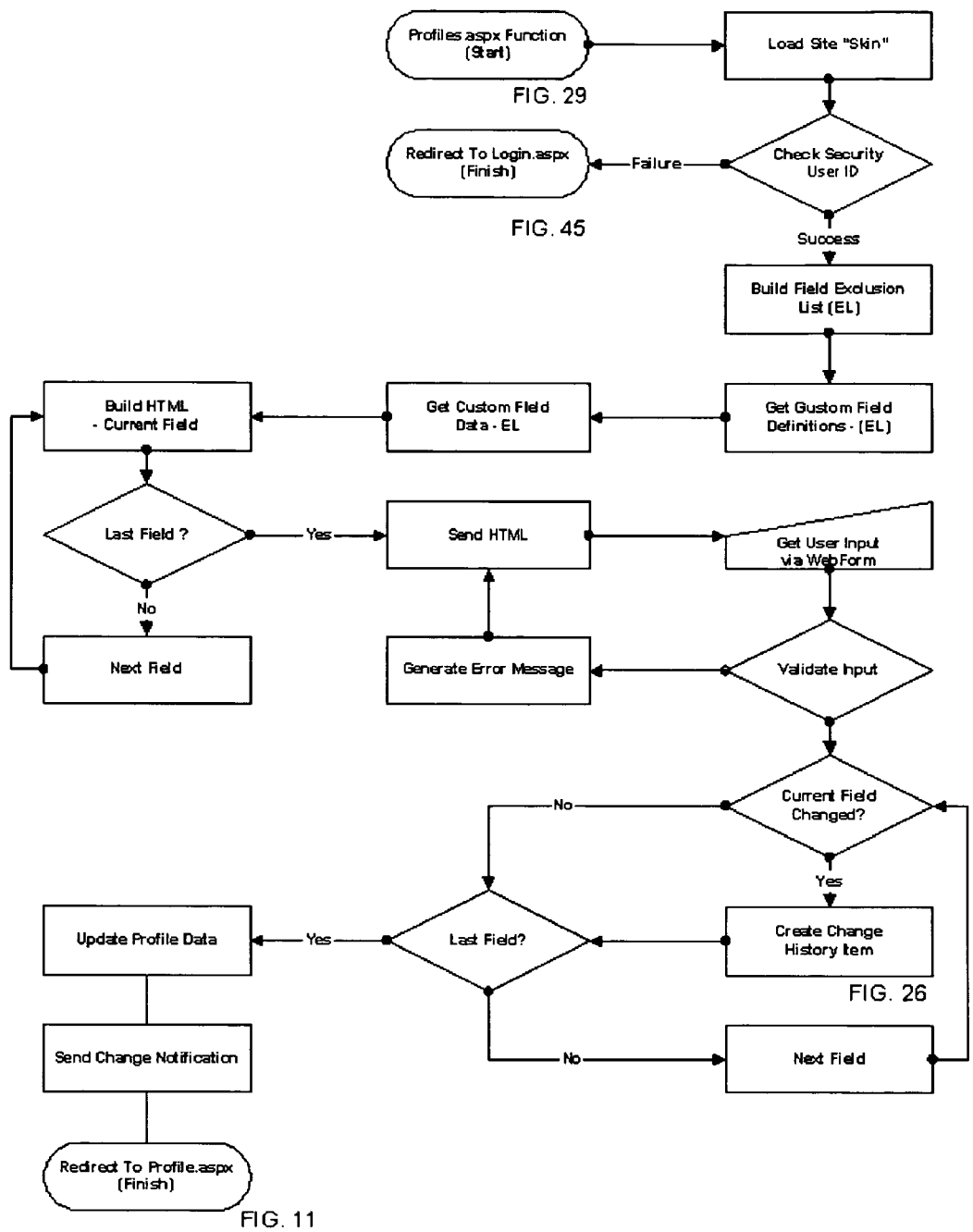

FIG. 20 - File Manager Flow Chart
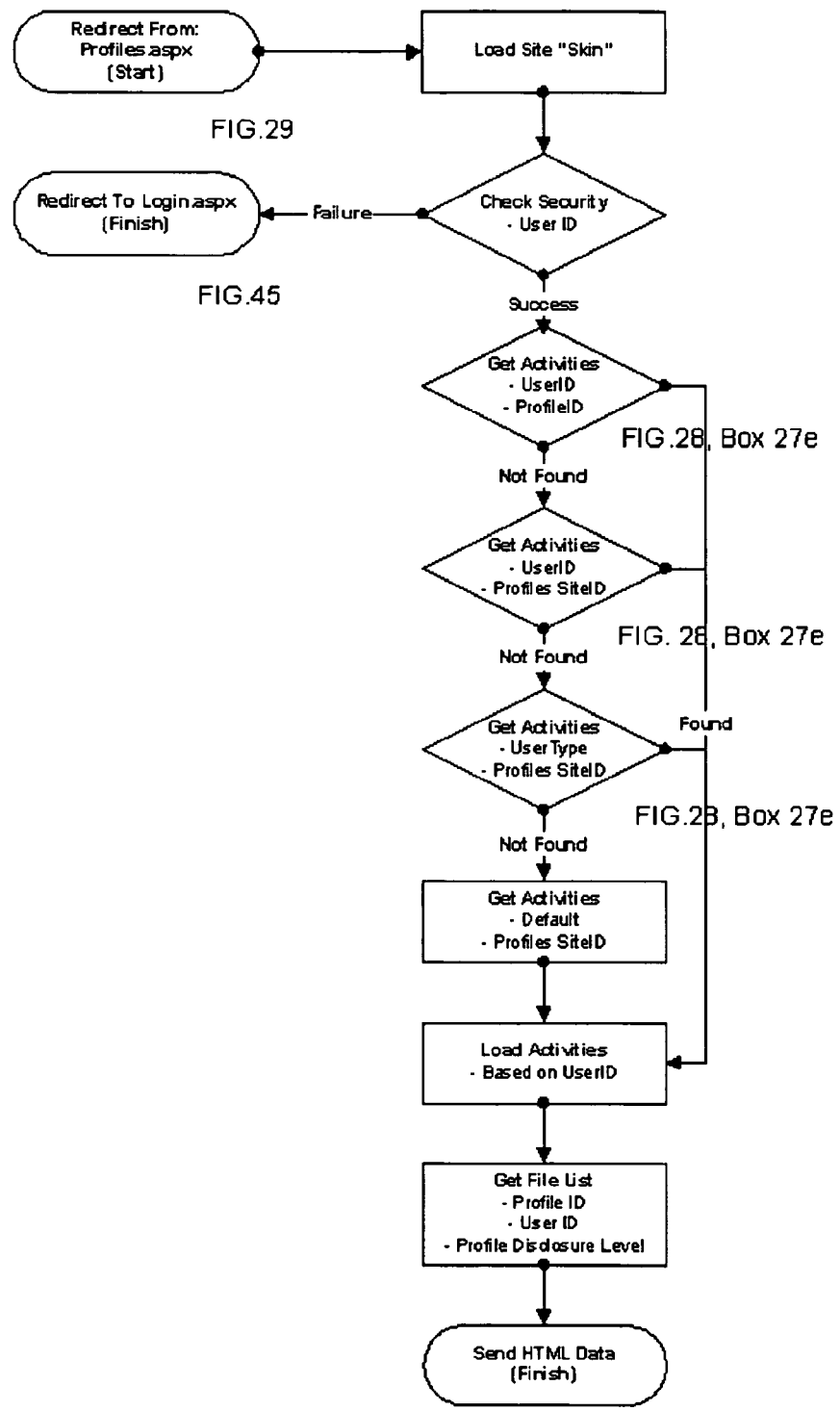

FIG. 21 - Add File Flow Chart
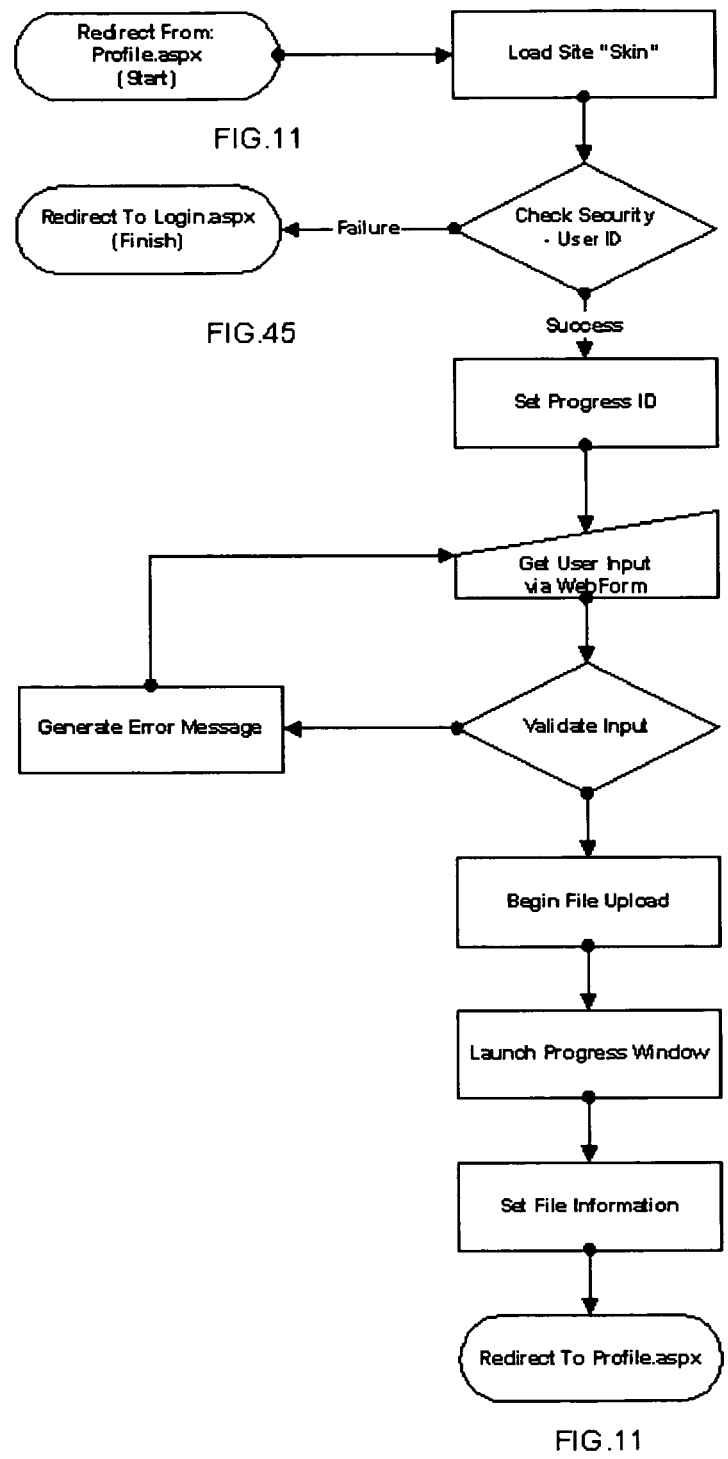

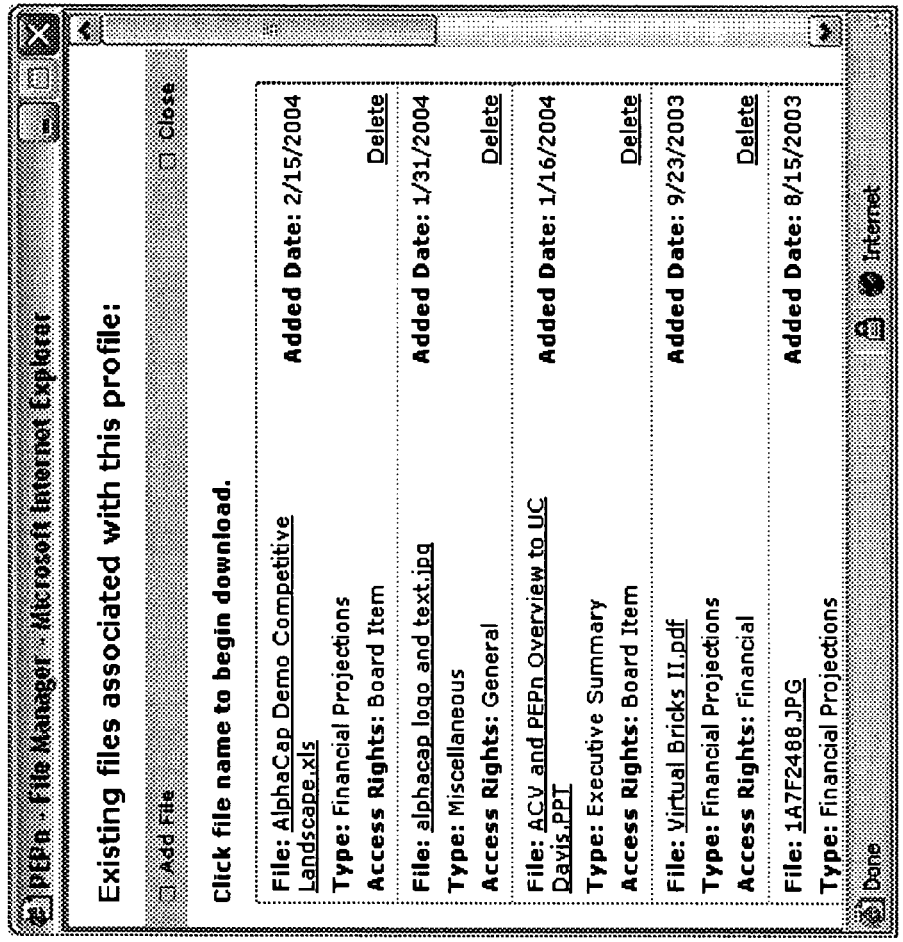
FIG. 22 File Manager Screen Shot

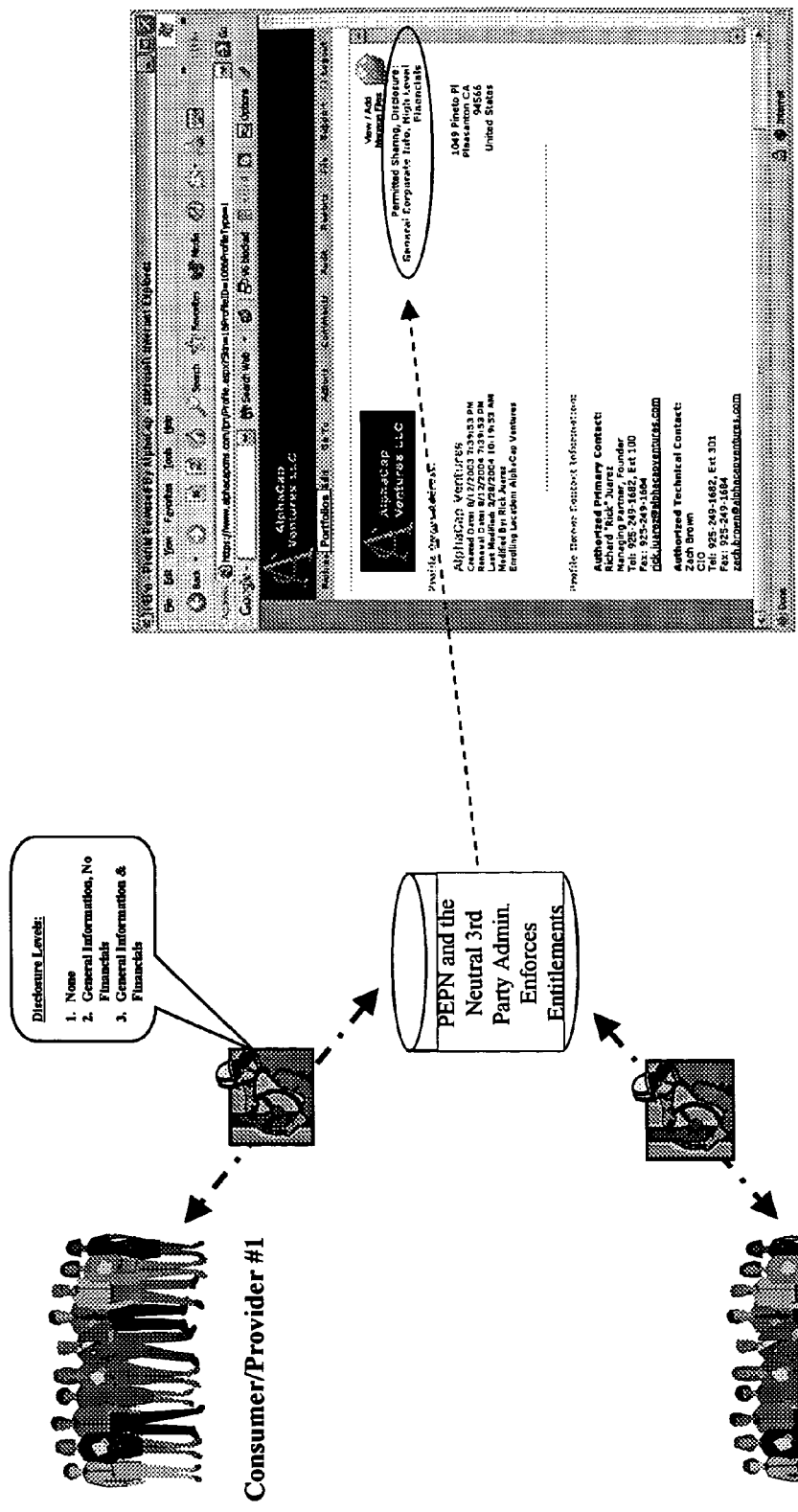
FIG. 23 Flowchart Showing Disclosure Level Procedure

FIG. 24 - Portfolio Summary Flow Chart
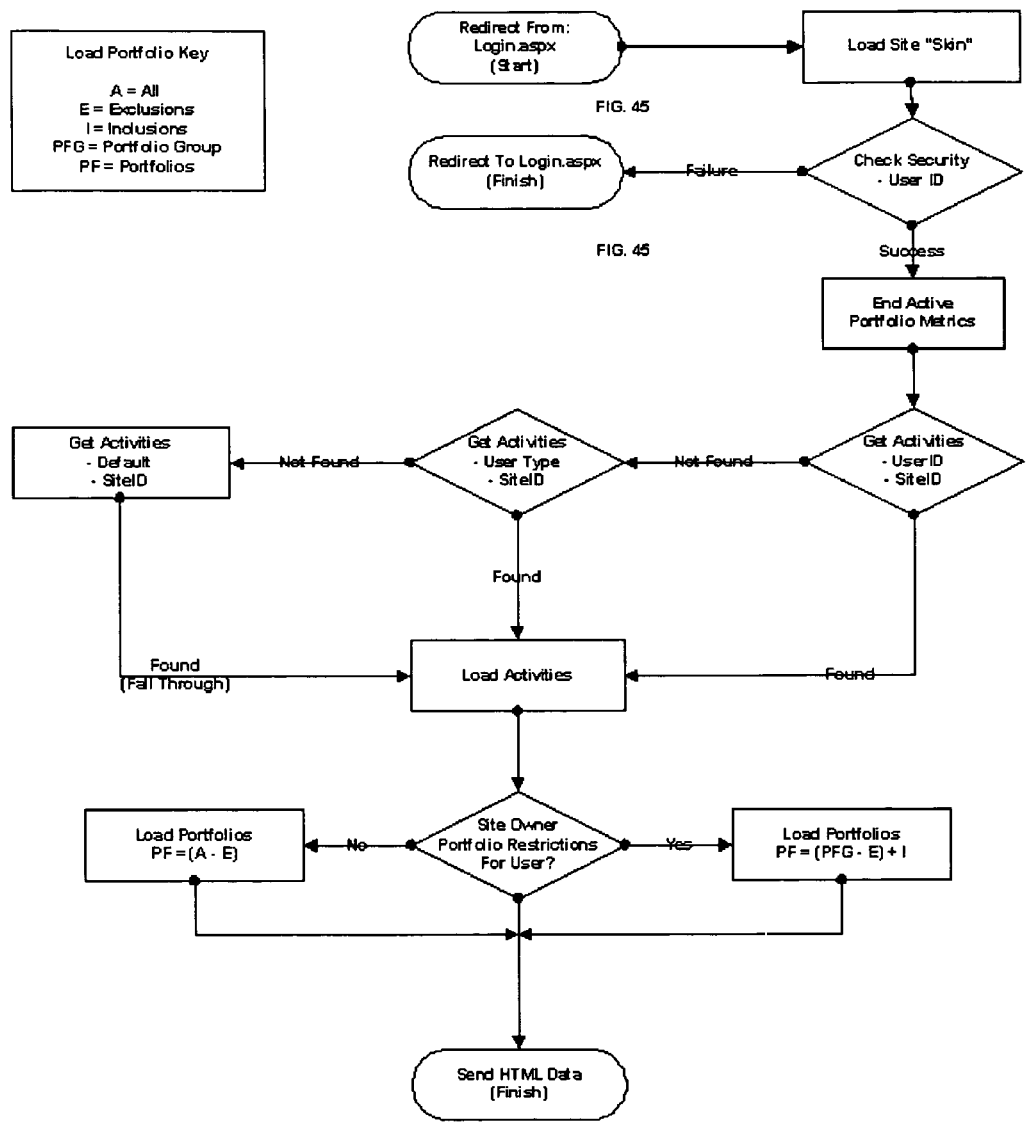

FIG. 25 - Portfolio Detail Flow Chart
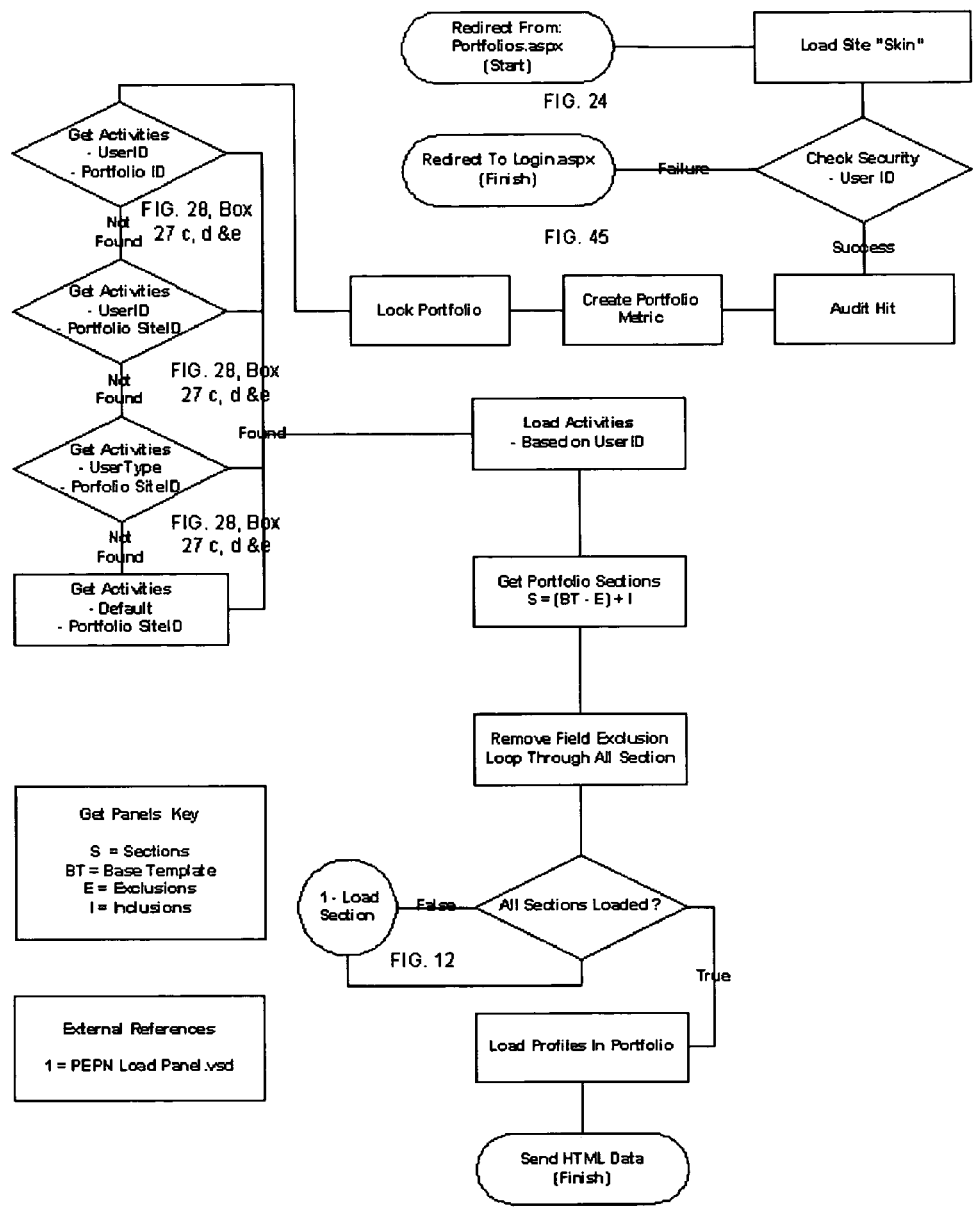

FIG. 26 Profile Change History Screen Shots
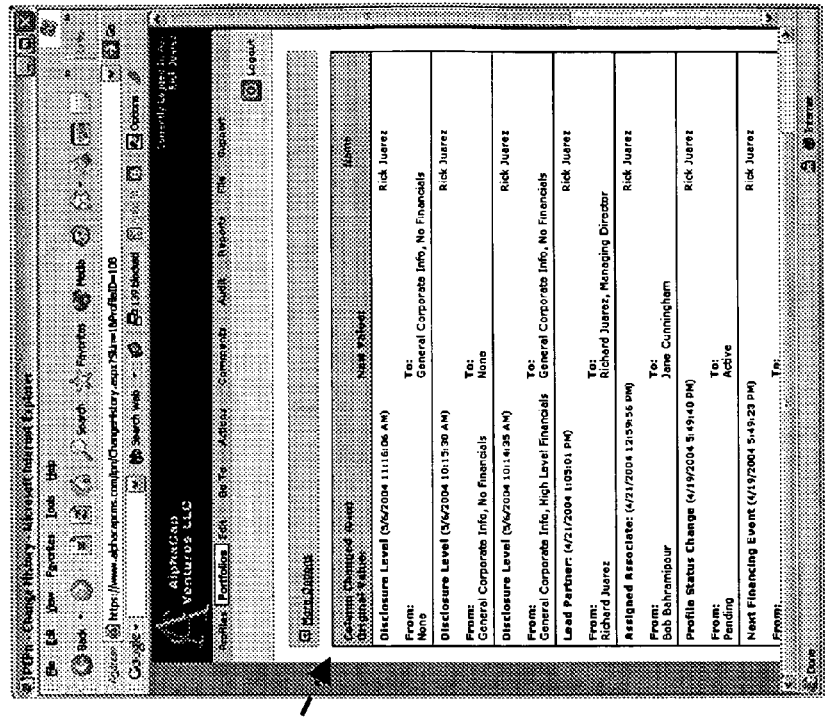
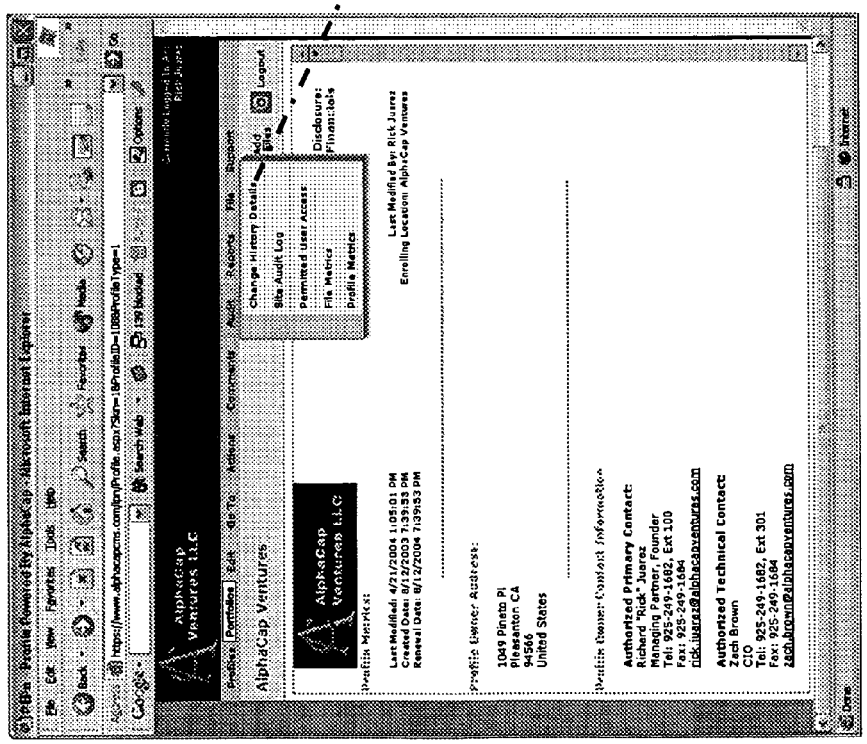

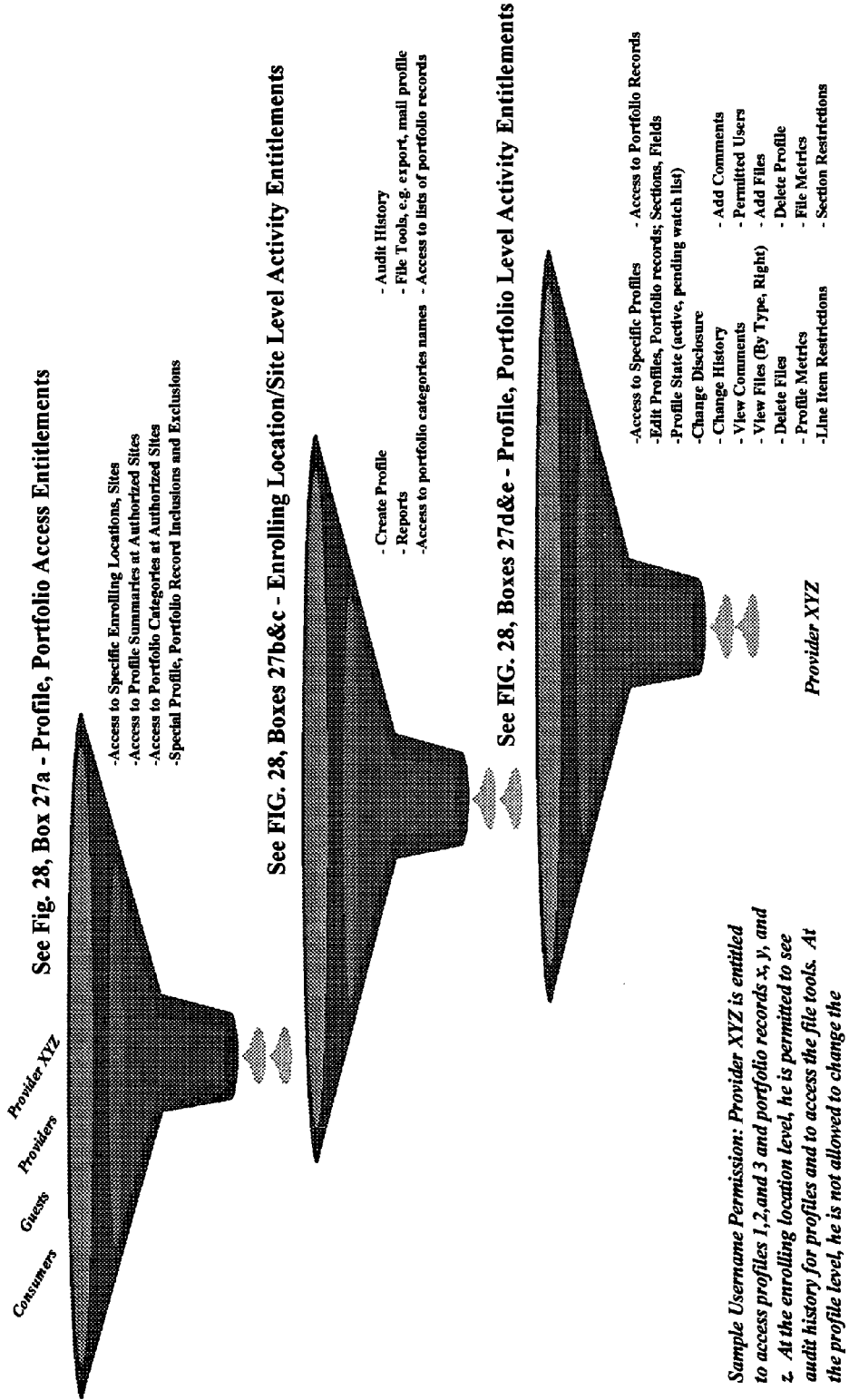
FIG. 27 Multi-Tiered and Cascading Entitlement Structure

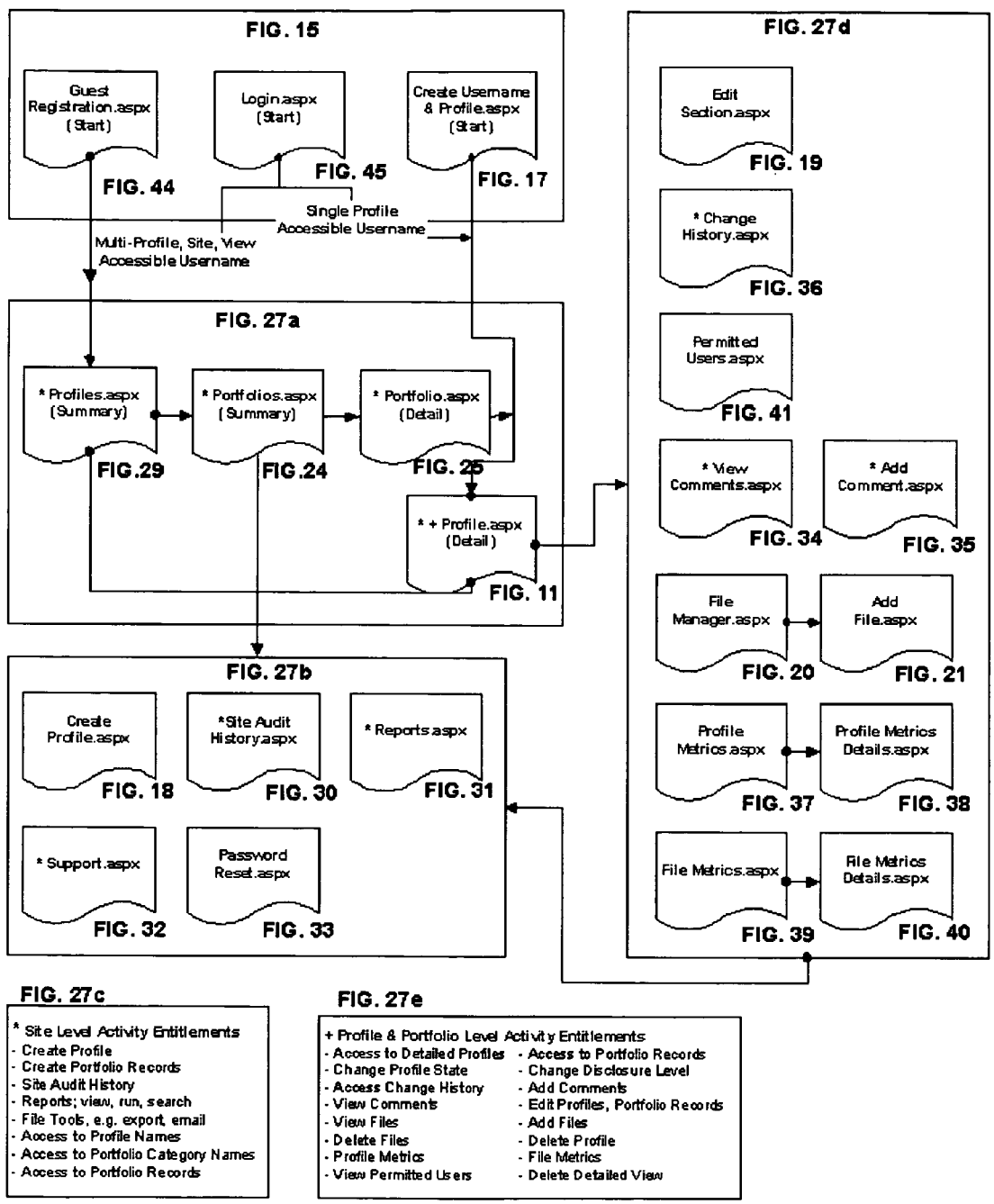

FIG. 29 - Site Summary Flow Chart
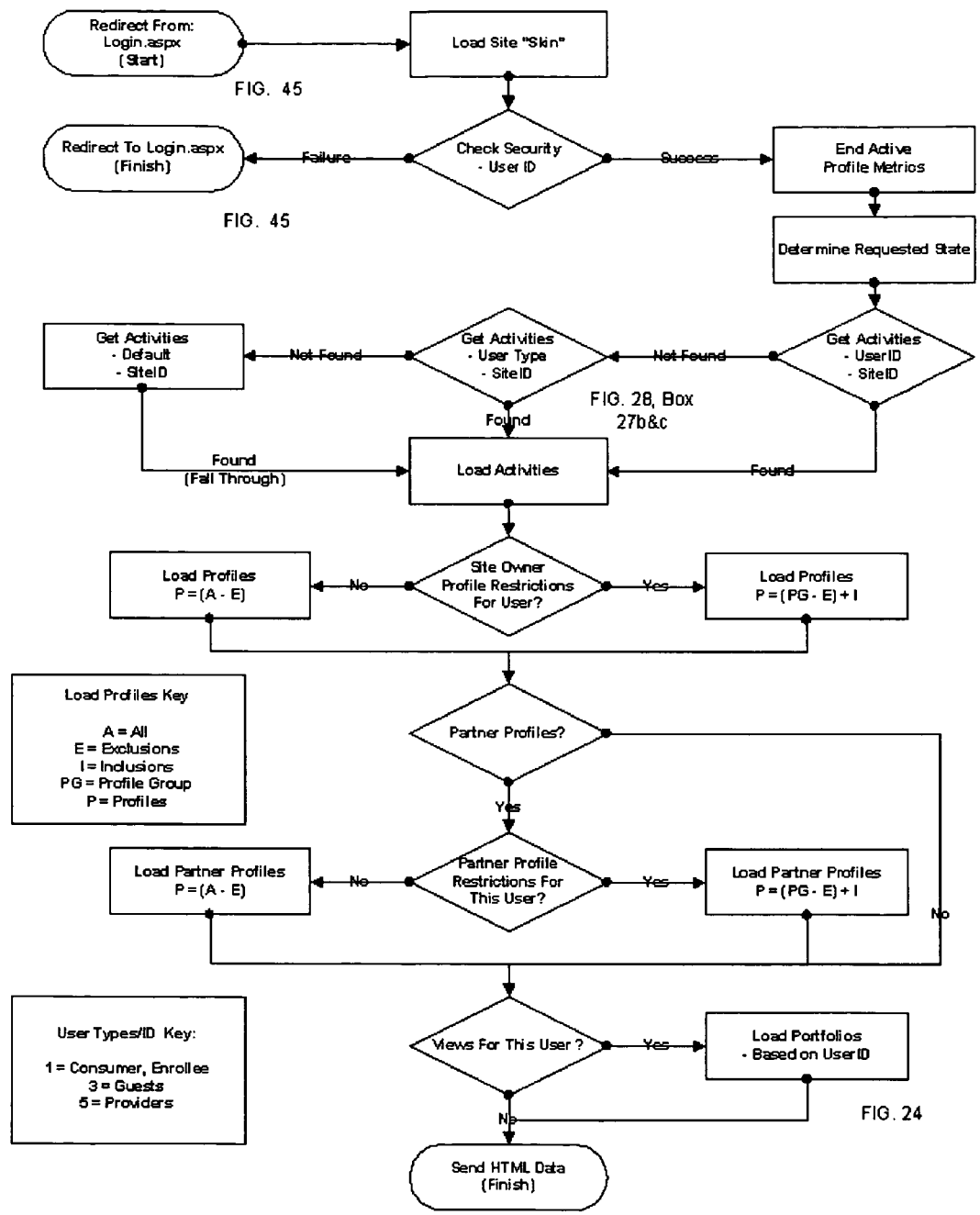

FIG. 30 – Site Audit History Log Flow Chart
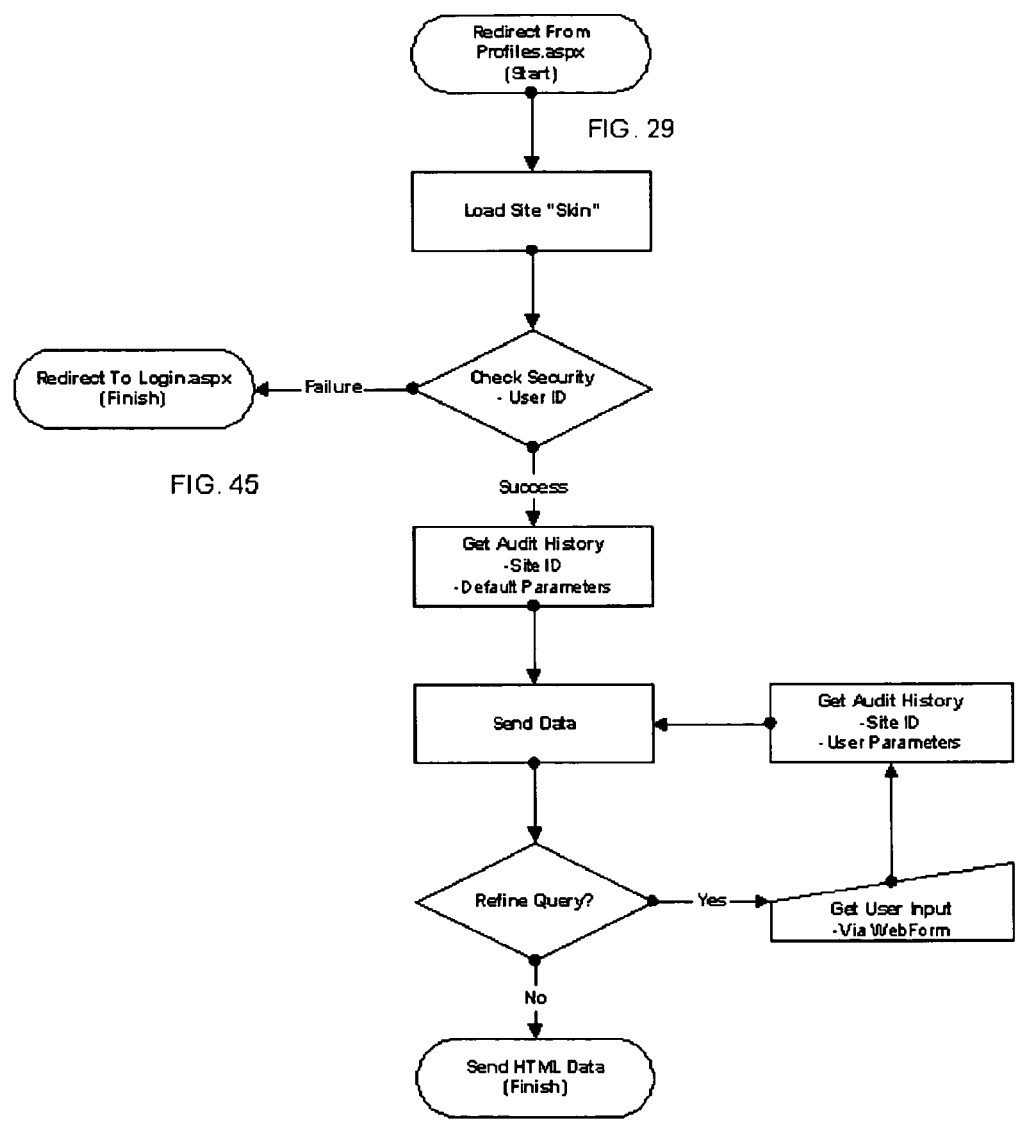

FIG. 31 - Report Flow Chart
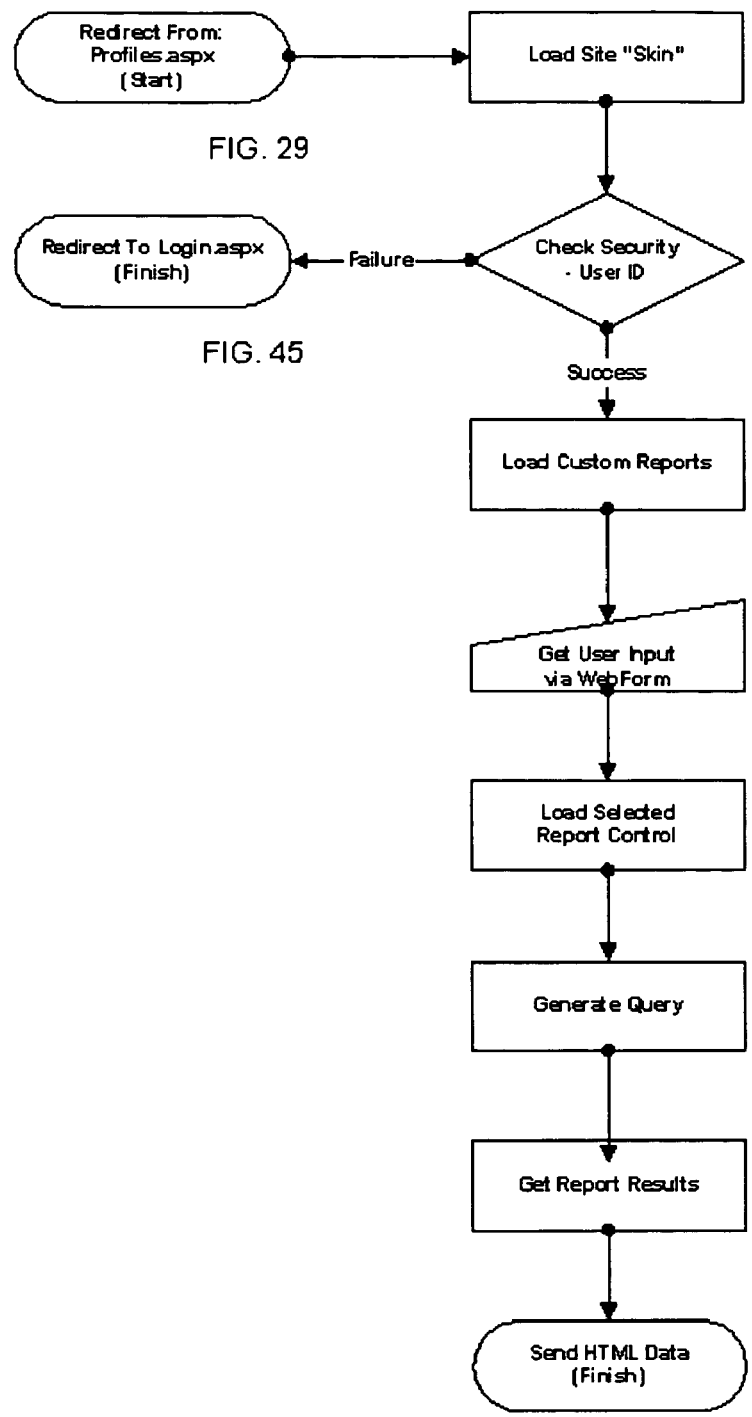

FIG. 32 - Support Flow Chart

FIG. 33 - Password Reset Flow Chart
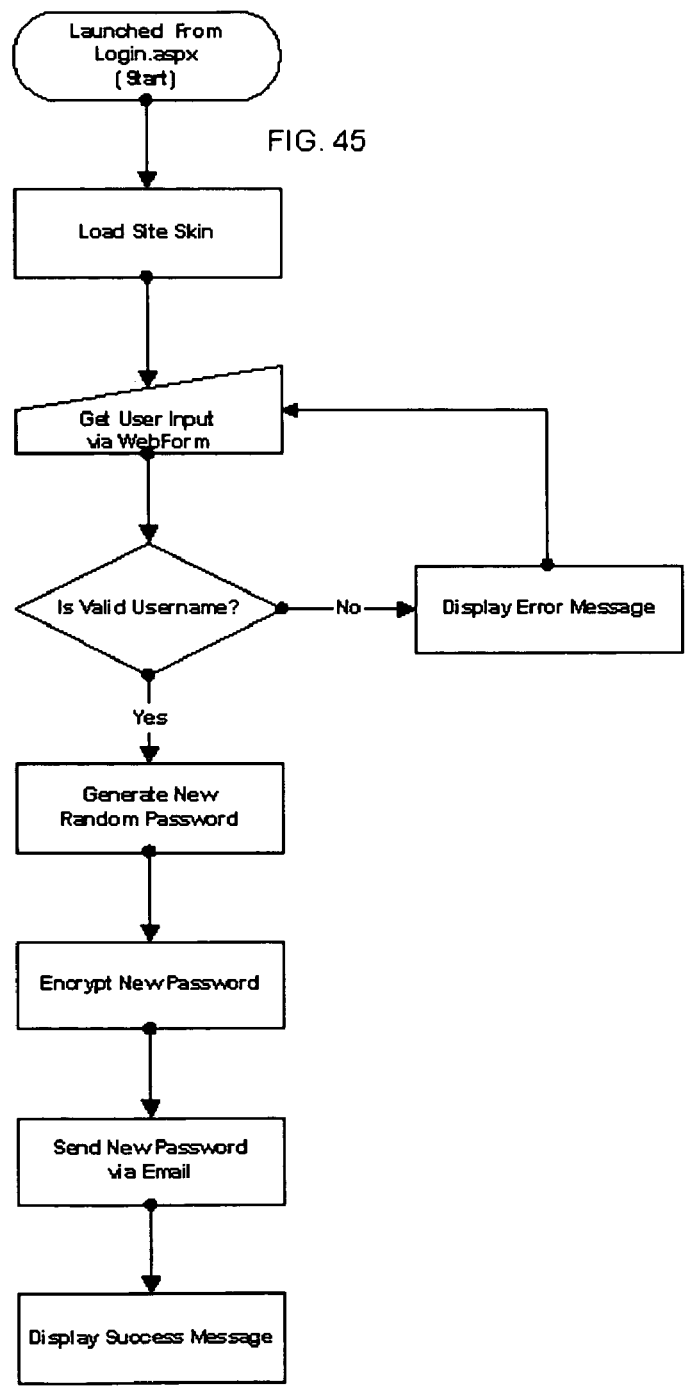

FIG. 34 – View Comments Flow Chart
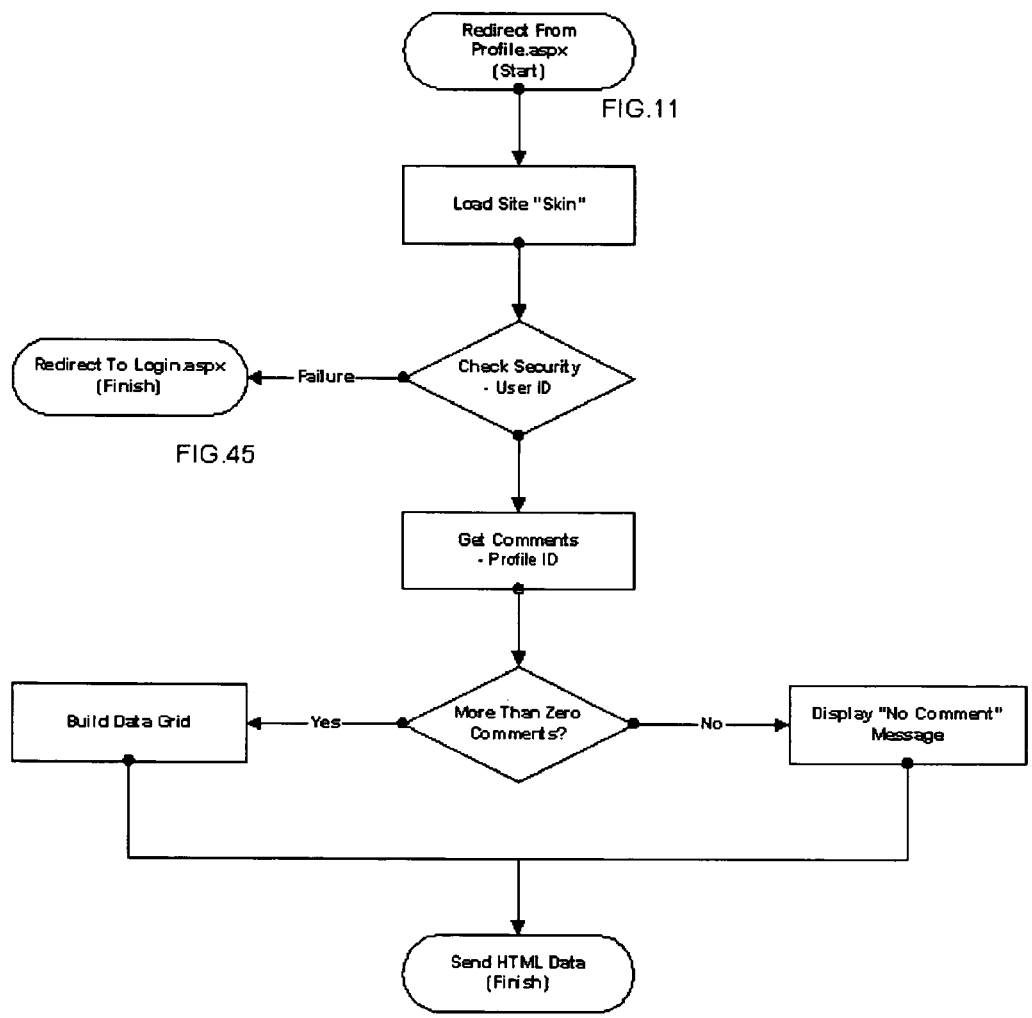

FIG. 35 - Add Comment Flow Chart
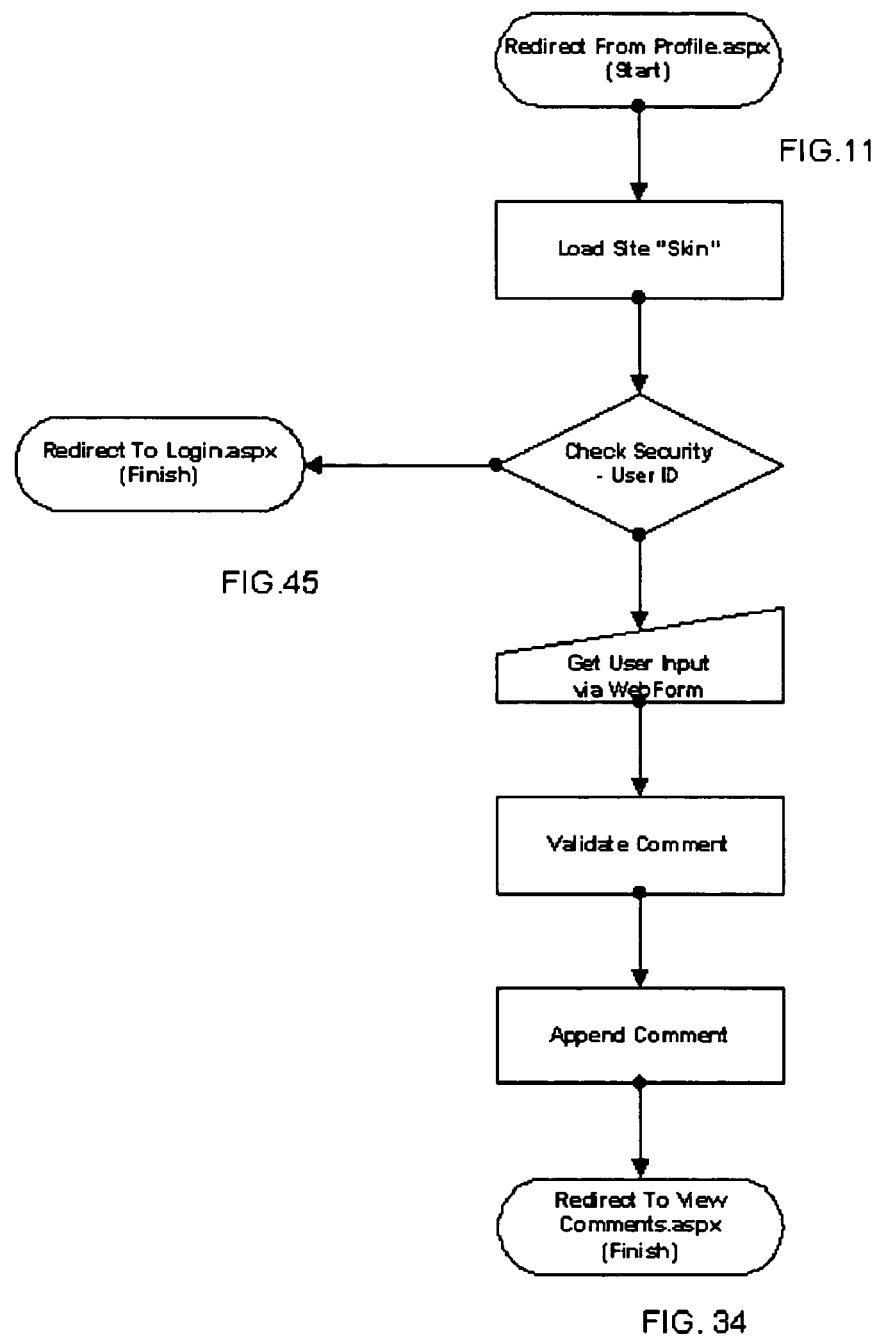

FIG. 36 – Change History Log Flow Chart
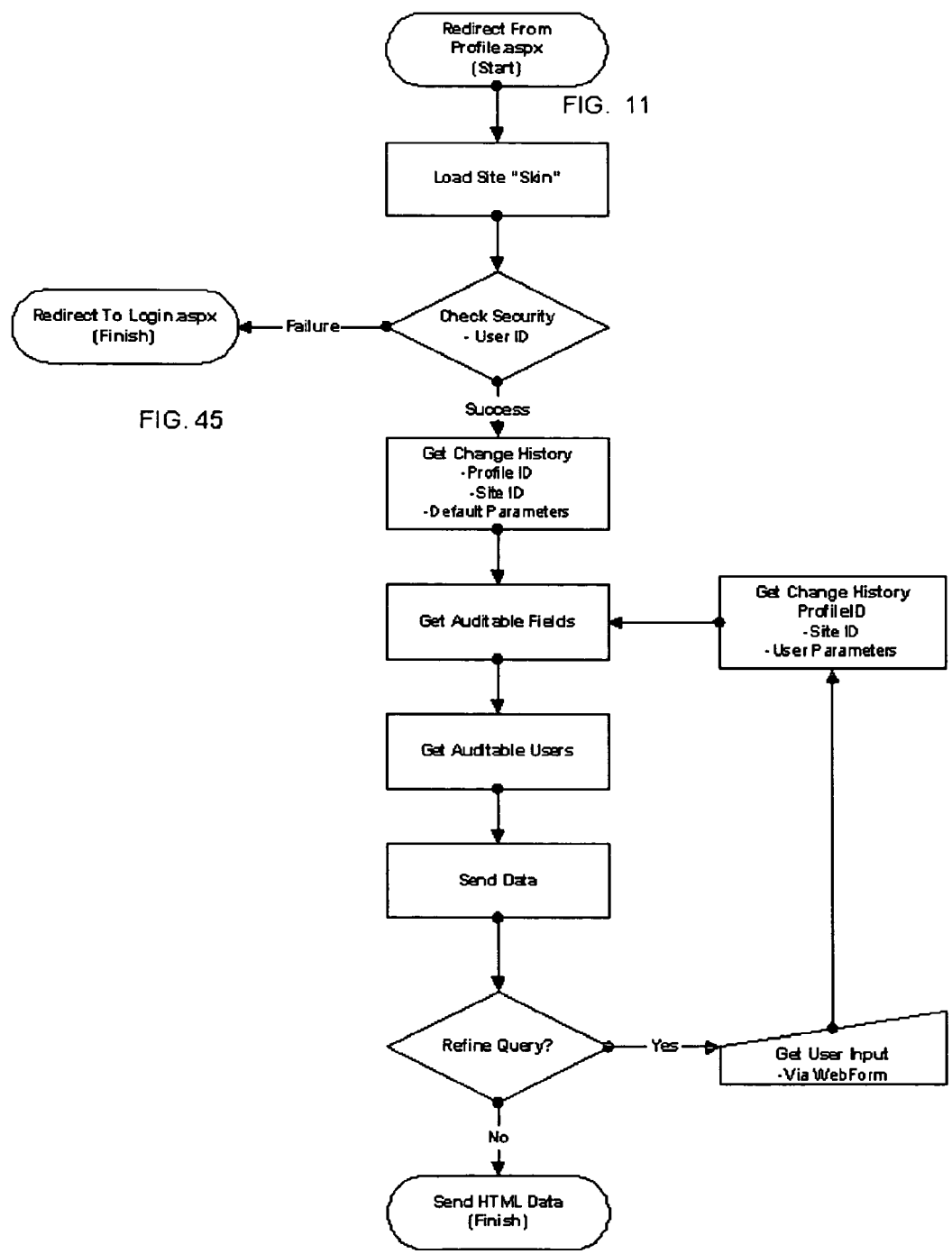

FIG. 37 - Profile Metrics Summary Flow Chart
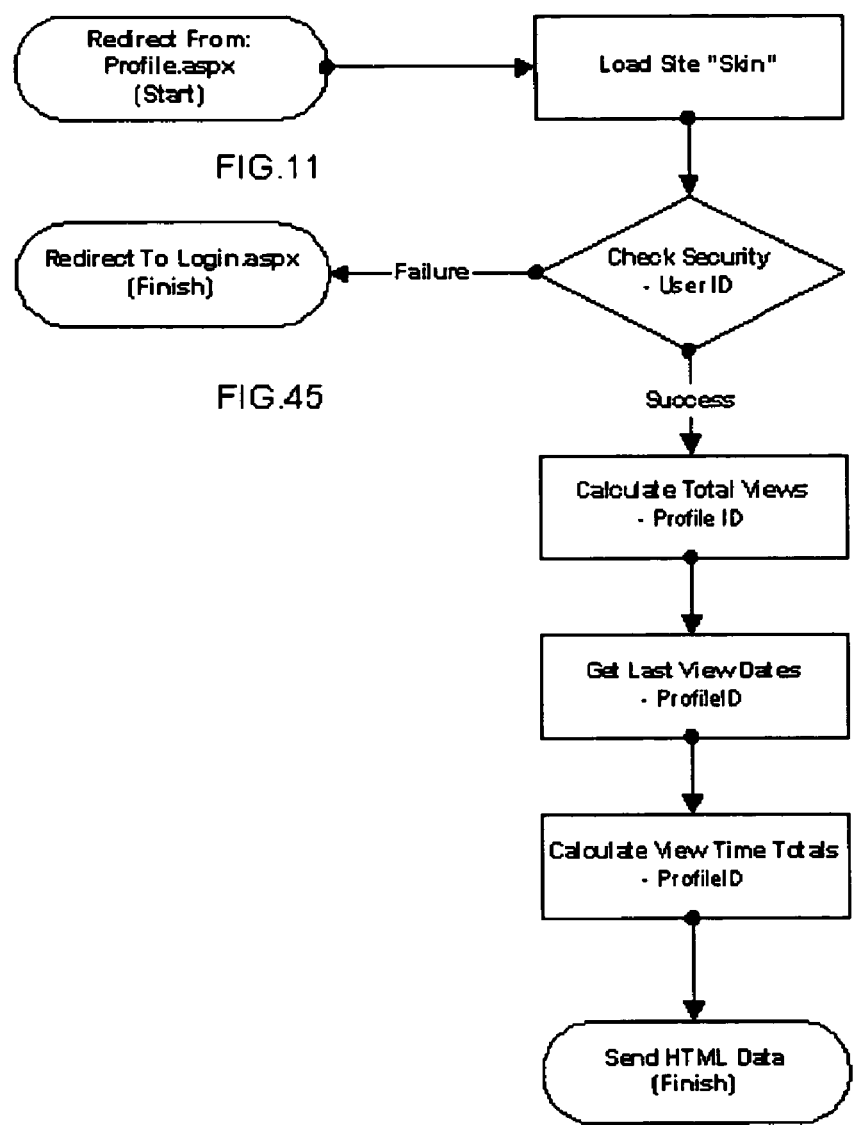

FIG. 38 - Profile Metrics Detail Flow Chart
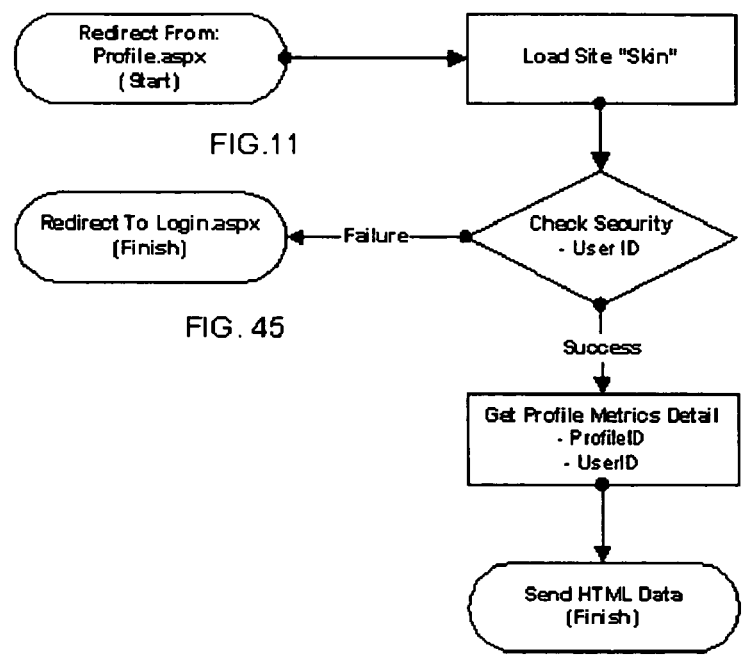

FIG. 39 - File Metrics Summary Flow Chart
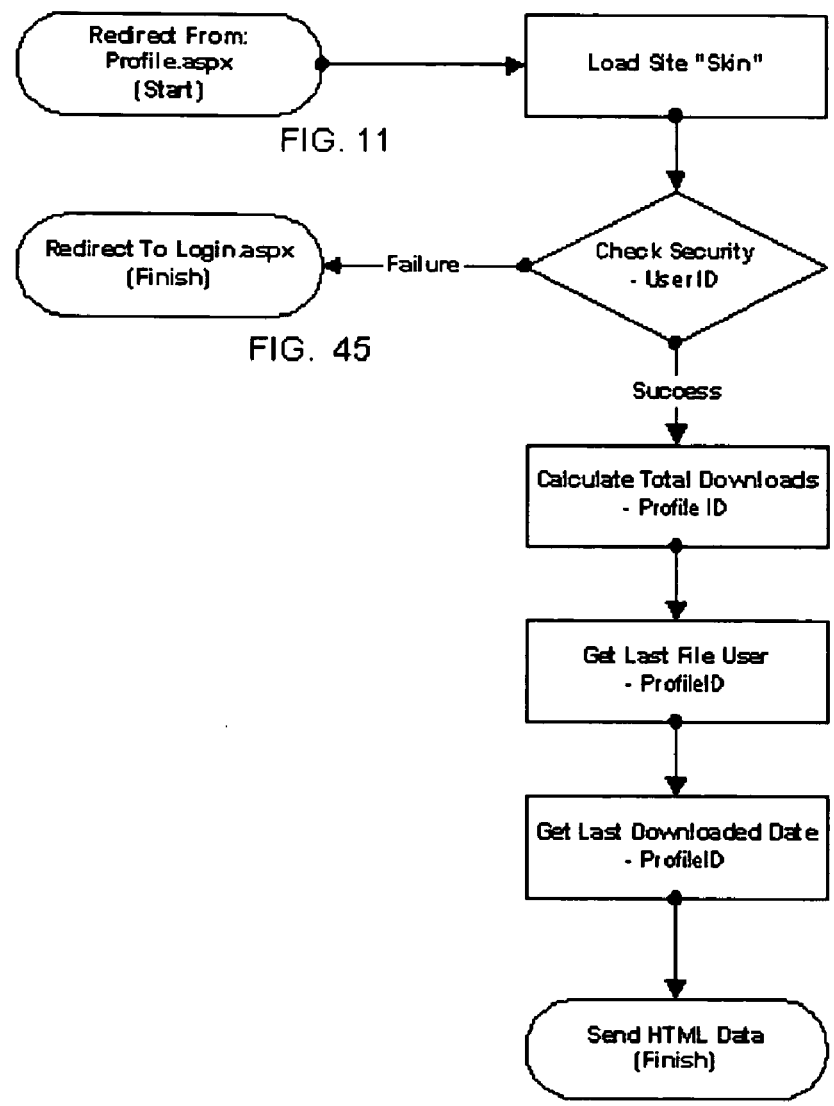

FIG. 40 - File Metrics Detail Flow Chart
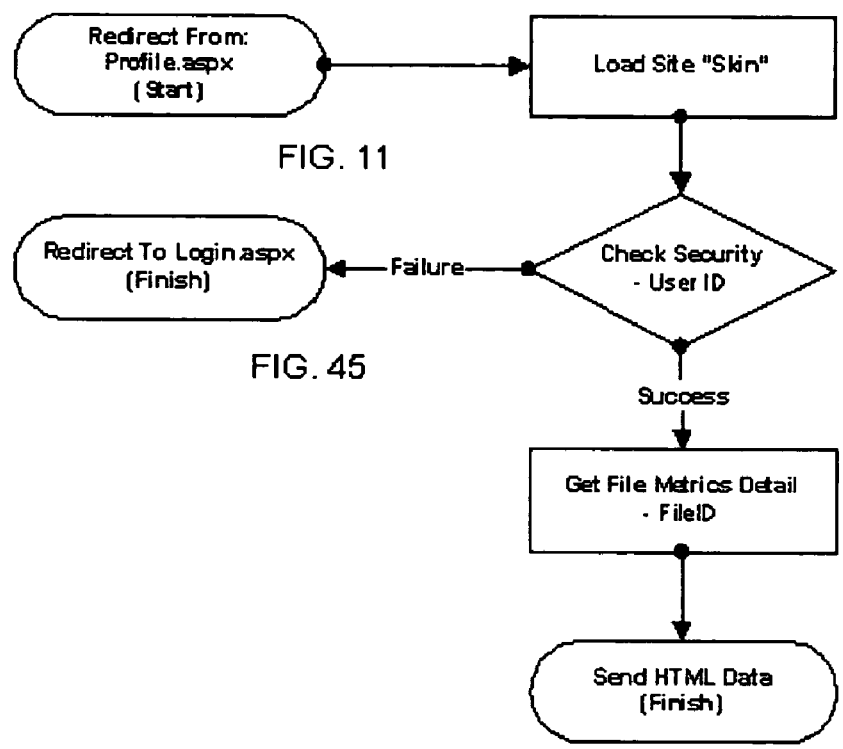

FIG. 41 - Profile Permitted Users Flow Chart
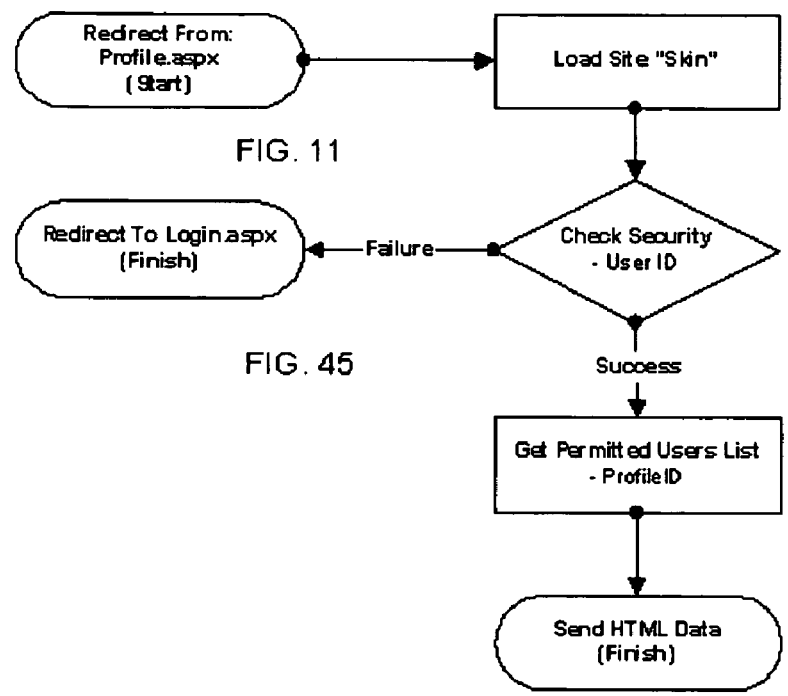

FIG. 42 Representative Permissions for a Single Username

Sample Username Permissions for john@doe.com at his site/enrolling location, i.e. login location

| Internal | Access Permissions | | | | | Activity Permissions | |
|---|---|---|---|---|---|---|---|
| | Profile Access | View Access | Inclusion | Exclusion | Section Access | Data Field Access | Site and Username Activity Permissions | Profile and Username Activity Permissions |
| john@doe.com | All | Software Category Only | N/A | Company IPO | All | All | All | All |

Sample Access and Activity Permissions for john@doe.com for Partner #1 Shared Profiles and Views

| External | Access Permissions | | | | | Activity Permissions | |
|---|---|---|---|---|---|---|---|
| | Profile Access | Inclusion | Exclusion | Section Access | Data Field Access | Site and Username Activity Permissions | Profile and Username Activity Permissions |
| john@doe.com | Software Industry Only | None | Hardware ABC Company | XYZ Software Company | All | All, except Partner Comments | All except remove access to views | All except, remove global edit and access to change history |

Sample Access and Activity Permissions for john@doe.com for Partner #N Shared Profiles and Views

| External | Access Permissions | | | | | Activity Permissions | |
|---|---|---|---|---|---|---|---|
| | Profile Access | Inclusion | Exclusion | Section Access | Data Field Access | Site and Username Activity Permissions | Profile and Username Activity Permissions |
| john@doe.com | Acme Company Only | None | None | Base Template Sections Only | Remove Valuation from Funding Section | All except remove access to file tools | All except remove ability to change disclosure level |

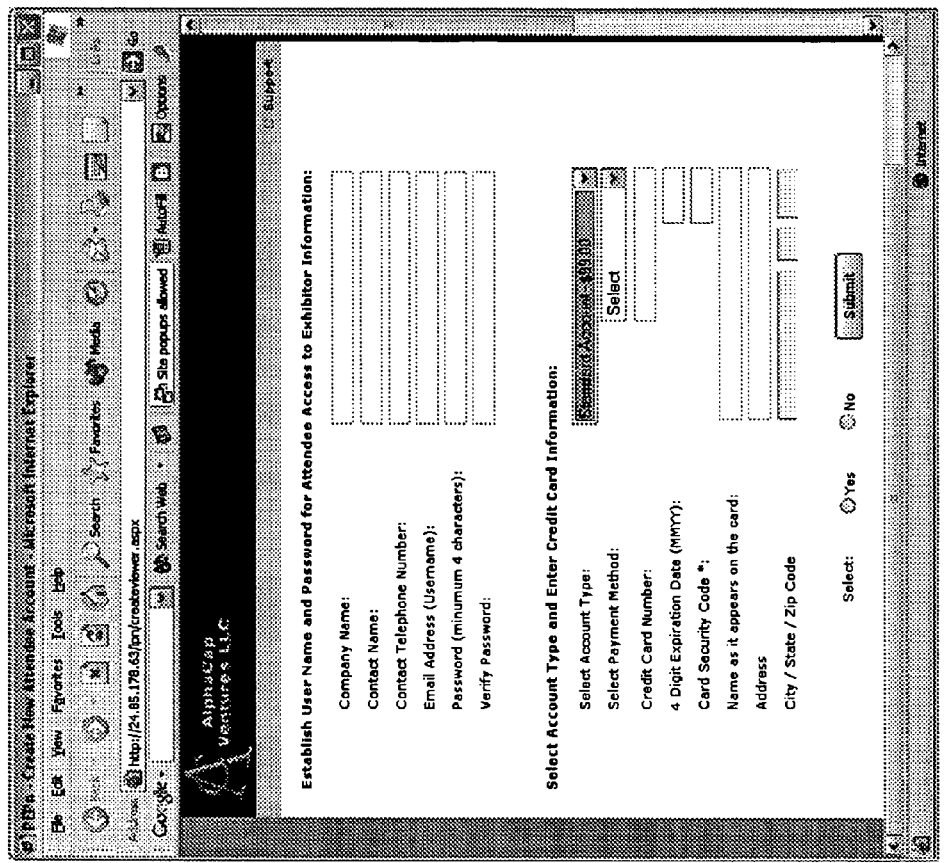
FIG. 43 Guest Username Registration Screen Shot

FIG. 44 - Guest Username Registration Flow Chart

FIG. 45 - Login Flow Chart
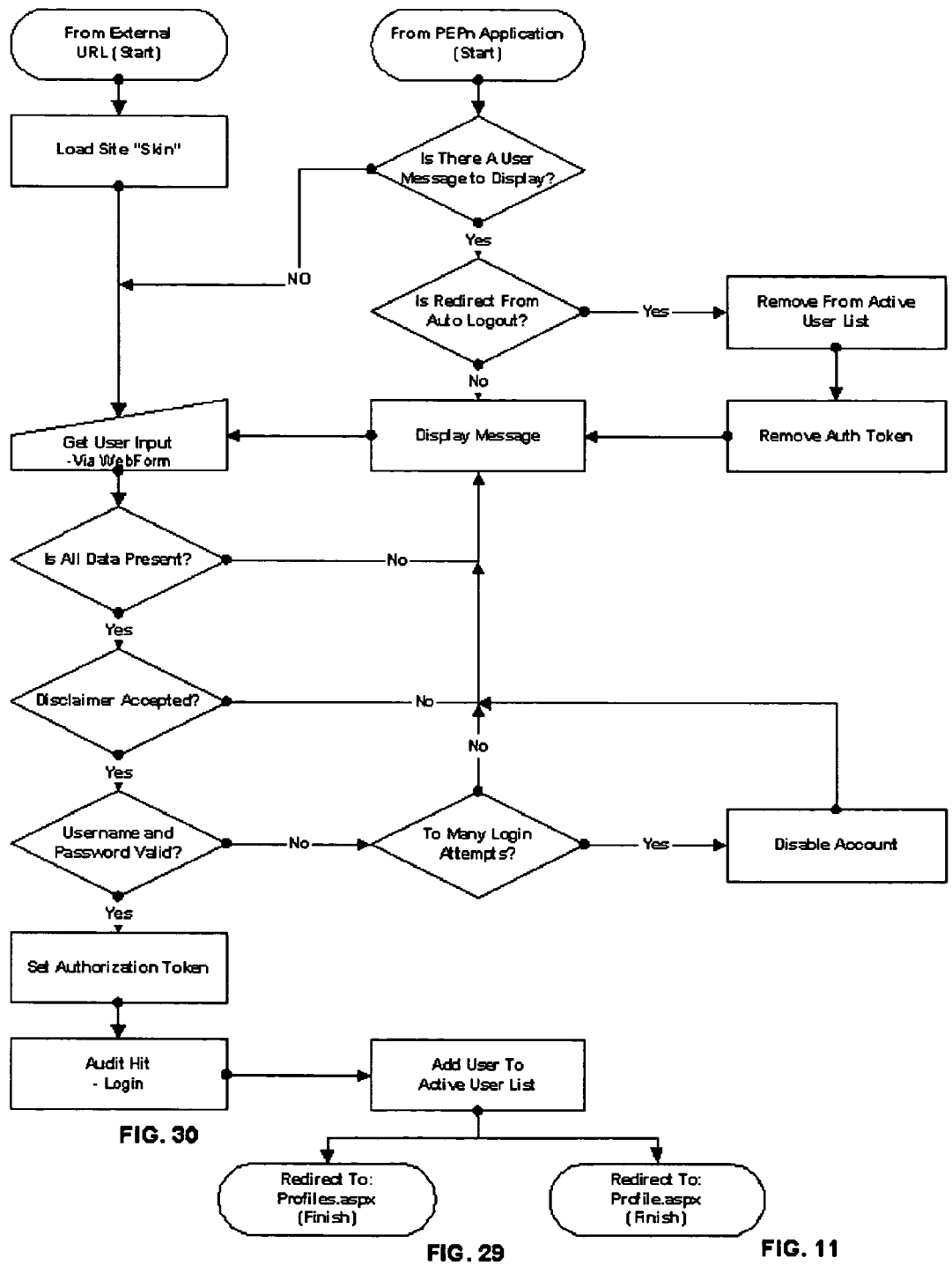

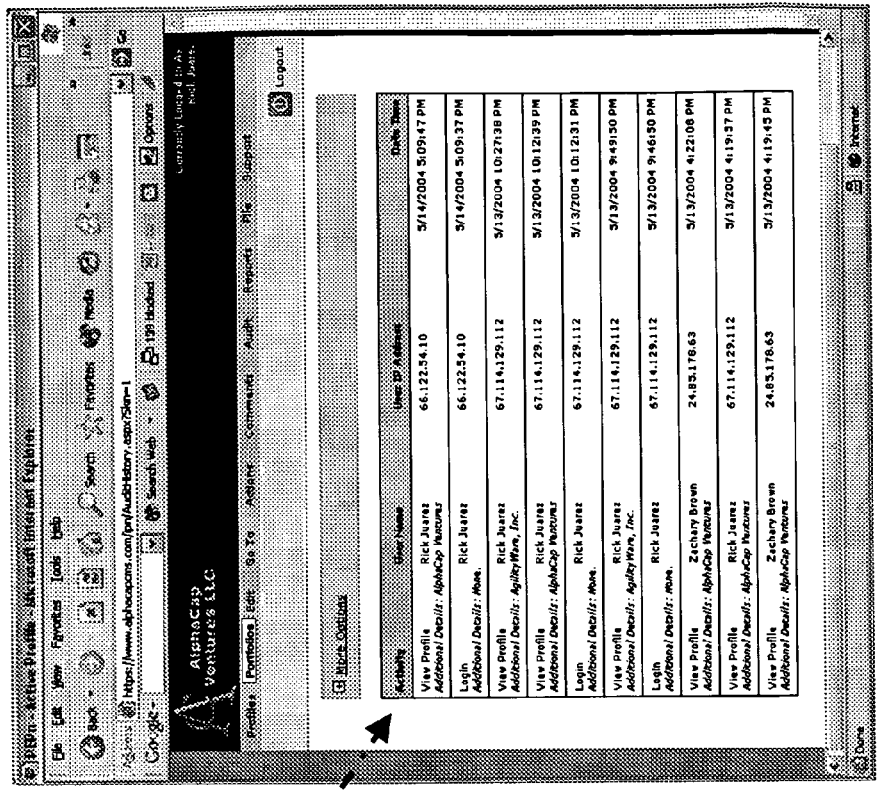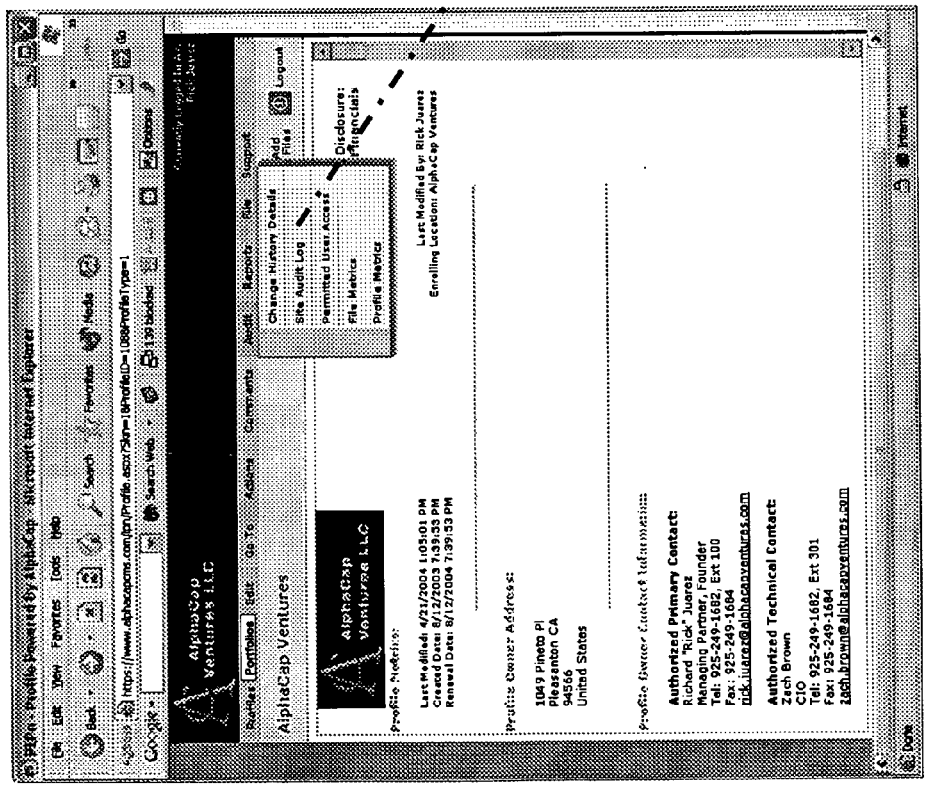
FIG. 46 Site Audit History Log Screen Shot

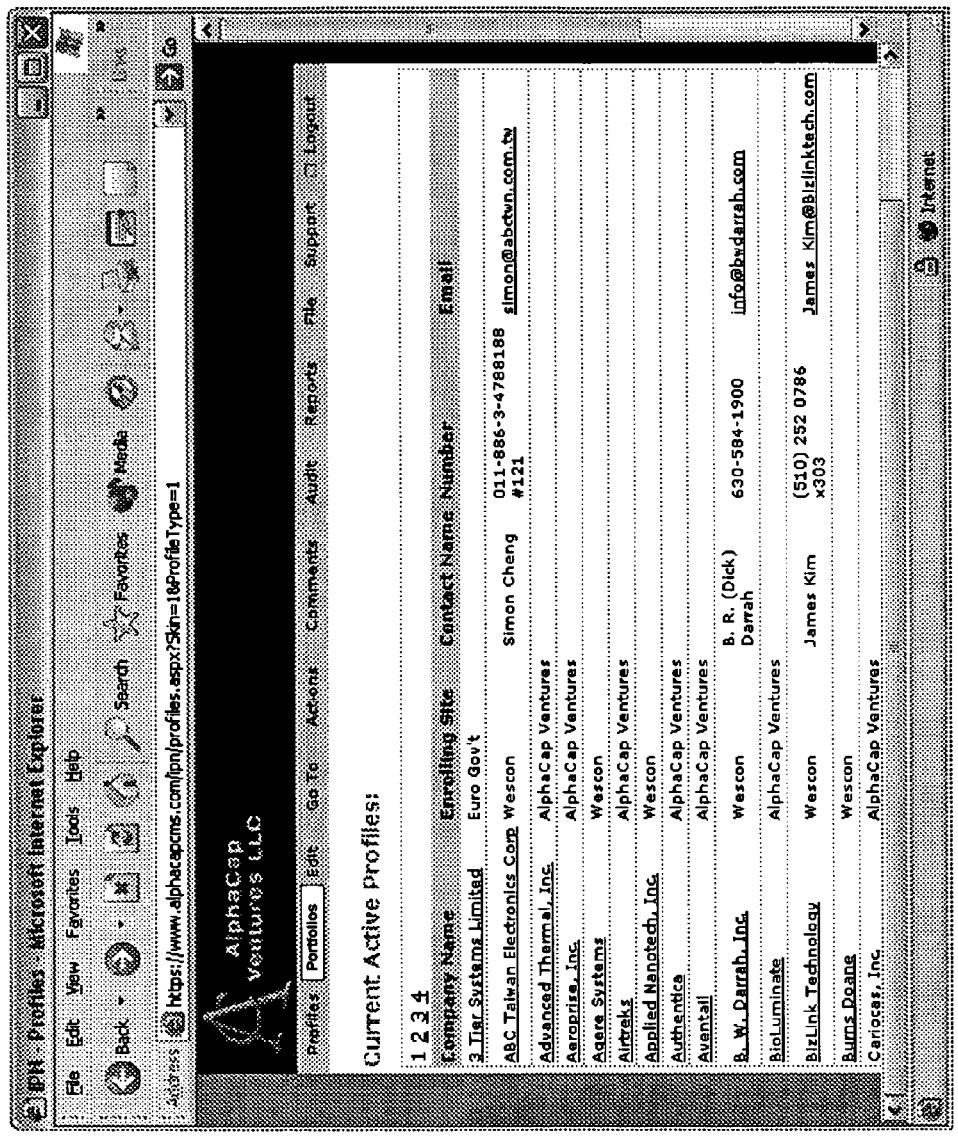
FIG. 47 Summary List of Profiles for a Provider Type Username Screen Shot

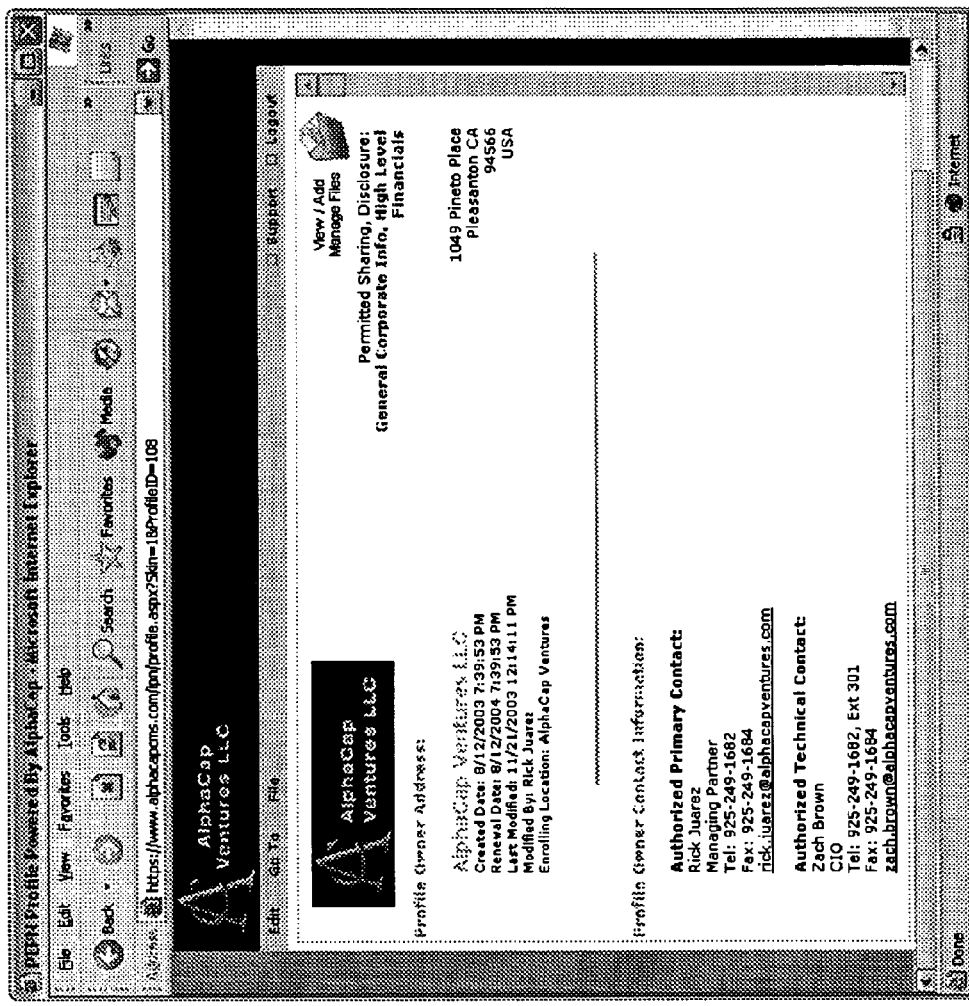
FIG. 48 - Sample Profile for a Consumer Type Username Screen Shot

FIG. 49 Edit Boxes Screen Shots
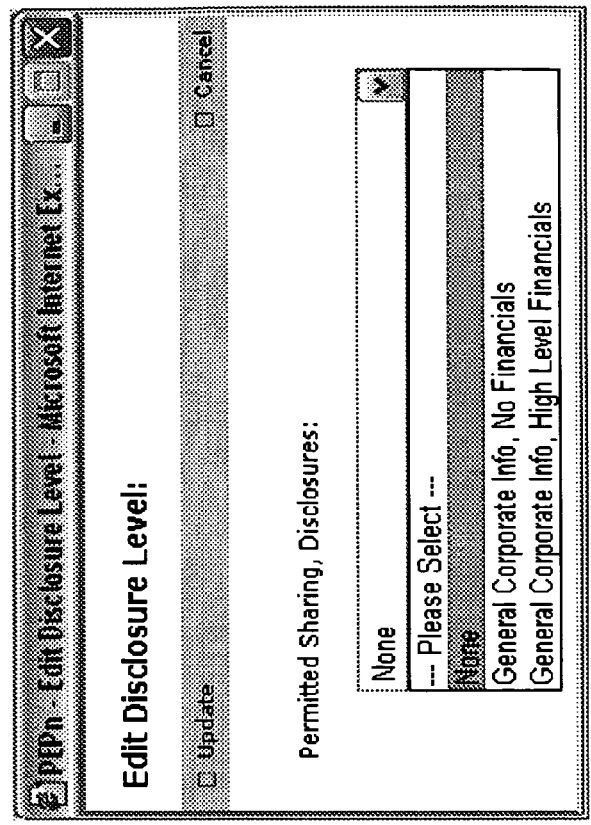
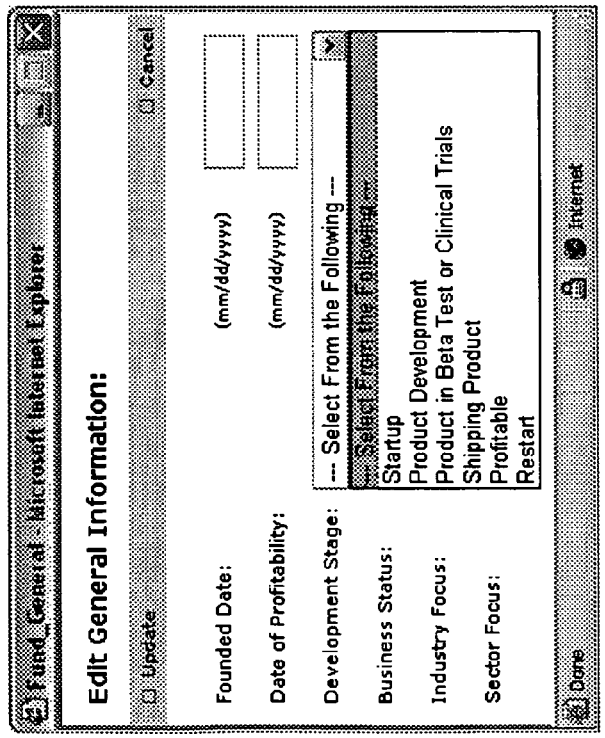

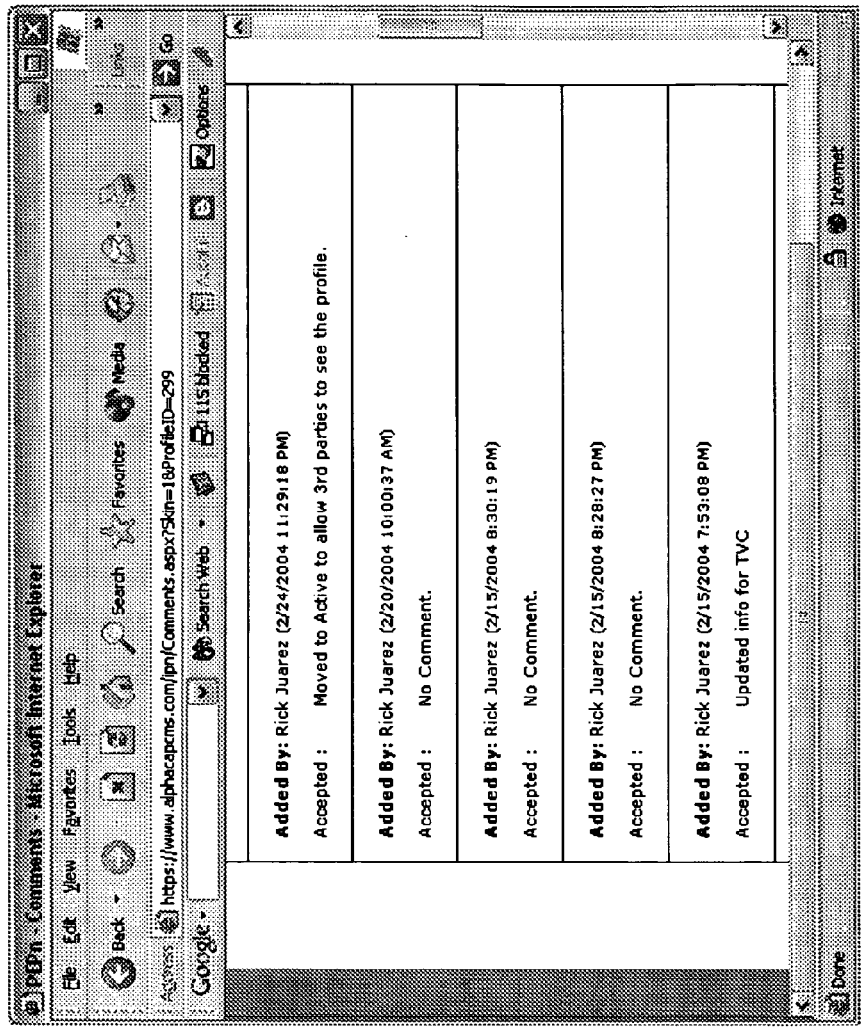
FIG. 50 View Comments Screen Shot

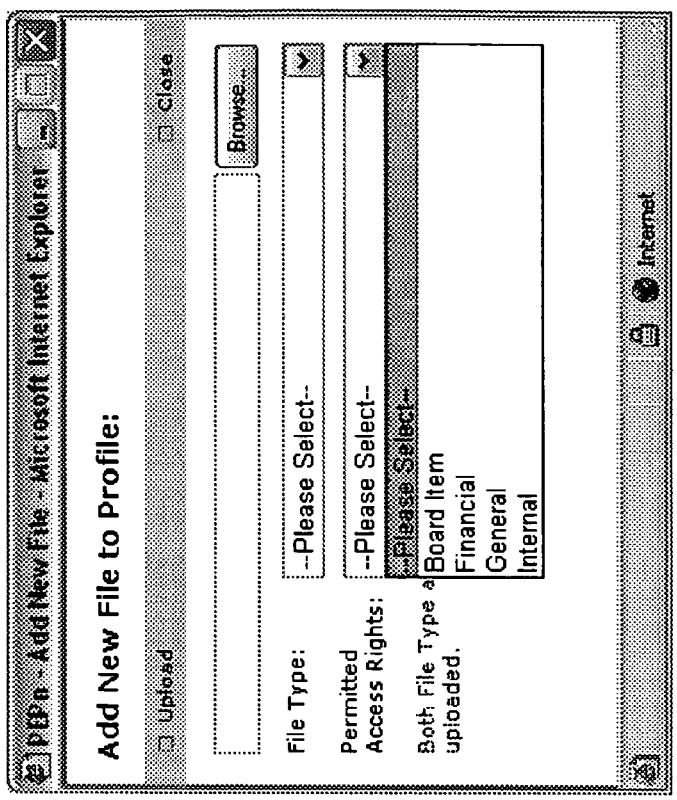
FIG. 51b Access Rights
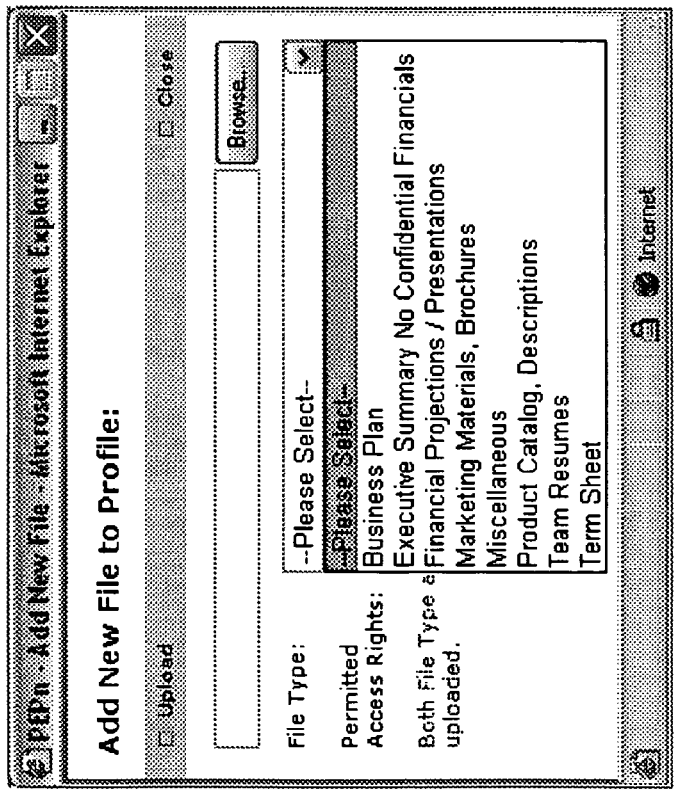
FIG. 51a File Type

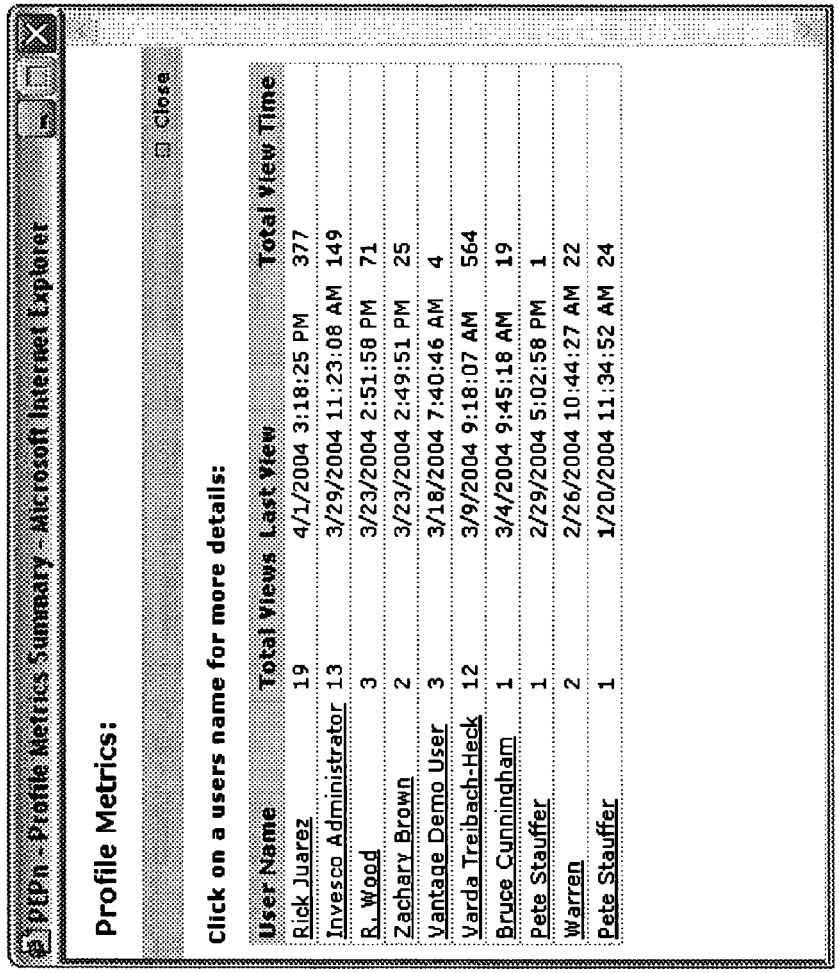
FIG. 52 Profile Metrics Summary Screen Shot

FIG. 53 Profile Metrics Detail Screen Shot

Profile Metrics Details:

Usage Details For: Rick Juarez

| View Start | View End | Total Time |
|---|---|---|
| 4/25/2004 9:07:29 PM | 4/25/2004 9:07:29 PM | 0 |
| 4/25/2004 9:04:53 PM | 4/25/2004 9:27:00 PM | 23 |
| 4/22/2004 10:37:47 AM | 4/22/2004 11:37:00 AM | 60 |
| 4/19/2004 9:57:33 PM | 4/19/2004 10:03:36 PM | 6 |
| 4/14/2004 7:31:10 PM | 4/14/2004 8:12:01 PM | 41 |
| 4/11/2004 8:25:01 PM | 4/11/2004 8:51:00 PM | 26 |
| 4/7/2004 3:04:44 PM | 4/7/2004 3:46:01 PM | 42 |
| 4/7/2004 2:02:35 PM | 4/7/2004 2:03:05 PM | 1 |
| 4/7/2004 1:52:51 PM | 4/7/2004 1:53:41 PM | 1 |
| 4/4/2004 12:36:44 PM | 4/4/2004 3:31:00 PM | 175 |
| 4/2/2004 10:23:52 PM | 4/2/2004 10:45:01 PM | 22 |
| 4/2/2004 7:35:51 PM | 4/2/2004 8:18:00 PM | 43 |
| 4/2/2004 7:22:52 PM | 4/2/2004 7:59:00 PM | 37 |
| 4/2/2004 11:59:28 AM | 4/2/2004 12:21:00 PM | 22 |
| 4/1/2004 9:36:59 PM | 4/1/2004 10:01:00 PM | 25 |
| 4/1/2004 3:22:13 PM | 4/1/2004 4:22:57 PM | 60 |

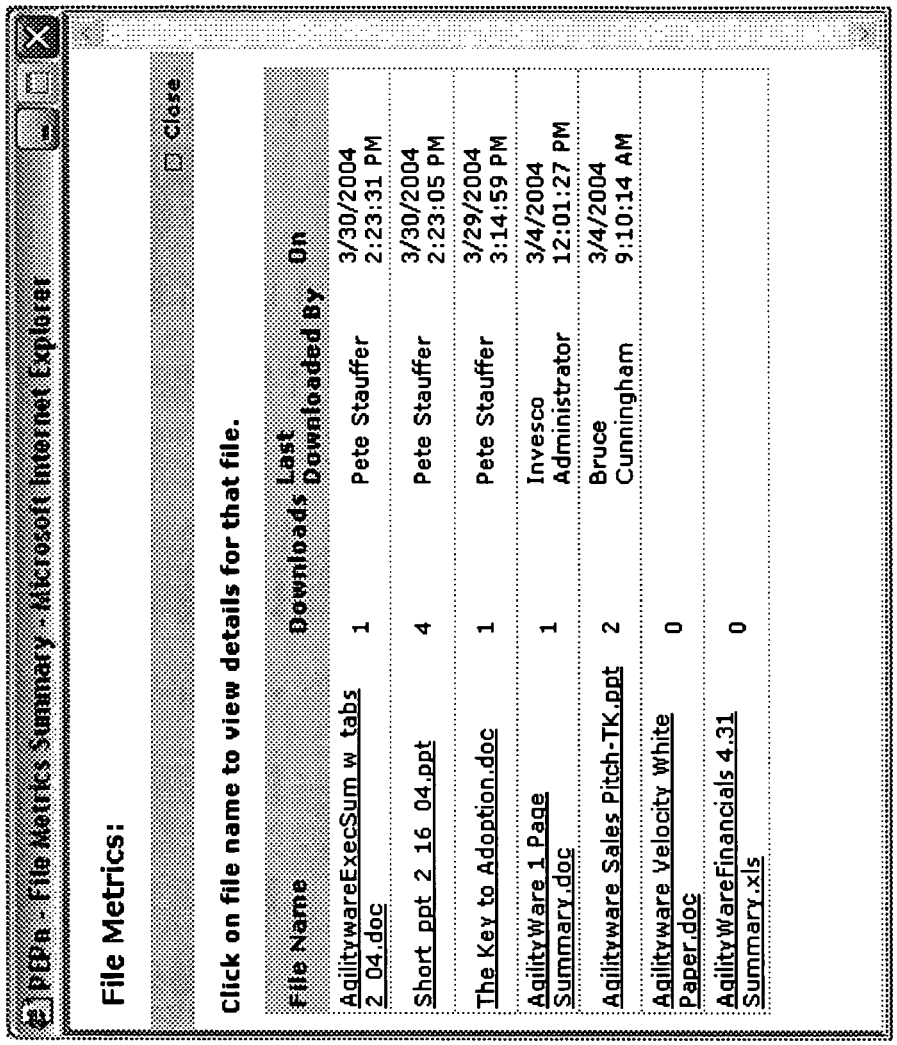
FIG. 54 File Metrics Summary Screen Shot

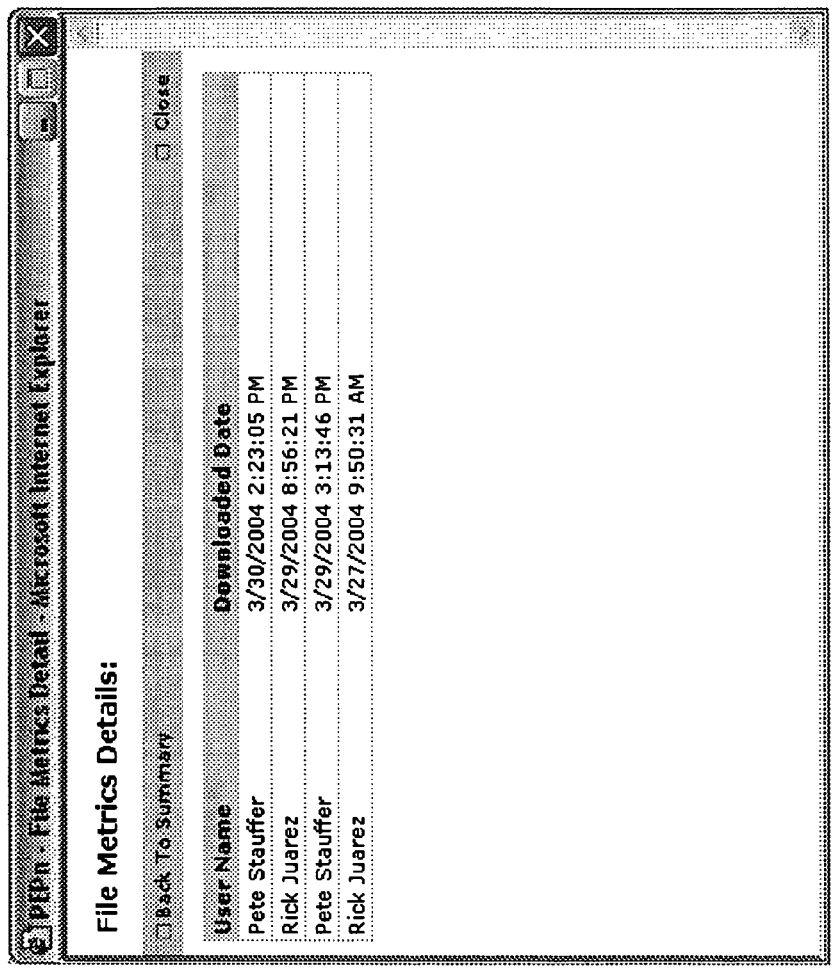
FIG. 55 File Metrics Detail Screen Shot

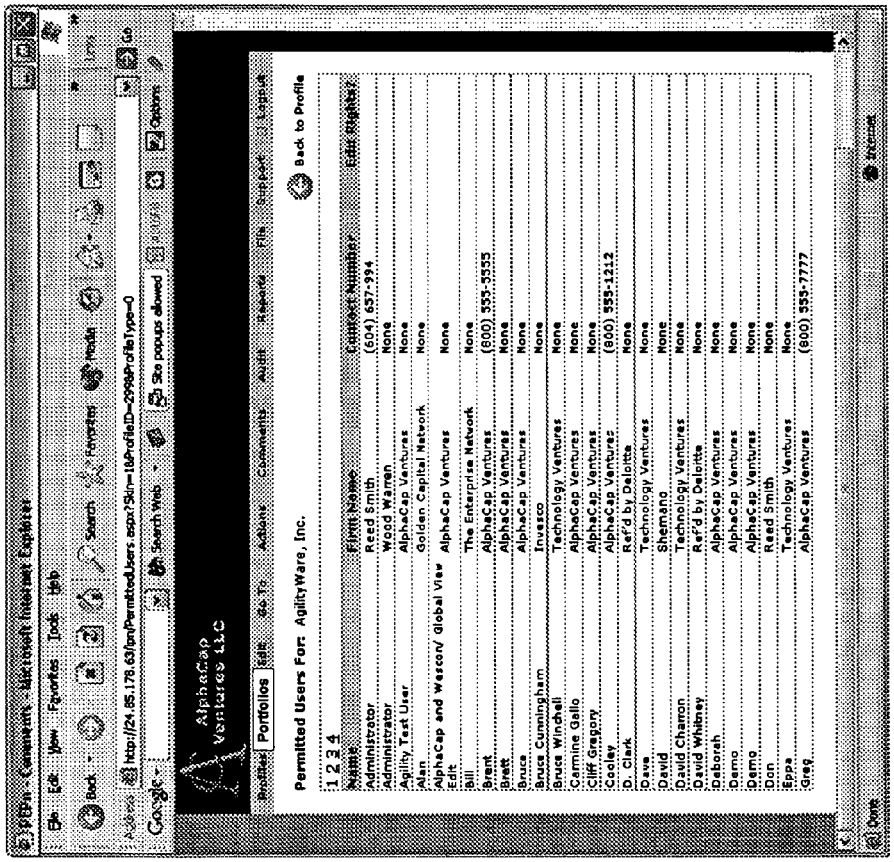
FIG. 56 Profile Permitted Users Screen Shot

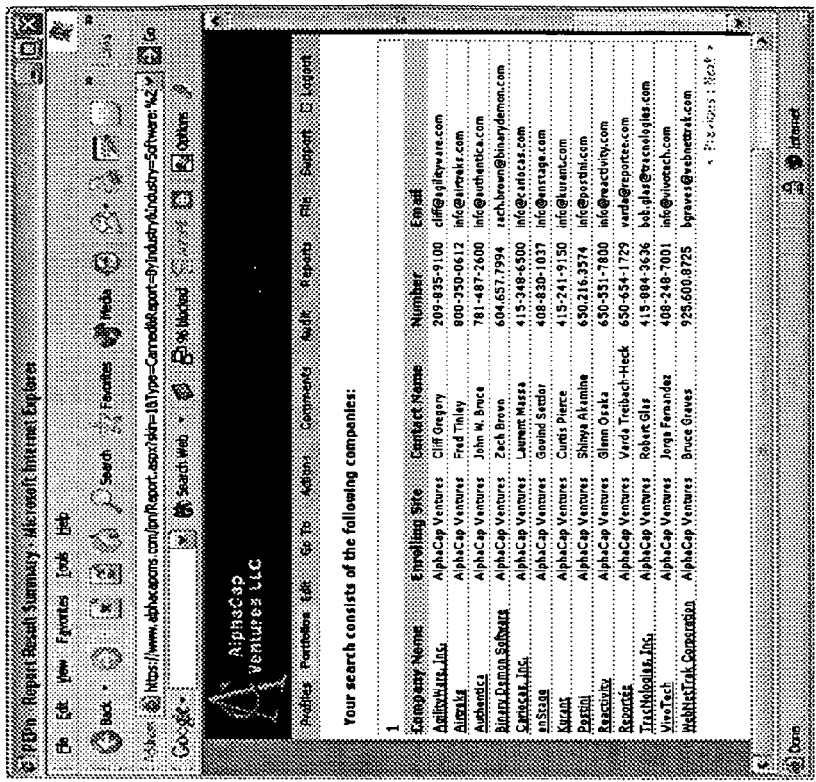
FIG. 57b - Report, Search Results
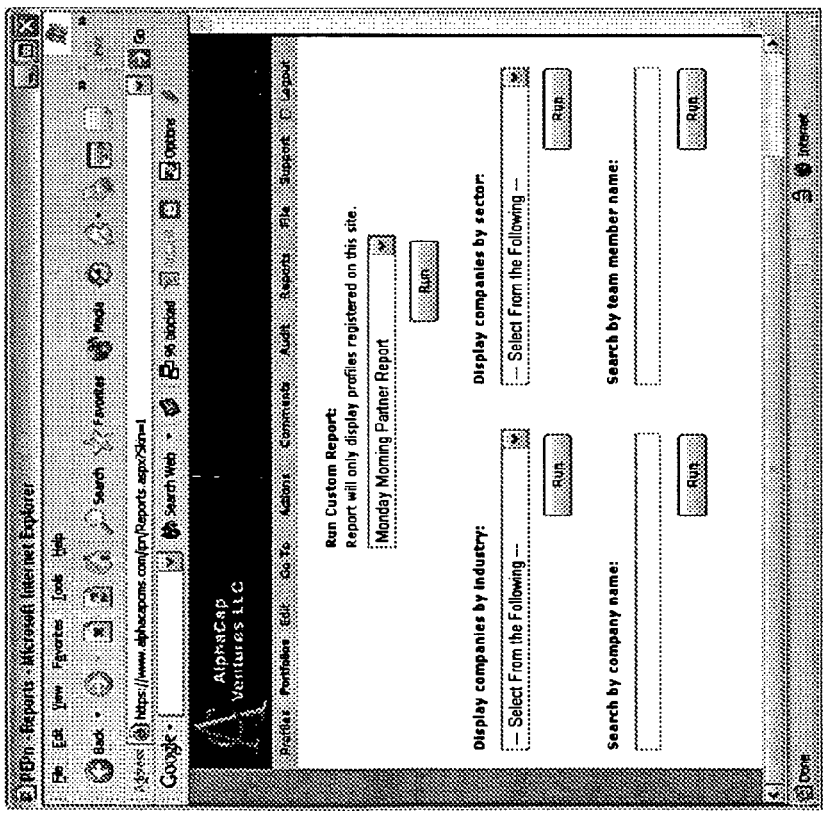
FIG. 57a - Report Creation, Search Tools

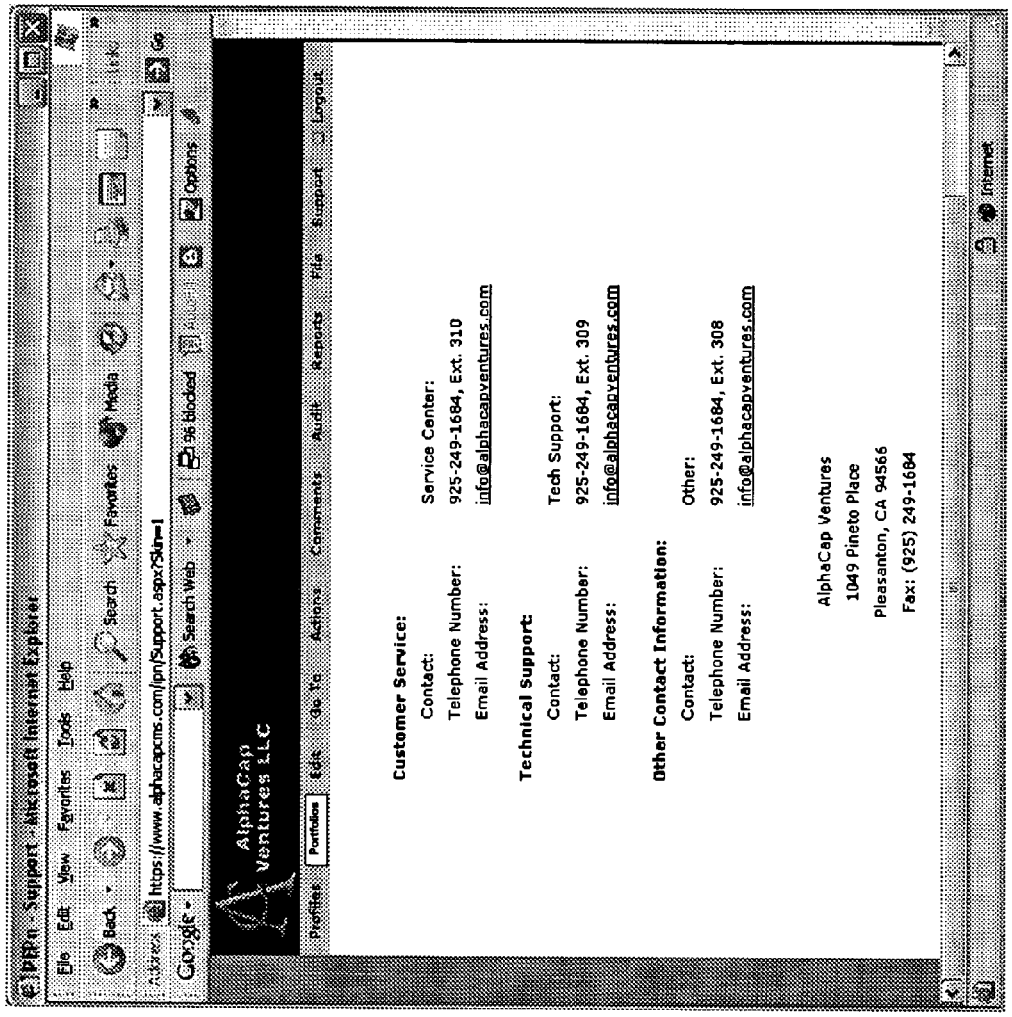
FIG. 58 Support Page Screen Shot

PRIVATE ENTITY PROFILE NETWORK

This application claims the benefit of U.S. Provisional Application No. 60/528,749, filed Dec. 10, 2003.

BACKGROUND OF THE INVENTION

1. Technical Field

This invention relates generally to private equity and debt markets, and more particularly to managing, tracking and distributing resource consumers' account, company, and relationship information in such markets.

2. Discussion of Prior Art

In the equity and debt funding business a "resource provider" (provider) is a party, who may be a venture capitalist, a bank, an accounting firm, a law firm or other business partner, that provides capital, assets or services. A "resource consumer" (consumer) is a party, typically an emerging growth company, that is seeking these resources. Resource providers and consumers agree what information the consumers are to deliver in exchange for being considered to receive resources from the providers. However, the formatting of information and the delivery mechanisms are not standardized. Currently, consumers may deliver information via ground mail, e-mail, online forms, FAX, teletext, etc. The current methods and processes typically require duplicative and costly data entry by both providers and consumer. In order to create more semi-homogenized data, providers currently must collect, re-enter, and format data submitted by consumers. The problem is illustrated in FIG. 1. Consumers often receive resources from multiple providers. Consumers receiving duplicative information requests from different resource providers must duplicate the efforts of producing and delivering the same information to the different resource providers. Current methods do not allow a single consumer to efficiently distribute the same digital information and updates to multiple providers using a single platform and/or user interface. Despite the growing demand for more digital information, attempts to automate the digital distribution of consumer information have failed. This is largely due to the fact that individual software or system deployments by providers currently require consumers to reenter and/or resubmit their same data into multiple stand-alone systems that do not share information. This creates additional time-consuming and expensive work for the consumers who do not have the resources needed to enter and re-enter the same data multiple times in order to satisfy their providers. It is currently difficult to share and distribute consumer information among providers because 1) the data is not semi-homogeneous, 2) providers often have additional and special information requests, and 3) no platform or neutral third party administrator exists to regulate and control the sharing of data submitted by consumers among and between interested parties. Thus, there is a growing need and strong desire among providers to obtain more semi-homogeneous and digital data directly from consumers.

There is also a growing demand for more strict controls over the tracking of submitted data and changes made to data. Companies, investment mangers, plan sponsors, and fiduciaries of all types are increasingly being required to demonstrate higher levels of fiduciary oversight and control of such information, or else risk liability to criminal and civil penalties.

Previous methods of obtaining and managing consumer information have included: external research; proprietary information databases or exchanges (e.g., M&A transactions, IPO data, deal listings, etc.); portals (e.g., MSN, Yahoo); collaboration tools (e.g., chat boards); secure file transfer and management services; virtual data rooms; work flow products; contact management platforms (e.g., Outlook, Onyx); customer and sales force relationship management tools; and back-end systems (e.g., SAP, Peoplesoft). These previous methods do not provide sufficient controls to adequately track and manage the submissions and changes made by either or both providers and consumers. Existing methods and solutions do not allow providers and other interested parties to efficiently organize and track specific categories or collections of profiles in real-time. Providers and others typically need to track groups of profiles by category. In addition, providers must maintain accurate records tracking how they have supervised these various categories of profiles. To address these challenges, many providers and others must first dedicate resources to collect, update, organize the underlying consumer profile data and then must spend additional dollars to manually organize and update the summary files and documents that they use to track and demonstrate oversight of the various categories or groups of consumer profiles.

Public equity and debt market needs are addressed by services such as Edgar, Hoovers, Bloomberg, and Yahoo, whose on-line sites post information for retrieval, sometimes for a fee, through web browsers. However, these public market solutions do not address business processes by which private equity firms and debt providers manage and control consumer information on a relationship-by-relationship basis. For example, these solutions do not align data collection and management responsibilities in an efficient and auditable manner. In short, there is not a comparable "private equity" or debt marketplace solution to capture, collect, organize, maintain, monitor, and control access to information flowing into a provider organization. Instead, previous solutions often contain secondary data resulting from efforts of individuals who research and collect information on a company (aka consumer), e.g., Venture Source. Secondary data is not reliable for evaluating or managing the performance of prospect and/or portfolio of relationships. The Sarbanes-Oxley Act and other acts require greater levels of fiduciary oversight for alternative asset classes, e.g., venture capital, hedge funds, private equity, etc. ERISA standards require managers to demonstrate adequate fiduciary oversight of capital deployed in private equity investment vehicles. Failure to exercise such oversight could incur criminal and civil penalties.

Finally, providers must meet the above requirements with reduced budgets and available resources. A recent study by the Private Equity Industry Guidelines Group (PEIGG) noted that the available investment management staffs at general partner firms, i.e. providers, are often small. These factors point to a growing need for automation to help providers collect, input, track, manage and distribute consumer data. The PEIGG report further highlighted the fact that the investors to whom providers must report to are demanding access to greater amounts of digital information rather physical hard copies.

There remains therefore a need for a system which will enable senior providers to free up more time to search for, identify, and qualify potential prospects, to exercise greater levels of due diligence on prospective and existing portfolio companies, and to do so with fewer management dollars.

SUMMARY

A method of using an electronic database system for collecting resource consumer information, organizing the information into standardized profiles, and managing the profiles to enable accessing the information as desired comprises the steps of defining a data collection template of fields for a standardized profile of resource consumer information desired by a resource provider; allowing at least one user to input information into the fields; storing the information as a profile in an electronic database system; and allowing at least one authorized party to access information stored in the system.

The method(s) reduce cost or enable real-time tracking and distribution of information preferably by: 1) aligning the responsibilities of consumers and providers; 2) enabling the semi-homogenous capture of information; 3) reducing the need for duplicative data entry; 4) streamlining data management, tracking, and distribution; and 5) utilizing a neutral third party platform administrator to oversee the business rules, intra- and inter-firm data sharing permissions, and compliance requirements.

In one approach incorporating the alignment of data entry and management duties, consumers accept lead responsibility for the entry and update of their digital "primary data" into semi-homogenous data collection templates or profiles specified and created by providers. This can reduce the need for duplicative data entry by recipients, i.e. providers and investors. It also may help providers to more rapidly compare consumer profiles within and among various industries or other groupings. Providers use and/or edit the data submitted by consumers to conduct their analyses, track progress, and report results as appropriate. This allows providers to spend more of their time on tracking down new investment ideas, raising additional capital, and reporting out to investors. Finally, providers, investors, regulators, etc. can use the data that has been submitted to exercise fiduciary oversight and track and document the progress of portfolio companies. The platform can enable exchange of digital data with users or directly with other applications, via XML, SQL, etc. All changes are preferably reflected in real-time, which permits interested parties to instantly access updated and timely information, which enables more timely oversight of consumers.

Efficient management, tracking, and distribution of common consumer information can arise through the use of semi-homogenous profiles. A profile is created for each consumer who enters their data on the platform. Profiles contain the semi-homogenous information outlined above along with optionally associated files (e.g., models, presentations), comments, and an auditable change history for each consumer relationship. The profiles consolidate the critically important information that providers need in order to exercise appropriate diligence, track investments, and demonstrate appropriate fiduciary oversight of investments. This aspect allows providers to expand their oversight capabilities while reducing the expense and time requirements of doing so.

The system's software allows consumers to attach multiple, custom provider information request sections to their semi-homogenous profile data. In one aspect a designated administrator can act as a neutral third party that manages the business rules and data sharing, distribution permissions among and between consumers and providers. Thus, consumers can submit their baseline and additional information requested by their providers on a single platform that intelligently parses and controls the distribution of their digital information in real-time. Access to their data and any other data on the platform is controlled at the individual UserName level. In one embodiment, only authorized UserNames are allowed to access specific pieces of data. UserNames are controlled by the administrator for a managed service offering embodiment of the invention. Enterprise license deployments may require the licensee to coordinate with the third party administrator.

To enable creating named categories or collections (e.g., fund name, investment manager, geography, industry, office, investment class) of profiles, tracking and managing groups of profiles within categories, and recording evidence of how providers have supervised groups of profiles, one aspect of the method provides a capability called "portfolios," by enabling the definition and deployment of real-time, customizable, management audit, tracking and compliance data collection template portfolios by the steps of: defining portfolio categories; enabling, for each defined portfolio category, the creation of portfolio records; the association of profiles with portfolio records; defining, for each portfolio category, items that will be contained in a portfolio record; allowing a party to input information into the records, and storing the information in the electronic database system; associating and appending Watch List, Pending, or Active profiles to appropriate portfolio records; and allowing the party to access, via the Internet, information stored in the system.

Portfolio categories can contain one or more populated "portfolio record" data templates. Detailed portfolio records contain preferably five key components, including: 1) a semi-homogenous category data collection and tracking template per unique, named portfolio category; 2) associated tracking and oversight file attachments; 3) comments log; 4) change history; and 5) the ability to associate specific consumer profiles with specific portfolio records within a given portfolio category. To begin with, the platform aids providers because the underlying profile information is being supplied, updated, and inputted directly by the consumers. As this "primary" information is reviewed by providers they can input information and comments on the portfolio record that documents their oversight of the collection of profiles.

One aspect of the method can reduce the time each party spends on data collection entry, re-entry, tracking and distribution of data, and deliver to consumers and providers a tangible return on investment (ROI). The ability to track submitted information via independently managed and auditable change history and site audit records provide a compliance control mechanism.

BRIEF DESCRIPTION OF THE DRAWINGS

FIG. 1 illustrates a labor intensive prior art process used by providers to create digitized and semi-homogenized consumer data;

FIG. 2 is a screenshot of a semi-homogenous profile or data template along with a list of representative sections as used in one embodiment of the invention;

FIG. 3 is a screenshot of a semi-homogenous profile that highlights the fields within a profile section;

FIG. 4 is a screenshot of a portfolio record data template including a list of sample and representative portfolio record sections;

FIG. 5 is a screenshot of preferred portfolio record fields within a portfolio record section;

FIG. 6a is a screenshot showing preferred portfolio category names, and FIG. 6b is a screenshot of a preferred associated summary list of portfolio records for a given portfolio category;

FIG. 8 is a block diagram of the logical architecture of the invention in one embodiment;

FIG. 9 is a block diagram of preferred physical architecture supporting the FIG. 8 logical architecture;

FIG. 10 is a management and administration tools site map;

FIG. 12 is a flowchart of a preferred procedure for loading accessible sections in FIG. 11;

FIG. 13 illustrates preferred major components of profile;

FIG. 14 is a flowchart of an investment information management process enabled by the invention in one embodiment;

FIG. 15 is a screenshot of a preferred login page;

FIG. 16 is a preferred consumer UserName and profile self-registration screen shot;

FIG. 17 is a flowchart of a preferred consumer UserName and profile self-creation, registration procedure;

FIG. 18 is a flowchart of a preferred profile creation procedure used by providers and other authorized UserNames;

FIG. 19 is a flowchart of a preferred edit procedure;

FIG. 20 is a flowchart of a preferred file manager procedure;

FIG. 21 is a flowchart of a preferred add file procedure;

FIG. 22 is a screenshot of a preferred file manager dialog box produced by the FIG. 20 procedure;

FIG. 23 illustrates how providers and consumers can self-regulate the level of profile information shared among authorized UserNames via the disclosure level setting;

FIG. 24 is a flowchart of preferred site level portfolio summary access and activity entitlements/permissions identification procedure for a UserName;

FIG. 25 is a flowchart of preferred portfolio record level access and activity entitlements/permissions identification procedure for a UserName;

FIG. 26 contains screen shots of a preferred change history log display that is produced by the FIG. 36 procedure;

FIG. 27 is an illustration of a preferred cascading UserName permissions/entitlements structure of the invention in one embodiment;

FIG. 28 is a flowchart of an application site map;

FIG. 30 is a flowchart of a preferred site audit history log procedure;

FIG. 31 is a flowchart of a preferred reports procedure;

FIG. 32 is a flowchart of a preferred support procedure;

FIG. 33 is a flowchart of a preferred password reset procedure; and

FIG. 34 is a flowchart of a preferred view comments procedure;

FIG. 35 is a flowchart of a preferred add comments procedure;

FIG. 36 is a flowchart of a preferred change history log procedure;

FIG. 37 is a flowchart of a preferred profile metrics summary procedure;

FIG. 38 is a flowchart of a preferred profile metrics detail procedure;

FIG. 39 is a flowchart of a preferred file metrics summary procedure;

FIG. 40 is a flowchart of a preferred file metrics detail procedure;

FIG. 41 is a flowchart of a preferred profile permitted users procedure;

FIG. 42 is a table showing preferred flexible and granular access and activity permissions/entitlements for a single UserName;

FIG. 43 is a screenshot of a preferred guest UserName self-registration page;

FIG. 44 is a flowchart of a preferred guest UserName registration procedure;

FIG. 45 is a flowchart of a preferred login procedure;

FIG. 46 is a screenshot of a preferred site audit history log produced by the procedure of FIG. 30;

FIG. 47 is a preferred summary profile screen for a provider type UserName produced by the FIG. 29 procedure;

FIG. 48 is a screenshot of a preferred profile for a consumer type UserName produced by the FIG. 17 procedure;

FIG. 49 shows screenshots of two representative edit boxes produced by FIG. 19 procedure;

FIG. 50 is a screenshot of a preferred view comments display produced by the FIG. 34 procedure;

FIGS. 51a and 51b are screenshots of preferred add file dialog boxes produced by the FIG. 21 procedure;

FIG. 52 is a screenshot of a preferred profile metrics summary produced by the procedure of FIG. 37;

FIG. 53 is a screenshot of a preferred profile metrics detail produced by the procedure of FIG. 38;

FIG. 54 is a screenshot of a preferred file metrics summary produced by the procedure of FIG. 39;

FIG. 55 is a screenshot of a preferred file metrics detail produced by the procedure of FIG. 40;

FIG. 56 is a screenshot of a preferred profile permitted users produced by the procedure of FIG. 41;

FIG. 57 shows screenshots of preferred reports tools and representative output produced by the procedure of FIG. 31; and FIG. 58 is a screenshot of a preferred support page produced by the procedure of FIG. 32.

DETAILED DESCRIPTION

An embodiment of the invention uses customizable data collection templates on a scalable hardware and software platform to collect and manage resource consumer information and to build "semi-homogenous profiles" as illustrated in FIGS. 2 and 3, and "portfolio records" as illustrated in FIGS. 4-7.

Phase I: Setting Up the Platform

The system software (FIG. 8) and hardware (FIG. 9), as explained below, are set up preferably to meet specifications of the particular resource provider's deployment. Preferably, a neutral third party administrator, rather than the resource provider, has custody, and maintains security, of the platform, as explained further below. Management procedures and their associated user interface screens (FIG. 10 box 10a) are used in configuring the deployment.

Profile Templates

Figure 7B:
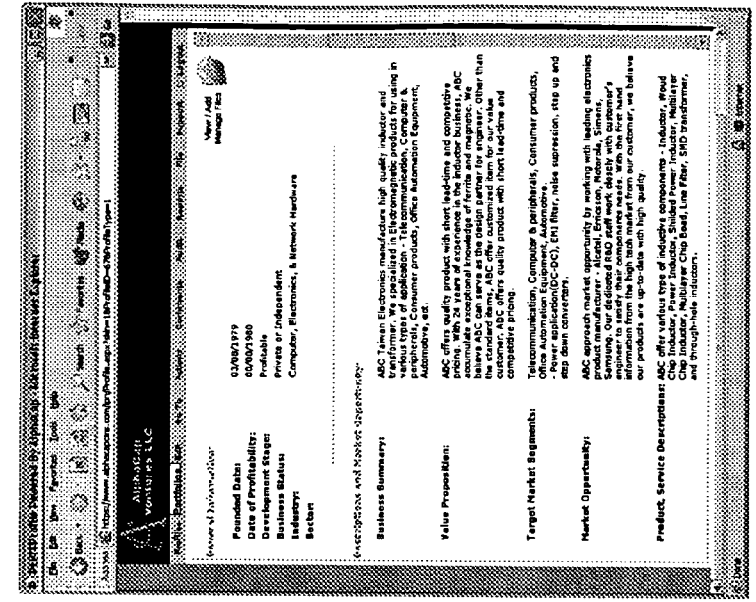
FIGS. 7a and 7b are screenshots showing a portfolio record and how the invention in one embodiment can associate consumer profiles with specific portfolio records.
Figure 7A:
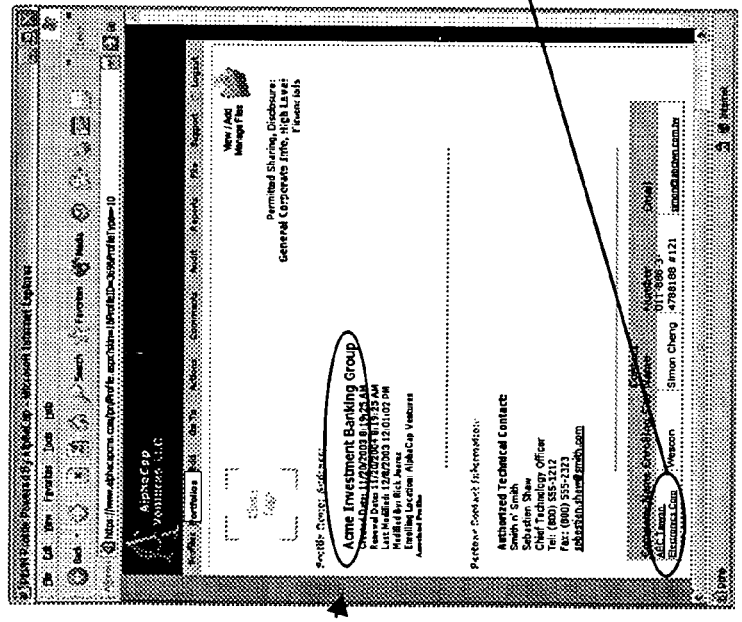
Figure 11:
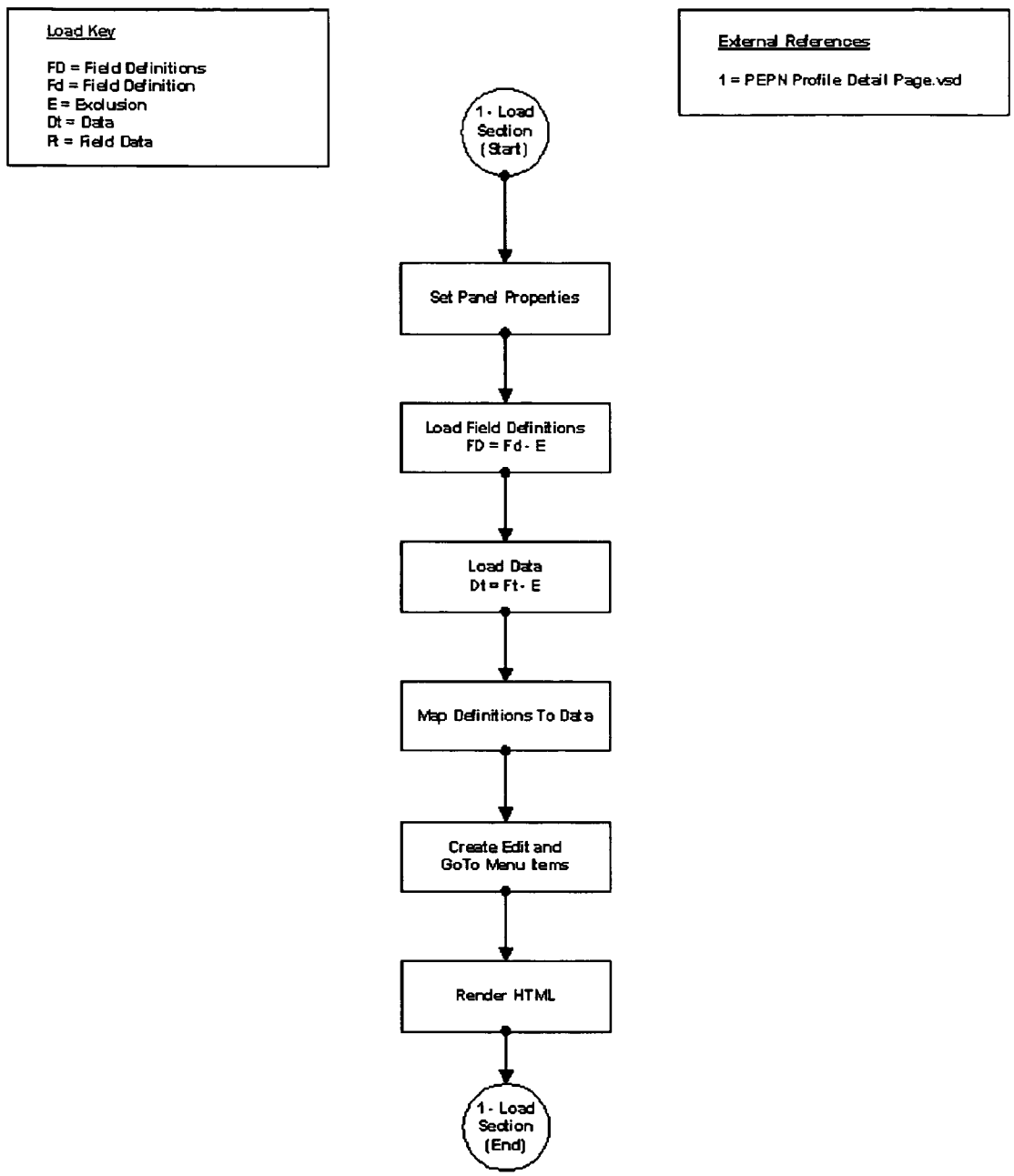
FIG. 11 is a flowchart of a preferred detailed profile level access and activity entitlements/permissions identification procedure for a UserName.

A blank default information collection template including compartmentalized sections (FIG. 2) and fields (FIG. 3), generated by the procedures of FIGS. 11 and 12, is adopted and typically modified by a deploying provider, to be filled in by a resource consumer to form a semi-homogenous profile. The default template sections include a company logo, a company name, address, company/consumer contact information, partner/provider contact information, general business descriptors, description of the company, description of their associated markets and products, current status, management team, advisory board and board composition, funding and capitalization table information, list of intellectual property, financial information, comments, lists of the names of vendors who are providing services to the firm, and specialized and/or confidential information sections which have restricted access.

A profile's composition can be tailored by an individual consumer or provider. Fields or entire sections may be added or removed. Preferably an embodiment can accommodate a practically unlimited number of profiles.

As illustrated in FIG. 13 and further explained below, a profile preferably consolidates into one auditable record 1) the semi-homogenous data template, 2) file attachments which can be added and viewed e.g. models, presentations, 3) the profile's change history, detailing any changes made to any sections and/or fields, and 4) profile-specific comments which may be added and viewed as needed. A consolidated profile gives providers information with which to exercise and demonstrate fiduciary oversight of their consumers, investments, etc.

Certain required information (e.g., business plans, valuation data) is confidential. Consumers and providers are very concerned about potential data loss or unauthorized access by others to their data. Consumers and providers often need to parse and send varying levels of detailed information to many different audiences or constituents. The release of such information should be strictly controlled and recorded.

UserNames

To protect the integrity of collected information, the invention preferably defines UserNames and associated access and activity entitlements (FIG. 10 box 10b). Each person who uses the system preferably is assigned a unique UserName entitling that person to specific access and activities. Preferably, varying levels of access and activity entitlements can be granted to each UserName. Three preferred types or groups of UserNames are: consumers, providers, and guests (e.g., third party partners, vendors, conference attendees, etc.). Preferably an embodiment can accommodate a practically unlimited number of UserName groups. Each group of UserNames is assigned default access and activity entitlements or permissions, further described below, typically modified by the provider. Group entitlements may be further modified for each UserName within the group. A deploying provider typically submits UserName setup instructions to a neutral third party administrator who implements the instructions.

Phase II: Establishing Consumer Accounts, Filling in Profiles

Figure 16:
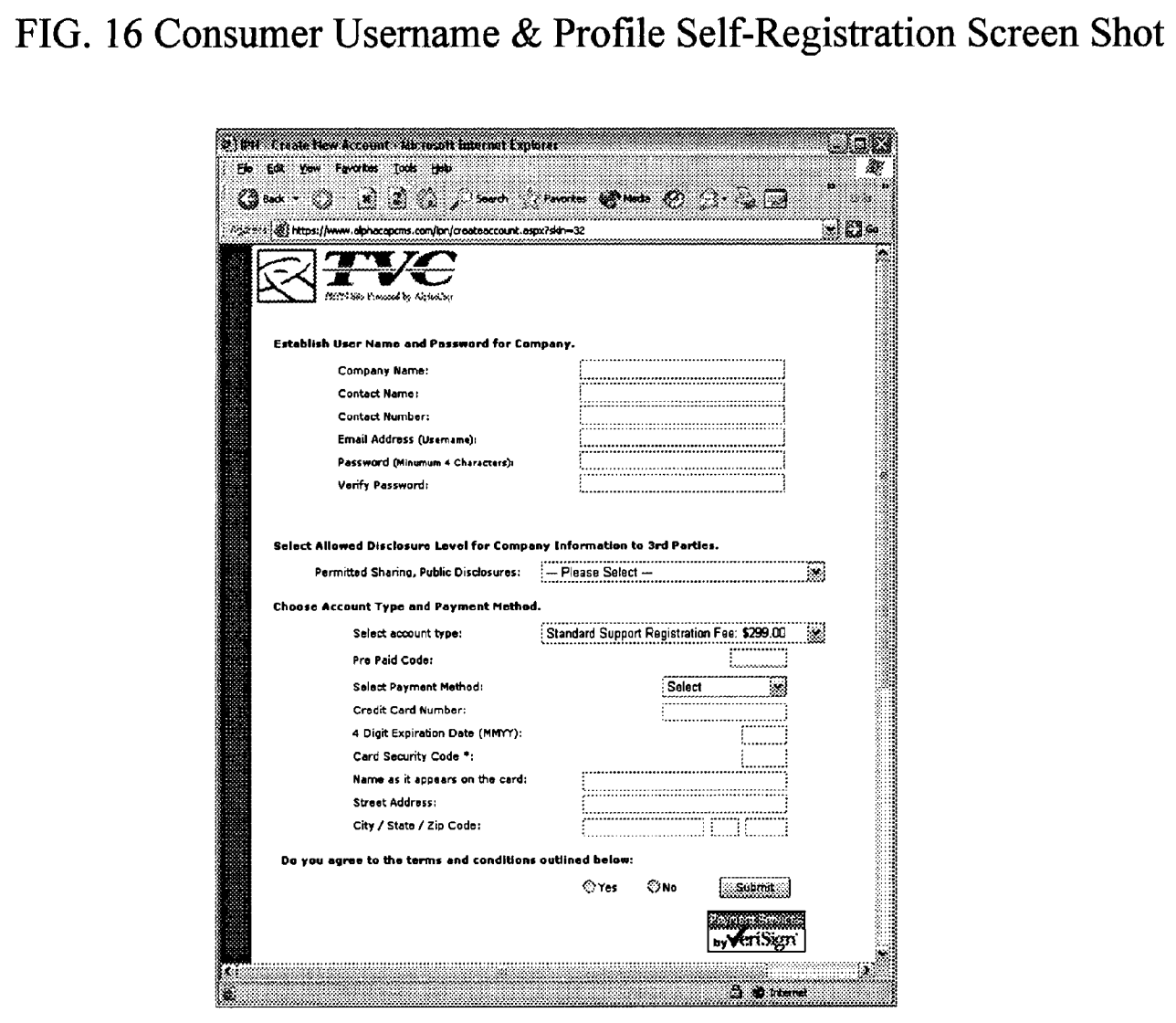

The embodiment preferably accommodates computer terminals where consumers, FIG. 14, can register their UserNames and submit their profile information. FIG. 15 is a screenshot of the sign-in page of an example provider's website. Consumers and guests typically self-register and establish their own UserName and password credentials. A new consumer clicks on "register new account" which brings up a registration page, as shown in FIG. 16, generated by the FIG. 17 "Consumer UserName and Profile Self-registration" procedure. The FIG. 16 registration page prompts the new consumer to provide a UserName and password, select disclosure levels for third party UserNames, and pay by credit card for submitting his company profile. At the bottom of the page, the consumer clicks "yes" to accept the terms and conditions for use of the service and then clicks "submit" to complete the UserName and payment portion of the registration process. The FIG. 16 form is checked by the FIG. 17 procedure. If the form was filled out correctly and the credit card payment processed properly, the procedure creates a new UserName. In some cases, a fee from a registering consumer may be waived.

Upon creation of a UserName, a blank template, as illustrated in FIG. 2 and FIG. 3, is opened and displayed for completion by the just-registered consumer. The newly created—but so far empty—profile is associated with the provider's deployment or site and the UserName is added to the list of valid active users for the provider site. The UserName is preferably assigned an authorization token which establishes that UserName as a valid user of the specific provider's embodiment. The FIG. 11 "profile detail" procedure applies the access and activity limitations established for each UserName, identifying what sections and fields for a specific profile a UserName may access. The consumer inputs their information. Thus, profiles are populated with information primarily from the owners of data, e.g., resource consumers, and only afterwards secondarily from outside parties, e.g., resource providers. Data contributed directly by the originating source is known as "primary data" and is relied upon to attest to consumer performance. The ability to work with primary data is valuable to resource providers. "Ownership" of the newly submitted profile is initially conveyed to the provider and its internal users.

A provider or other authorized party that deploys an embodiment may wish to create profiles for consumers, possibly as an incentive to attract business. An authorized provider selecting the "actions" item on the menu bar highlighted in FIG. 2 and then selecting "create profile" invokes the FIG. 18 procedure. A provider may create UserName and password credentials for each profile they create, and distribute these credentials to a consumer for a particular profile so that the consumer can login and update the profile as appropriate later. A provider does not have to establish credentials for the consumer. Next, a blank profile is opened and added to that provider's list of available profiles. The FIG. 11 "profile detail" procedure enforces the access and activity rights that have been established for each UserName and UserName type (i.e. consumer, provider, and guest) for that particular profile. The provider then uses the FIG. 19 edit procedure to populate the form, and the FIG. 20 and FIG. 21 procedures to view and add files to the newly created profile.

Profile data collection templates are intended to collect summary information on consumers. As providers and consumers often need more detailed information, an embodiment can enable consumers to append file attachments to their profiles. To initiate the FIG. 20 file manager procedure, consumer or provider clicks on the view/add/manage icon/link on the profile. The FIG. 20 procedure opens the FIG. 22 file manager box and a user may add as many files as they wish. They may also specify individual file access rights right for various Usernames.

When the consumer completes the initial input of their data, their submitted profile is placed into the "pending" category on the provider's site.

To strengthen the security, accuracy, scalability and reliability of the entitlement system, the invention preferably assigns a unique numeric identification number (ID) to each: profile, portfolio record, section, field, deploying provider site (login site or web page), UserName (i.e., consumers, providers, third parties), and UserName group. One embodiment uses these ID numbers to associate trusted relationships between authorized UserNames, specific provider sites, consumer UserNames, provider UserNames, guest UserNames, profiles, portfolio records, file attachment types, file attachment access levels, sections, fields, etc. These ID identifiers enable an embodiment to deliver a granular UserName entitlement system.

Phase III: Working with Submitted Profiles

Providers, guests, and authorized third party UserNames may login from their respective locations to access available profiles. Their access and activity entitlements are managed by the neutral third party administrator based initially on their UserName group entitlements. Resource providers, guests, and partners can use an embodiment to track, monitor, and report the information provided by the consumers.

When a consumer uses the FIG. 16 registration page to register and submit his or her information to a provider's deployment, their profile is initially associated solely with that provider. The provider and its associated internal User-Names are granted ownership rights for that particular profile, and can directly control access to that and all other consumer profiles registered on their deployment. At a later time, the provider with current ownership rights and/or the consumer may grant ownership privileges to additional third party User-Names, e.g., other resource providers.

States

"State" categories are used to organize profiles. A profile may be in one of the following three "states" at any given time: "pending," "watch list," or "active." The pending state is typically used for newly registered profiles or for profiles that have been modified by either the consumer or provider. The watch list state is typically used for consumer profiles for which the provider does not have an ongoing and active relationship. Providers typically use the active state for consumer profiles that represent their existing and/or ongoing relationships. Only a provider UserName with the appropriate activity entitlement is allowed to change the profile's state from pending to either active or watch list. The provider's internal UserNames can see profiles that they own regardless of what state the profile may be in. Other UserNames that have been granted access to a provider's profile(s) can only see profiles that are designated as active. If necessary, exceptions can be granted. Consumers are not allowed to see, and are unaware of, the state of their particular profile. Providers value this feature because they want and need to screen and release profile data to the active state before any third parties see the data.

Disclosure Levels

As depicted in FIG. 23, a consumer or provider granting an access entitlement to a third party UserName can independently and directly control the level of information that is shared with newly entitled third party UserName by selecting one of the following three disclosure levels associated with each profile: "general information and high level financials," "general information no financials," and "none." The disclosure setting is circled on the right side in FIG. 23. Each profile may have preferably only one of the three possible disclosure levels at any given time. A provider can designate a different sharing level for each of the profiles which it owns. If the disclosure level for a profile is set at general information, high level financials, then all information on the profile and all file attachments can be accesses by any of the UserNames that have been granted access to it. If the disclosure level for a profile is set at general information no financials, all third party UserNames with access to the profile will be precluded from accessing any financial information (income statement, balance sheet, cash flow statement, capitalization table) in the profile. They will also be unable to access any file attachment with a designated file access right of "financial." Additional sections and file types can be included in the "financial" exclusion list if desired by either the consumers or provider. If the disclosure level for a profile is none, then the consumer who registered the profile and the provider with ownership rights are the only UserNames who can see the profile. As a profile owner, the provider's internal UserNames can see all of the profile's data, e.g., financial information, regardless of the disclosure level set for that profile. Other UserNames granted access to a provider's profile(s) can only see the level of information allowed, if any, stipulated by the disclosure level on a profile. Embodiments can grant exceptions to these rules. The disclosure level of profiles preferably can be changed at any time and the new disclosure settings reflected in real time. The ability to individually adjust disclosure levels is an important profile level activity entitlement.

Portfolios

The defined, semi-homogenous data template facilitates comparisons of profiles. Having a means of comparing similar opportunities against a standard can help resource providers make consistent decisions. Further, as depicted in FIG. 10 box 10a, resource providers can develop and deploy customizable portfolio records (management data templates) to facilitate tracking and oversight of specific collections or categories of profiles. The FIG. 24 and FIG. 25 procedures generate the FIGS. 4, 5, 6a, 6b, 7a and 7b screenshots. FIG. 4 shows a partially blank example of a semi-homogenous portfolio record template which providers can begin with for each portfolio category name that they create to track a particular collection of profiles. The portfolio record template includes compartmentalized sections. As shown in FIG. 4 default sections include: profile owner contact information, general information, description, provider investment monitoring activities, management teams, and links to the profiles which have been associated with the portfolio. As depicted in FIG. 5, portfolio record sections can contain one or more fields. A provider can tailor portfolio records to his requirements by adding or removing entire portfolio record sections and/or removing fields within portfolio record sections.

FIG. 6a shows representative portfolio category names which providers can create to track and monitor specific collections of profiles. FIG. 6b shows the names of portfolio records associated with a given portfolio category name. A portfolio category name may contain one or more portfolio records. As highlighted in FIG. 7a and FIG. 7b, the invention in one embodiment can associate consumer profiles to a specific portfolio record. As illustrated in FIGS. 6a, 6b, 7a and 7b, a provider can drill down from a generic category name (e.g., Investment Banks) to a specific portfolio record in that category (e.g., Acme Investment Banking) and then ultimately to a profile directly associated with Acme (e.g., ABC Taiwan Electronics Corp.). The underlying profiles on the portfolio record (in this case ABC Taiwan) preferably automatically reflect any updates made by authorized users (e.g., Acme or ABC Taiwan or other authorized UserNames) in real time. This functionality enables a provider to document and track via an auditable record his oversight of his various consumer relationships.

A neutral third party administrator preferably will take the specifications (category names, portfolio record category templates, association of consumer profiles to portfolio records) and implement them. Each portfolio record also preferably includes a file folder which can be used to hold related oversight and monitoring files for identified collections of profiles, e.g., performance reviews, monitoring records, etc. One embodiment also allows providers to attach and associate comments directly to portfolio records. One embodiment further allows providers to track in a change history log (FIG. 26) all the changes made to a portfolio record.

As illustrated in FIG. 13, a portfolio record, like a profile, preferably consolidates into a auditable record 1) the semi-homogenous data template, 2) file attachments which can be added and viewed e.g. performance results, 3) a portfolio record's specific and individual change history detailing any changes made to any section and/or fields, and 4) portfolio record-specific comments which may be added and viewed as needed. The consolidated elements of a portfolio record give providers the information they need in order to further exercise and demonstrate fiduciary oversight of their consumers, investments, etc.

Permissions/Entitlements

Providers deploying an embodiment will typically define UserName entitlements for their internal users, consumers receiving resources from them, guests, and third party partners. Providers usually grant varying permission entitlements to various UserNames. Consumers may request sole responsibility over a particular entitlement, e.g., the ability to change the disclosure level on their profile. The preferred neutral third party administrator will implement only entitlements that have been properly approved and validated by all affected parties.

As illustrated in FIG. 27, one embodiment uses cascading access and activity entitlements to permit differentiated, broad or narrow, tunable entitlements to individual UserNames. A specific group of UserNames or an individual UserName's aggregation of entitlements can include any combination of the access and activity permissions outlined in FIG. 27. Access entitlements allow a given UserName to gain entry to a specific provider's site or deployment. For control and security purposes, each UserName preferably may only log in at a single provider deployment location. As indicated in the FIG. 28 Application Site Map box 27a, the "access" entitlements also allow an authorized UserName to gain entry to specific access related pages, e.g., profile summary (FIG. 29), portfolio summary (FIG. 24), portfolio detail (FIG. 25), and profile detail (FIG. 11). From these pages, an authorized UserName can see the names of profiles and portfolio records. Users can be granted access to one or all of these pages. One embodiment also preferably utilizes a system of "access" inclusion or exclusion entitlements to ensure that UserName access can be tuned to the finest level of granularity. For example, a UserName may be granted access to all enterprise software profiles but be explicitly excluded from seeing a specific enterprise software profile, e.g., Oracle, because of a conflict of interest. Conversely, another UserName may be generally excluded from all enterprise software profiles but be included to see a single software profile, e.g., Microsoft.

As further illustrated in FIG. 27, there are preferably two levels or cascades of "activity" entitlements. The first level are "site" level activities that control a UserName's ability to get to specific pages of the database and to perform specific activities. As indicated in the FIG. 28 Application Site Map box 27b, site level activity entitlements control a UserName's ability to navigate to preferably the following pages: create profile/portfolio records (FIG. 18), site audit history (FIG. 30), reports (FIG. 31), support (FIG. 32), and password reset (FIG. 33). As indicated in FIG. 28 box 27c, site level activity entitlements give the UserName the ability, if authorized, to: access profile names, access portfolio category names, access portfolio record names, create a profile, create a new portfolio record, view site audit history, view and run reports, conduct searches, access the file tools (e.g., export profiles via XML, send profiles via e-mail, and convert profiles to Word®, Excel®, or PDF formats). An embodiment can accommodate an unlimited number of additional "site" level activity entitlements. Specific site level activity entitlements can be converted into profile level activity entitlements.

Referring again to FIG. 27, the second level of activity entitlements are "profile" level activities that control a UserName's ability to navigate to preferably the following pages indicated in FIG. 28 box 27d: edit sections (FIG. 19), file manager (FIG. 20), add file (FIG. 21), view comments (FIG. 34), add comments (FIG. 35), change history (FIG. 36), profile metrics (FIG. 37), profile metrics detail (FIG. 38), file metrics (FIG. 39), file metrics detail (FIG. 40), and permitted profile users (FIG. 41). As indicated in FIG. 28 box 27e, profile level activity entitlements give the UserName the ability, if authorized, to: access detailed profiles, access portfolio records, edit profiles, edit portfolio records, change a profile's disclosure level, change a profile's state, delete a profile, delete a portfolio record, view the profile's associated change history detail, view authorized file attachment by file access type and permitted access right, add a file attachment, delete a file attachment, view file metrics, view file metrics detail, view profile metrics, view profile metrics detail, view comments, add a comment, and view the permitted UserNames for a profile.

FIG. 42 illustrates a single, representative UserName's access and activity entitlements that have been "tuned" to enable differentiated access and activity entitlements for three different sets of profiles located on three different deployments by three different providers. The specific deployments include: a deployment at his site/enrolling location, a deployment by Partner #1, and a deployment by Partner #N. It is assumed that Partner #1 and Partner #N have elected to share profiles with john@doe.com subject to the restrictions outlined in FIG. 42. This capability is important because it allows a single UserName to have differentiated edit rights for consumer profiles which have been entered via the UserName's deployment site while precluding that same UserName from editing consumer profiles which a business partner may have allowed them to access and view.

User Groups

The default access entitlements for a consumer group UserName only allow it to access the profile that corresponds directly to the UserName's company's submitted profile. Consumers may be allowed to see confidential sections from any provider that is requesting specific information from them. The provider preferably must instruct the neutral third party administrator as to what confidential sections they would like a consumer to have access to view and/or edit. The administrator will implement the entitlements which will allow consumers to see the selected and confidential provider sections. The default consumer group UserName "site level activity" entitlements include: access to the goto navigation tools and file tools (e.g., export profiles via XML, send profiles via e-mail, and convert profiles to Word, Excel, or PDF formats). The "profile level activity" entitlements for a consumer UserName include: the ability to change their profile's disclosure level, edit their profile, view their file attachments, add a file attachment, and delete a file attachment. The consumer can only edit the contents of their profile and add, remove, or delete files associated with their profiles. The provider deploying the invention in one embodiment has the right to modify the default entitlements for consumers who will be registering on their deployment.

The default entitlements for a provider group UserName are typically more robust and include more site and profile activity entitlements than a consumer group UserName. The default access entitlements for a provider UserName give it the capability to see any consumer profiles which have been registered on that provider's site. They may also see any portfolio category names and their associated portfolio records. A provider is only entitled to access their confidential sections on profiles to which they have access. No provider may see the confidential sections of another provider that may be contained on profiles to which the provider has access. A default provider UserName may not see any profiles from any other provider unless they have been granted explicit and documented access authorization. Access to other provider's profiles is an entitlement that is preferably implemented by the neutral third party administrator for the invention in one embodiment. The invention in one embodiment currently prohibits the sharing of portfolio records between firms.

The default provider group UserName "site level activity" entitlements include: access to profile names, access to portfolio record names, access to portfolio category names, create a profile, create a portfolio record, view site audit history, view and run reports, conduct searches, file tools (e.g., export profiles via XML, send profiles via e-mail, and convert profiles to Word, Excel, or PDF formats).

The default provider group UserName "profile level activity" entitlements include: access detailed profiles, access portfolio records, edit profiles, edit portfolio records, change a profile's disclosure level, change a profile's state, delete a profile, delete a portfolio record, view the profile's associated change history detail, view change history information for portfolio records, view authorized file attachment by file access type and permitted access right, add a file attachment, delete a file attachment, view file metrics, view file metrics detail, view profile metrics, view profile metrics detail, view comments, add a comment, and view the permitted UserNames for a profile. The provider deploying the invention in one embodiment has the right to modify the default entitlements for each of their internal users who will be using the invention.

The default access entitlements for a guest group UserName only allow it to access a defined summary or "profile group" that a provider specifies. A guest UserName is specific to a provider's login site. A guest UserName can only access profiles defined by the providers in the profile group. They cannot see or access any confidential sections which have been appended to various profiles by either consumers or providers. The default site level activity entitlements include access to the goto navigation tools, file tools (e.g., export profiles via XML, send profiles via e-mail, and convert profiles to Word, Excel, or PDF formats). The profile level activity entitlements for a guest UserName include only access to view authorized file attachments by file access type and permitted access right. The guest group UserNames do not have any edit or destructive rights, e.g., delete file capabilities. The provider deploying the invention in one embodiment has the right to modify the default entitlements for guest group UserNames.

Consumers and providers often need to share their information with multiple providers that have granted, or are considering granting, resources to them, so one embodiment allows consumers and providers to share profiles with third party UserNames, e.g., other providers, business partners, vendors, banks, accounting firms, law firms, etc. Providers may grant sharing or access entitlement to other third party UserNames for profiles that have registered on their deployment. It is anticipated that consumers and providers will negotiate control of the sharing entitlements. Preferably only profiles may be shared. Because portfolio records contain sensitive internal information, the ability to share portfolio records is preferably disabled. The neutral third party administrator will only implement sharing entitlements that have been properly authorized and requested by the respective parties.

Figure 29:
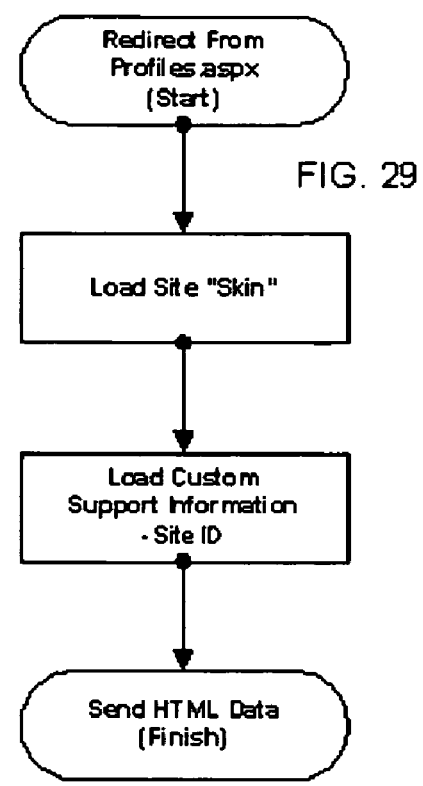
FIG. 29 is a flowchart of a preferred site level summary profile access and activity entitlements/permissions procedure.
Figure 29:
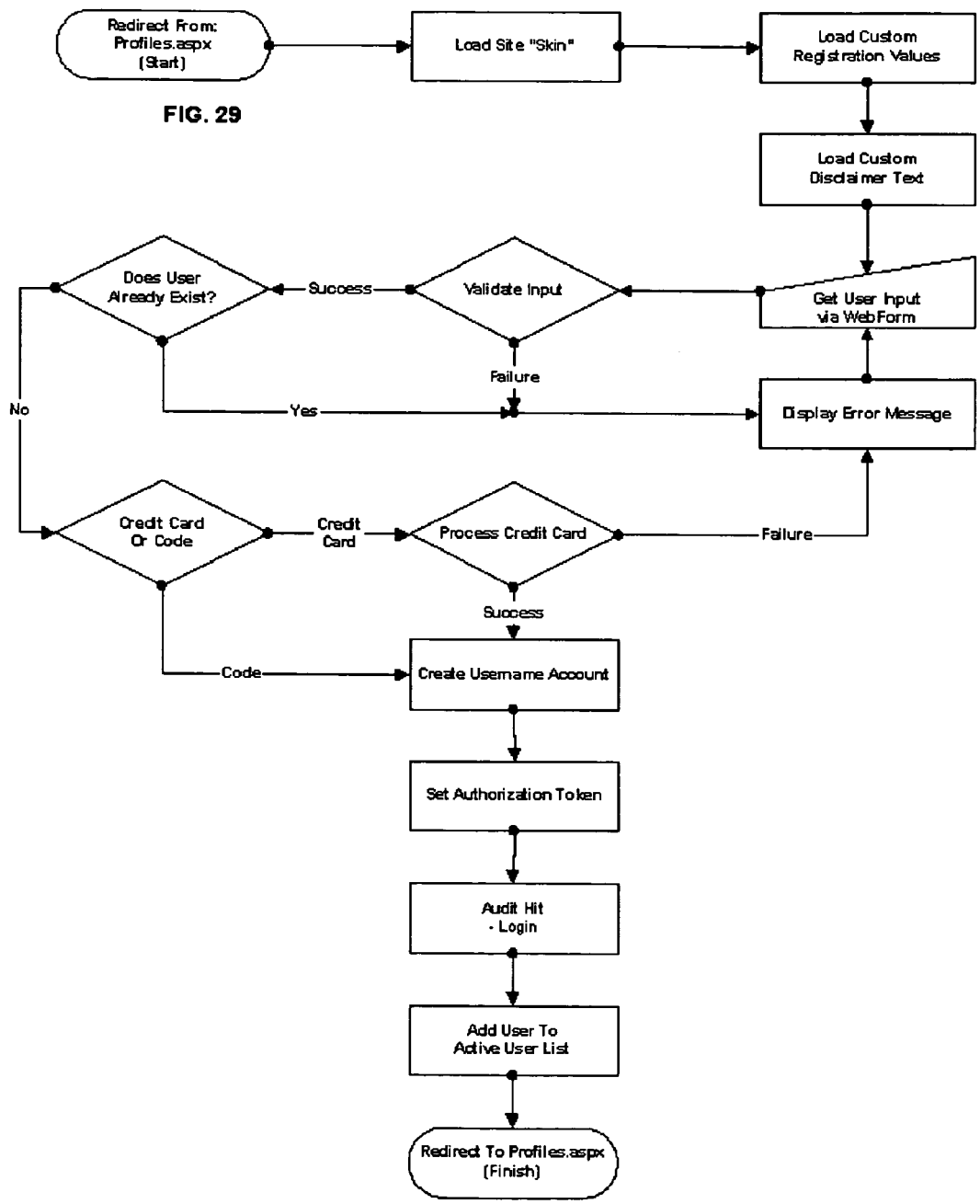

Providers occasionally need to share their information and profiles with selected individuals, conference attendees, etc. The invention in one embodiment allows providers to create specific "profile groups or collections" to which they may then grant access by the "guest" UserName type. Providers may also designate the specific activity entitlements that the guest UserName type may have as well. Guest UserName types typically will have "view" only rights for selected profiles and associated file attachments. The neutral third party administrator will set up the access and activity entitlements for guest UserName types on the invention in one embodiment. The administrator will preferably also provide a special link to enable the self-registration of guests on the platform. A guest who wishes to access a set of designated profiles on a specific provider's deployment of the invention in one embodiment clicks on "guest registration" in FIG. 15 which brings up a guest registration page, as shown in the FIG. 43 screenshot, that is generated by the FIG. 44 "guest UserName registration" procedure. The FIG. 43 registration page prompts the guest to provide a UserName and password and pay by credit card for accessing the profiles authorized and designated by the provider. The provider may or may not require a fee from the guest. At the bottom of that page, the guest clicks "yes" to accept the terms and conditions and then clicks "submit" to complete the UserName and payment portion of the registration process. The procedure outlined in FIG. 29 is then initiated which identifies the profile or profile group which the UserName may access.

In general, to share a profile, a consumer or provider who has ownership rights to a profile preferably must first advise the neutral third party administrator that they wish to share the profile with a third party UserName. The profile owner preferably must specify what access and activities entitlements they wish to grant to each UserName with which they wish to share. For example, Provider X who has ownership rights for Profile Z may wish to share it with UserName Y (from Provider Y). Provider X advises the third party administrator that UserName Y should not have access to any confidential section appended by Provider X on Profile Z. Provider X further stipulates that UserName Y should only have the site level activity entitlement to the goto navigation. Finally Provider X advises that UserName Y should only have the profile activity of view authorized file attachment by file access type and permitted access right and no destructive capabilities, e.g., delete a file, profile, etc. The administrator then implements the UserName Y entitlements stipulated by Provider X for profile Z. Sharing requests preferably must be made in writing by individuals authorized by their respective organizations.

Previously Registered UserNames Logging in

Authorized UserNames (e.g., consumer, provider, and guest) may access one embodiment using the provider's login page as depicted in FIG. 15, which prompts the individual to enter their UserName and password. Three failed attempts to login will cause the system to disable the UserName. The UserName will then need to be reset by the neutral third party administrator.

Assuming the user has a valid and authorized UserName and password, the logging-in user preferably must accept any and all disclaimers by checking "yes" and then clicking the login button in FIG. 15, which initiates the FIG. 45 login procedure. This procedure validates that the UserName is authorized for that provider's site and that any required disclaimers have been accepted. It also displays any warning or alert messages. Only valid UserNames that have accepted any and all disclaimers will be granted an authorization token, without which a UserName will not be admitted onto the provider's deployment. Upon successful completion of the FIG. 45 login procedure an entry is made in the site's audit history recording the UserName and date and time of login. Additional information is also collected and tracked, e.g., which profiles a UserName accesses. The audit history log also records the acceptance of any and all disclaimers. FIG. 46 is a screenshot of some of the site audit history entries generated during the FIG. 45 login procedure.

Preferably, system alerts and other parameter driven User-Name alerts can be set up. The system alerts can also be used for compliance tracking purposes, e.g., to track the acceptance of disclaimers, etc. Preferably, an unlimited number of system alerts can be accommodated. The number of alerts can be tailored to meet the specific requirements of each deploying provider. An embodiment can be configured to deliver notifications to specific UserNames based upon pre-determined parameters. To utilize these capabilities, a provider should deliver to the neutral third party administrator a list specifying which UserNames should be notified along with their e-mail address and the parameter that should be used to trigger an alert message, e.g., a change to a profile.

Providers have a strong desire and need to control which profiles and related information may be accessed and what activities are performed on that accessed data. Confidentiality agreements, regulatory requirements, and other compliance mandates require providers to exercise tight controls over their data. To accommodate these requirements, the invention in one embodiment tests each UserName's entitlements to determine: 1) what profiles may be accessed (FIG. 29); 2) what portfolio records may be accessed (FIG. 24); 3) what site-level activity pages may be accessed that enable the user to perform various site-level activities (FIG. 28 boxes 27b and 27c); and 4) what profile-level activity pages may be accessed that enable the user to perform various profile-level activities (FIG. 28 boxes 27d and 27e).

Once a user has successfully logged onto the platform using the FIG. 15 login page and received its authorization token, then if the UserName is either a "provider" or "guest" type, they will be directed to the summary list of "active" profiles page as depicted in FIG. 47 (a provider type screen shot) or, if the UserName is a "consumer" type, they will be directed to their specific profile as depicted in FIG. 48. Both the consumer and guest UserName classifications types are set when they self register their UserNames on the platform. When the provider UserNames and any authorized partners are established on the platform by the neutral third party administrator, they are initially designated as provider type UserNames.

Typically providers and guests will choose one of the available profiles from the summary "active" profile page and thereby move from the "active" summary list to the detail associated with a given consumer profile. When a provider or guest clicks on the name of a profile displayed on the summary, the entire profile is loaded and displayed on their screen. The FIG. 29 and FIG. 11 processes validate a UserName's access and activity entitlements. Provider User-Names that have been properly validated may access the list of profiles in either the pending or watch list state for which they are an owner by clicking on the "profiles" menu item on the bar depicted in FIG. 5. Selecting either pending or watch list from the drop down menu will initiate the FIG. 29 procedure which will display authorized profiles for the selected profile state (active, pending, watch list). These procedures are described in greater detail below.

A guest or provider UserName type that successfully logs into the system and is issued an authorization token is directed to the FIG. 29 site summary procedure. The first step in the multi-step procedure ensures that the UserName is properly authorized. The next step is to establish and enable the set of site level activity entitlements and related pages that a UserName may access. The neutral third party administrator implements the UserName entitlements and exclusions/inclusions established by providers that the procedures in FIG. 29 and FIG. 11 execute to deliver the appropriate output or HTML. To test a UserName's site-level activity entitlements (detailed in FIG. 28 boxes 27b and 27c), it proceeds from UserName specific activity entitlements, to UserName type entitlements, and then to site default entitlements. Each level of entitlements is defined by providers and implemented by the neutral third party administrator. This allows the deploying organization to establish flexible and granular entitlements based upon the needs of their diverse users. Once the site-level activity entitlements have been established, the invention in one embodiment determines and loads the set of profile names for both the provider's deployment and any authorized partner profiles for each UserName.

Finally, the system in one embodiment tests whether the UserName is authorized to access any portfolio records and if so loads the appropriate portfolio category names as well as the names of the portfolio records for each category. The procedure outlined in FIG. 29 enables the use of exclusion and inclusion for each UserName. The use of the various access entitlements, site-level activity entitlements, and the exclusion/inclusions enables providers to offer highly differentiated and granular UserName entitlements. For a representative UserName the FIG. 29 procedure produces a FIG. 47 screen shot listing profiles that the UserName may access and, across the bar, the site-level activity functionality to which the UserName has been granted access.

A consumer UserName type will be directed by the FIG. 29 procedure to their profile. The consumer's UserName is logged as audit entry in the site audit history and the profile is temporarily "locked" which prevents it from being edited by another UserName which may also have access to it. In addition, a clock is started which records the period of time that the profile is being updated and/or observed by the consumer's UserName. FIG. 48 shows a screenshot of a detailed profile which is accessed by a consumer type UserName. They may not access any other profiles or portfolio records. As illustrated in FIG. 48, the site-level activity entitlements are preferably limited to access to the goto navigation and file tools functionality (e.g., save their profile as an MS Word file). The profile-level activity entitlements for a consumer type UserName are preferably limited to editing their own profile and using the file attachment manager (e.g., to attach a copy of their detailed financial model, etc.).

A guest or provider UserName clicking on a name of a profile listed on their profile summary list initiates the FIG. 11 procedure, which first validates that the UserName is entitled to access the detailed profile. If so, an audit entry is made in the site audit history and the profile is temporarily "locked" which prevents it from being edited by another UserName. A clock is started which records the period of time that the profile is observed by the UserName. The procedure then tests the activity entitlements defined by either or both the provider and consumer. To test a UserName's profile-level activity entitlements (detailed in FIG. 28 boxes 27c, 27d and 27e), it proceeds from UserName specific activity entitlements, to UserName type entitlements, and then to site default entitlements. The site level activities (FIG. 28, box 27c) are then revalidated. The activities are then loaded. The next step determines which sections of a specific profile a UserName may see. The initial section access rights are defined by UserName type. Exceptions are then used to exclude sections on a UserName basis. For example, a provider UserName may be allowed to access all sections on all profiles for a provider's deployment. However, for a single profile, a given UserName may be excluded from accessing the "confidential items" section. The FIG. 11 procedure then invokes the FIG. 12 procedure to determine which sections to load as well as whether specific fields within the various sections should be loaded. A test then determines, based upon the disclosure level for a profile, whether a UserName may access various sections. The authorized sections are then loaded. As a final test, the procedure checks to see if the UserName is entitled to see "board member" section(s). If the UserName is authorized, the board member section(s) are loaded.

Only UserNames from a particular provider's deployment may access portfolio categories and portfolio records. Guests and consumers are preferably prohibited from accessing the portfolio records. To access the list of portfolio category names and portfolio records names within each category, an authorized UserName clicks on "portfolios" in the menu bar in FIG. 47, which initiates the FIG. 24 procedure. Once again, the system conducts a series of tests using the defined entitlements, etc. To test a UserName's profile-level activity entitlements (detailed in FIG. 28 boxes 27*b* and 27*c*), it proceeds from UserName specific portfolio record activity entitlements, to UserName type entitlements, and then to site default entitlements. The site level activities (FIG. 28, box 27*c*) are then revalidated. The activities are then loaded. Then the procedure determines which portfolio category names and associated names of portfolio records, if any, the UserName is entitled to access. The appropriate portfolio category names as well as the names of the portfolio records for each category are then loaded.

A provider UserName clicking on a name of a portfolio record within a portfolio category initiates the FIG. 25 procedure, which first validates that the UserName is entitled to access the portfolio record. If the UserName is authorized to see the portfolio record, an audit entry is made in the site audit history and the portfolio record is "locked." A clock is started which records the period of time that the portfolio record is observed by the UserName. The procedure then uses a series of profile-level activity tests using the entitlements defined by the provider. To test a UserName's portfolio-level activity entitlements (detailed in box 27*e* in FIG. 28), it proceeds from UserName specific activity entitlements, to UserName type entitlements, and then to site default entitlements. The site level activities (FIG. 28, box 27*c*) are then revalidated. The activities are then loaded.

The next step determines which sections of a portfolio record a UserName may see. Exceptions are then used to exclude various sections. The FIG. 25 procedure then uses the FIG. 12 procedure to determine which sections and fields to load. The sections for the portfolio record are then loaded and displayed.

The entitlement algorithm is used by various procedures to establish the specific access and activity entitlements for each UserName. As outlined above, the entitlement algorithm determines which profiles and/or portfolio records a specific UserName may access. The entitlement algorithm also establishes the profile-level and site-level activity entitlements for each UserName.

Profile-Level Activities

There are preferably eleven profile-level activity related pages which enable an authorized user to perform various profile-level activities, including: edit, view comments, add comment, file manager, add a file, profile metrics summary, profile metrics detail, file metrics summary, file metrics detail, permitted users, and change history log. An authorized UserName may access these profile-level activities by selecting an item listed on the menu bar circled in FIG. 2 located at the top of each open profile. The significance and functionality of each profile-level activity page is outlined below.

Access to the edit page allows a UserName to input data and update data on profiles and/or portfolio records. A single UserName may be entitled to access the edit page for a single profile, multiple profiles, a single portfolio record, multiple portfolio records, or both profiles and portfolio records. The user interface for the edit page allows for compartmentalized data entry and edits for various sections via individually organized edit boxes. To submit data, the consumer clicks on the "edit" button on the menu bar located at the top of their profile. Before displaying any edit dialog box, the FIG. 19 edit procedure validates what sections and fields a particular UserName is allowed to edit. A list of available sections is then displayed. The consumer may then select which section he wishes to edit. When a user clicks on the name of a section the FIG. 19 edit procedure displays an edit dialog box for that section. The user then enters data and clicks the update button to submit the data. The server processes received data as shown by the FIG. 19 flowchart of the edit procedure. Changes are then updated on the profile preferably in real-time. The UserName may enter data or update additional sections if desired.

FIG. 49 contains screenshots of two representative edit boxes that may be used by the consumer to initially fill out a profile and/or to update their profile. Providers and other authorized UserNames may also use these boxes and others to update information on behalf of their respective consumers. FIG. 49 shows representative edit dialog boxes for two different profile sections, namely the general business descriptor section and the disclosure level setting. The edit boxes can be configured to provide explicit answers among which a person must choose for a particular item, e.g., development stage in FIG. 49. The use of the compartmentalized edit boxes saves time, cost (e.g., bandwidth), and overhead by reducing the amount of information which must be sent back to the server. In addition, application response times are improved because the amount of data which must be processed by the browser is reduced. Furthermore, the amount of data which can be lost due to power interruptions or PC and/or application problems is reduced.

The edit procedures outlined in FIG. 19 allow for both section-by-section and field-by-field edit rights for each profile and portfolio record on the platform. This allows a deploying provider to establish which UserNames may change highly sensitive items, e.g., a profile's disclosure level, confidential sections, and/or board member sections. The section-by-section and/or field-by-field edit rights enable flexibility and control for profiles that are shared between providers, consumers, and guests. For example, it may be the case that Provider A shares Profile C with Provider B but does not allow Provider B to edit Profile C's sections. However, Provider B may wish to append his own confidential section to Profile C. The invention's ability in one embodiment to offer section by section edit entitlements on a profile by profile basis precludes Provider B from editing any section on Profile C except for his own appended sections.

The FIG. 19 edit procedure can initiate the sending of change notifications via e-mail to specified recipients. The third party administrator sets up and manages the UserName based notifications. The parameters are established by the provider and/or consumer. When a particular parameter is met, e.g., change to a specific section on a profile, a numeric value reaches a threshold (e.g., cash balance), the registration of a new profile, etc., a notification is sent via e-mail to the designated recipient's UserName/e-mail address.

Providers and consumers also need to occasionally append comments or reminders to their profiles. These comments could include reminders to follow-up based upon key consumer milestones, e.g., customer wins, or the hiring of key staff. The ability to append comments directly to each consumer profile is valuable to both providers and consumers because it enables comments to be tracked and recorded.

Access to comments can be granted to providers, consumers, or both, on a UserName basis. To view comments for a profile, a UserName clicks on the comments menu item on the bar and selects "view comments," which initiates the FIG. 34 procedure to display a FIG. 50 comment screen that enables the authorized UserName to view comments appended to the profile. The ability to add a comment is also controlled at the UserName level. A UserName may have the ability to view comments but not add a comment. To add a comment, an authorized UserName clicks on the comment menu item and selects add comment. A UserName clicking on "add comment" invokes the FIG. 35 procedure which brings up a dialog box that enables the UserName to add a comment. The User-Name would click the add comment to post the comment to the profile. The comment will be reflected preferably in real-time.

Providers and consumers preferably can append file attachments to specific profiles. This facilitates both providers and consumers supplying one another with greater levels of detailed information than they wish to post on the semi-homogenous profile template. Each profile includes a file folder which can be used to hold related file attachments, e.g., business plans, customer contracts, executive summaries, investor presentations, term sheets, sales pipeline reports, deal related documents, compliance documents, financials, capitalization tables, etc. FIG. 20 shows the procedure used to manage files for a profile or portfolio records. FIG. 21 shows the procedure used to add a file to the file folder for a profile or portfolio record. Authorized UserNames may view, add, or delete files by utilizing the file manager functionality. Authorized users will see the view/add/manage file icon on the profile which is illustrated in the upper right hand corner of FIG. 2. A user clicking on the view/add/manage file icon invokes the FIG. 20 file manager procedure which produces the FIG. 22 file manager dialog box. The FIG. 20 procedure checks to see what file attachments a particular UserName may access. Access to file attachments can be restricted based upon the file type (business plan, financial projections, resumes, term sheet, etc.) and/or permitted access rights (board item, financial, general, internal, etc.). If the access settings for a file are changed, the access rights for that file will preferably be reflected in real time. A user may select and open a file attachment they have been authorized to view. The file access authorization can be stipulated by either or both consumers and providers. The neutral third party administrator implements the UserName file entitlements for the various profiles. Permissions can vary from profile to profile.

Providers and consumers may also control which User-Names may add and delete file attachments. UserNames may be granted the right to add files but not delete and vice versa. The third party administrator implements the instructions of the providers and consumers.

An authorized UserName may delete a file by clicking on the delete link located to the right of the file name which is listed on the file manager box depicted in FIG. 22. To add a file, an authorized UserName would click on the add file link on the file manager box located in the upper right hand corner in FIG. 22. When a UserName clicks on the add file link, the add file procedure in FIG. 21 is initiated and a file add box like one of the boxes in FIG. 51 is displayed. The UserName may add a file by specifying its location or using the browse button to locate and select a desired file attachment. The UserName wishing to add a file preferably must specify both the file's type as depicted in FIG. 51*a* and a permitted access right as depicted in FIG. 51*b*. A file may not be uploaded unless both items have been specified for each and every file. For each specific profile, UserNames may be excluded from seeing specific file types, e.g., term sheets. The permitted access rights for file attachments are tied to both specific UserNames and various profile settings. For example, if a UserName is a non-owner of a profile then that UserName may see file attachments that have a "financial" permitted access right designation if and only if the profile's disclosure level is designated as "general information and financial." Any file attachment with a permitted access right of financial will be removed and added back based upon the setting of the disclosure level for a given profile. Similarly, any file which carries a "board item" permitted access right can only be seen by UserNames with a board member designation.

Providers often need to monitor which UserNames are accessing various profiles and their associated file attachments. One embodiment can allow providers to see exactly which UserNames have accessed specific profiles. To access the record of which UserNames have accessed a particular profile, the UserName would first open the desired profile. The authorized UserName would then click on the audit menu item on the profile and then click on profile metrics. A user clicking on the profile metrics link invokes the FIG. 37 procedure which brings up the profile metrics summary depicted in FIG. 52. This displays the UserNames who have accessed the profile, the date and time of their last view of the profile, and the total time they spent on that particularly profile. To obtain more detail, the UserName could then click on one of the UserNames depicted in the FIG. 52 profile metrics summary. By doing so, the FIG. 38 profile metrics detail procedure is initiated which brings up the profile metrics detail page depicted in FIG. 53 showing the exact number as well as the dates and times that a UserName has accessed a particular profile. It also shows the elapsed time that a UserName spent observing a profile on each occasion. This capability enables a provider to better track which UserNames have accessed their respective profiles. Access to the profile metric summary and profile metric detail can be granted on a UserName basis. Providers will likely restrict the use of this functionality to internal and selected UserNames.

The invention in one embodiment can also allow providers to see exactly which UserNames have accessed specific file attachments for each and every profile. To access a record of which UserNames have accessed various file attachments for a given profile, an authorized UserName would first open the desired profile. The UserName would then click on the audit menu item on the profile and then click on file metrics. A user clicking on the file metrics link invokes the FIG. 39 procedure which brings up the file metrics summary depicted in FIG. 54. This displays the names of all the file attachments for a given profile, the number of times each attachment has been accessed, the name of the person who last accessed the file attachment, and the date and time that the file was last accessed. To obtain more detail, an authorized UserName could then click on one of the names of the file attachments depicted in FIG. 54 which invokes the FIG. 40 procedure which brings up the file metrics detail page depicted in FIG. 55 showing the names of each person who has accessed that particular file attachment along with the date and time that they accessed the file attachment. Access to the file metrics summary and file metrics detail can be granted on a User-Name basis. Providers will likely restrict the use of this functionality to internal and selected users.

The permitted users page is an important profile-level activity page associated functionality that enables an authorized UserName to see what firms and associated UserNames have access to a given profile. Providers wish to strictly control which internal and external UserName have access to a given profile. It is often difficult for a provider to know exactly who may have access to a given profile for which they have ownership of and/or responsibility for. To address this requirement, one embodiment can display the UserNames and the names of the respective firms along with a contact number for each UserName which has been granted access to a given profile, and indicates whether a particular UserName that has access to a given profile is allowed to "edit" that profile. The platform can display additional information if desired. To access the permitted users log for a given profile, an authorized UserName would first open the desired profile. The UserName would then click on the audit menu item on the profile and then click on the permitted users option, invoking the FIG. 41 procedure which brings up the permitted users summary depicted in FIG. 56. This enables a provider to better track which UserNames have accessed a particular profile at any given time. Access to the permitted users functionality can be granted on a UserName basis. Providers will likely restrict the use of this functionality to internal and selected users.

The FIG. 36 procedure tracks in a separate and discrete change history log as shown in FIG. 26 the changes made to a specific profile. Entries are made in the change history log whenever a change is made, e.g., any field is changed within a section on a profile or portfolio record, a file is added to a profile or portfolio record, a profile is e-mailed to someone, etc. When any field for a profile section is edited or changed using the FIG. 19 procedure, an entry is made in the change history log as shown in FIG. 26 for a representative profile. The entry in the change history log details: the UserName making a change, the field or item that is being changed, the value before the change was made, the value after the change was made, and the date and time the change was made. When the UserName has completed entering or updating data for the various sections on their profile, they may then click the logout button on the profile to exit the system and end their session.

Fiduciary Oversight

Monitoring and compliance tracking are increasingly important. Consumers and providers must increasingly demonstrate that they have exercised appropriate fiduciary oversight of data which they submit, update, manage, and control. Consumers and providers should discretely track each individual UserName's access to data along with the activities they perform on the data which they have accessed. The UserName entitlement system enables consumers and providers to track individual UserName accesses and activities. Every piece of information that is accessed by each UserName along with any activities performed are preferably recorded in the change history and site audit (described below) logs for each provider's deployment. The value of the change history log is enhanced because it is administered by the neutral third party and the entries cannot be altered in any way by any UserName. As such, a change made by any UserName cannot be repudiated. External auditors can validate when and how often particular profiles have been updated, by whom, and when. This log of information can also provide independent validation as to how well the activities and progress of a consumer have been monitored by various providers. The ability to demonstrate and offer an independent and non-repudiatable record that can attest to appropriate fiduciary oversight is valuable to providers. The change history record also enables providers to observe and monitor the activities of internal users, partners, and consumers to evaluate their performances.

Providers may select which UserNames may have access to the change history log. Authorized UserNames can access the change history by selecting the audit menu item on the menu bar and then selecting the change history item. Clicking on "change history" in the menu bar initiates the FIG. 36 procedure which validates that the UserName is authorized to see the change history and display the change history items for a particular profile.

The change history algorithm used by the FIG. 36 procedure assures that only UserNames that are authorized to see selected and/or restricted sections (e.g., mutual consumer and provider confidential sections, board items sections, provider specific confidential sections, etc.) may also see the change history entries for those fields. This assures the ability to accurately track changes associated with specific profiles and portfolio records without the need to sacrifice or jeopardize the security and confidentiality of sensitive data. A given provider cannot see any change history items for confidential sections owned by other providers.

Site-Level Activities

Similarly to the eleven profile-level activity pages, there are five site-level activity pages which enable an authorized UserName to perform various site-level activities, including: create profile, site audit history, reports, support, and password reset, of which all, some, or none may be authorized. An authorized UserName may access these site-level activities by selecting an item listed on the menu bar circled in FIG. 2 located at the top of each open profile.

For control and audit purposes, providers preferably must be able to attest as to exactly who has accessed their application and the date and time. As is the case with the change history associated with profiles, site monitoring and tracking are emerging as important compliance items. The value of the site audit log is enhanced because it is also administered by the neutral third party and the entries made in the log cannot be altered in any way by any UserName. As such, the site audit entries made by any UserName that accesses a provider's application or site cannot be repudiated. External auditors can validate when and how often particular UserNames have accessed a provider's deployment. The ability to demonstrate and offer an independent and non-repudiatable site audit log that can attest to appropriate fiduciary oversight is valuable to providers. The site audit record enables providers to observe and monitor the activities of internal users, partners, and of course consumers to evaluate their performance.

Providers may select which UserNames may have access to the site audit log. Authorized UserNames can access the site audit log by selecting the audit menu item from the menu bar and then selecting the site audit log item. Clicking on the site audit history log item initiates the FIG. 30 procedure which validates that the UserName is authorized to see the site audit history and display the site audit history log for that provider's site. A UserName cannot see any entries for any other site. UserNames accessing the site audit log are limited strictly to the entries that pertain to the location from which they logged into the platform. The FIG. 30 procedure produces the audit log displayed in FIG. 46. Each entry in the site audit log includes the activity performed (login, view profile, create profile, delete profile), the UserName performing the activity, the IP address of the UserName, and the data and time that the entry was made.

The combination of the change history log and the site audit log provides each resource provider with a comprehensive view of what changes have been made and by whom for the profiles and portfolio records for which they have a fiduciary responsibility. The resource provider can better assess which profiles are being most actively and accurately maintained. In addition, the resource providers are in a better position to track how the specific individuals responsible for various profiles are managing their oversight and compliance monitoring capabilities. As such, resource providers deploying the invention in one embodiment can better demonstrate that they are exercising adequate oversight which can be attested to by an independent third party administrator.

Resource providers need to run reports for various purposes, e.g., weekly meetings, monthly meetings, annual meetings. They also need to search for information that has been submitted by various consumers. The ability to retrieve real time reports that reflect information that contains information that is directly updated by consumers is highly valuable to providers. Providers often have tight turn around times for reporting back to their internal and external partners, investor, regulators, etc. Providers and their authorized UserNames can use reporting tools to run reports and conduct searches for profiles and/or portfolios by name, geography, industry, sector, profitability, etc. To access the report functionality an authorized UserName would select reports from the menu bar. Clicking on the reports item on the menu bar invokes the FIG. 31 procedure which displays the FIG. 57*a* report creation and search tools screen. An authorized UserName can then select and run a report from the list of available reports or they may run a search. FIG. 57*b* shows the output of a representative search. The neutral third party administrator can create custom reports on behalf of the provider. The administrator can also deliver the raw consumer data to providers so that they can generate reports using standard packages, e.g., Crystal Reports. Additional reports can be created if necessary. If needed, the invention in one embodiment can also be configured to produce system performance and utilization reports as outlined in FIG. 10 box 10*c*.

Providers typically expect and need access to support from the third party administrator. To access the support page an authorized UserName would select support from the menu bar. Clicking on the support menu item initiates the FIG. 32 procedure which in turn displays the FIG. 58 support page. The support page includes the contact information for support staff.

If a user forgets his password he can request an automatic reset and delivery of a new password to the e-mail address associated with his UserName. To do so, the user clicks the "lost password" link on the screen shot in FIG. 15 which invokes the FIG. 33 procedure to bring up a password reset screen. The user is prompted to supply the e-mail address or UserName they use to log into the system. The user then clicks on the "reset password" button and their new password will be encrypted and sent via e-mail to them.

Architecture

FIG. 8 is a high level architectural block diagram of the logic of an embodiment of the method, which includes three layers or tiers: a presentation tier, a business tier, and a data tier. The presentation tier provides the graphical user interface that displays templates that either request the user to provide data or displays information that has been requested. The presentation layer could reside on a PC, cell phone, pager, telephone, etc. The business tier contains the business rules of the embodiment and provides the entry point for all presentation tier requests, and preferably utilizes Microsoft's Internet Information Server (IIS) to handle incoming client requests and to host the ASP.Net controls. The business tier logic is written preferably in C#.Net and interoperates with IIS to manage and coordinate the execution of the business rules of the invention. Communication between the presentation tier and the business tier is accomplished preferably over a secure 128-bit SSL connection. The SSL certificate state of authority is preferably provided by Verisign (www.verisign.com). The data tier contains the information that has been supplied by providers, consumers, guests, partners, etc. The database is created and managed preferably using Microsoft's SQL Server 2000. The embodiment can accommodate other databases as well, e.g. Oracle. Communication between the business tier and the data tier is handled preferably by Microsoft's ADO.Net data access objects. Data exchanged throughout each of the logical tiers is formatted preferably using industry standardized XML. Providers will appreciate one embodiment's use preferably of open standards and proven infrastructure elements, e.g., Microsoft 2000, Verisign encryption, etc.

The three logical tiers map or correspond directly to the three similarly named tiers in the physical architecture as shown in the block diagram of FIG. 9. The logical and physical tiers are separated to ensure the scalability and performance of the invention in one embodiment. Scalability is achieved because the underlying logical layer does not need to be adjusted in response to increases in the number of users, system loads, or utilization levels. The physical layer can accommodate load changes because each physical tier may contain any number of computers, servers, load balancers, or other devices needed. The physical tiers provide the computing and control resources which the logical layers use.

Software Deployment Options

An embodiment is preferably customized to meet the often unique requirements of each provider that elects to deploy the invention. The provider preferably has the option of deploying the invention as either an enterprise software license or on an Application Service Provider (ASP) basis. If a provider elects to deploy the invention on an enterprise license basis, the provider assumes responsibility for the management and administration of the physical infrastructure or tiers, the logical tiers, operating system, UserNames, system administration, security, report creation and management, setup and integration, and management of the underlying database of data collected by the invention. Providers who deploy the invention on an enterprise licenses basis preferably must coordinate directly with the neutral third party administrator if they wish to share information via the invention outside of their organization.

Most providers are expected to choose to deploy the invention in an embodiment on an ASP basis. An ASP deployment may require a neutral third party administrator and enforcement authority for the platform. The third party will assume the responsibility for the management and maintenance of the physical tiers, the logical tiers, operating system, security, system administration, setup and integration of the platform, the administration of the UserNames, setup and administration of profile and portfolio record templates, association of profiles to portfolio records, management of the UserName and system alerts, report configuration and administration, and management of the underlying database of information collected by the invention. If desired, providers can be supplied with the system tools needed to allow them to self-administer some portions of the invention in one embodiment. However, the neutral third party administrator will always administer the sharing permissions entitlements among and between UserNames. Providers are likely to choose the ASP model because it can be implemented much more rapidly and without the need for them to buy equipment, software, and hire additional technical resources to mange the deployment. In addition, providers have expressed a desire to jointly deploy an ASP version of the invention with other industry providers and/or partners.

While the present invention is described in terms of a preferred embodiment, it will be appreciated by those skilled in the art that this embodiment may be modified without departing from the essence of the invention. It is therefore intended that the following claims be interpreted as covering any modifications falling within the true spirit and scope of the invention.

We claim:

1. A method for managing resource consumer information desired by one or more resource providers, comprising the steps of:
   defining, by at least one processor, a data collection template of fields for a semi-homogenous profile of resource consumer information desired by a resource provider;
   customizing the template in real time, by the at least one processor, wherein customizing the template is performed by inserting, deleting, or modifying sections or fields of said template;
   sending to a device of at least one resource consumer, a web-page with user fillable fields, wherein said device is at least one of a computer, telephone or personal digital assistant (PDA);
   maintaining an electronic database system by a trusted third party who is neutral to both resource providers and resource consumers;
   storing in the electronic database system, information entered into the user-fillable fields as a semi-homogenous profile, wherein a semi-homogenous profile is stored for each resource consumer;
   storing authorization information that includes identification of at least one party authorized to access information stored in the electronic database system;
   defining, by the at least one processor, portfolio categories;
   storing, by the at least one processor, one or more user selectable web page links, which if selected cause the creation of portfolio records for each defined portfolio category;
   defining, by the at least one processor, for each portfolio category, items that will be contained in the portfolio records;
   associating, by the at least one processor, at least one semi-homogenous profile with at least one of the portfolio records.

2. A method for managing resource consumer information desired by one or more resource providers, comprising the steps of:
   defining, by at least one processor, a data collection template of fields for a profile of resource consumer information desired by a resource provider, the resource provider is a party that provides capital, assets or services, and the resource consumer is a company that wishes to share information with a resource provider;
   sending to a device of a resource consumer, a webpage with user-fillable fields for directly inputting primary data information, wherein said device is at least one of a computer, telephone or PDA;
   maintaining an electronic database system by a trusted third party who is neutral to both resource providers and resource consumers;
   storing in the electronic database system, the information entered into the user-fillable fields as a semi-homogenous profile, wherein a semi-homogenous profile is stored for each resource consumer; and
   storing authorization information that includes identification of at least one party that is authorized to access information stored in the electronic database system;
   defining, by the at least one processor, portfolio categories;
   storing, by the at least one processor, one or more user selectable web page links, which if selected cause the creation of portfolio records for each defined portfolio category;
   defining, by the at least one processor, for each portfolio category, items that will be contained in the portfolio records;
   associating, by the least one processor, at least one semi-homogenous profile with at least one of the portfolio records.

3. A method for managing resource consumer information desired by one or more resource providers, comprising the steps of:
   defining, by at least one processor, a data collection template of fields for a semi-homogenous profile of resource consumer information desired by a resource provider;
   sending to a device of at least one user, a webpage with user-fillable fields, wherein said device is at least one of a computer, telephone or PDA;
   maintaining an electronic database system by a trusted third party who is neutral to both resource providers and resource consumers;
   storing in the electronic database system, information inputted into the user-fillable fields of the template as a semi-homogeneous profile, wherein a semi-homogenous profile is stored for each resource consumer; and
   storing authorization information that includes identification of at least one party authorized to access information stored in the electronic database system;
   defining, by the at least one processor, portfolio categories;
   storing, by the at least one processor, one or more user-selectable web-page links, which if selected cause the creation of portfolio records for each defined portfolio category;
   defining, by the at least one processor, for each portfolio category, items that will be contained in the portfolio records;
   associating, by the least one processor, at least one semi-homogenous profile with at least one of the portfolio records;
   implementing a desired profile data collection template, by a trusted third party and
   independently managing, by a trusted third party, a UserName access and activity permissions specified by the resource provider and a consumer.

4. The method of claim 3 wherein files of any type can be attached to each profile.

5. The method of claim 3 wherein the step of defining the template is done by the resource provider.

6. The method of claim 3 further comprising the step of allowing a user to append comments to the profile.

7. The method of claim 6 further comprising enabling resource providers and resource consumers to see a list of UserNames who have been granted access to a specific profile along with authorized activity entitlements for that profile.

8. The method of claim 3 further comprising calculating aggregate metrics from the information input into the user-fillable field.

9. The method of claim 3 wherein the resource provider can classify profiles as
   Pending for newly registered or edited profiles that can be either accepted and moved to active status or declined and moved to watch list status;
   Watch List for newly registered profiles and/or active profiles that a resource provider believes may need additional time to mature; and
   Active for profiles that have been reviewed and accepted by a resource provider and typically represent active commercial relationships.

10. The method of claim 3 further comprising the steps of
assigning UserNames to the resource consumers and to the resource providers;
establishing access permissions which determine a set of profiles that a specific UserName is permitted to access; and
establishing activity permissions which determine what a specific UserName is permitted to do with an accessed profile.

11. The method of claim 10 wherein a third party partner can be assigned a UserName and receive access and activity permissions.

12. The method of claim 10 wherein the system authorizes certain UserNames to tune access permissions by changing the profile-specific disclosure levels including
None, to remove access to a profile for all UserNames except those of the resource provider designated as a profile "owner" and those of the resource consumer who supplied the information;
General Information without Financials, to prohibit any UserName other than those of the resource provider designated as a profile "owner" and the resource consumer who supplied the information from accessing any financial information in a profile or any financially designated file attachments; and
General Information with Financials, to allow all authorized UserNames to see all information and file attachments in a profile.

13. The method of claim 12 wherein the authorized UserNames can input information into the fields and tune access permissions independently, autonomously, and in real-time, via the Internet and/or private network.

14. The method of claim 10 wherein a provider can define a portfolio group of profiles to include an industry, a subsector, a single company, selected groups of companies, a geographical area, or be based on other criteria contained in the profile.

15. The method of claim 14 wherein the activity permissions include view only, global edit, single section edit, single line item in a single section edit, file download, file delete, file add, access to the comments, access to reports, access to portfolio records, ability to save or send HTML copies of profiles, ability to save XML copies, the ability to import XML data, create new profiles, change the status of a profile, and change sharing levels.

16. The method of claim 10 further comprising the steps of:
recording a Change History log that indicates all accesses, activities and changes and the date and time that they are made, and what UserName made them, to a particular profile; and
recording a Site Audit log that indicates which UserName has accessed a profile, the Internet address of the site from which the UserName accessed the profile, the date and time, and what major activities the UserName has performed; and wherein access permissions include access to the change history log and to the site audit log.

17. The method of claim 16 wherein:
the Change History log identifies and records the former and new values of any information that was changed;
the Site Audit log identifies and records the date and time of logins, new profile creations, profile accesses, profile deletions, and logouts;
a Profile Metrics log identifies and records the date and time that a profile is viewed by any authorized UserName;
a File Metrics log identifies and records the date and time when a file attachment is accessed by an authorized UserName; and
a Permitted Users log identifies which UserName may access any given profile and/or portfolio records.

18. The method of claim 3 further comprising providing a summary list detailing, for a particular profile, the UserNames that have accessed the profile, the number of times the UserName accessed the profile and the date and times the UserName spent accessing the profile.

19. The method of claim 3 further comprising providing a summary list, for a particular UserName, of the files that the UserName has accessed and the date and time of each access.

20. The method of claim 3 further comprising enabling the sending of UserName specific alerts based upon resource consumer or provider criteria including new profile registrations, profile changes, profile deletions, specifically defined metrics including cash burn, cash remaining, or quick ratios.

21. The method of claim 3 further comprising indexing or sorting the information.

22. The method of claim 3 further comprising tracking the information.

23. The method of claim 3 further comprising reporting the information.

24. The method of claim 3, the resource provider being a party that provides capital, assets or services, and the resource consumer being a company that wishes to share information with a resource provider.

25. The method of claim 3 further comprising enabling the sending of UserName specific alerts based upon resource consumer or provider criteria including specifically defined metrics including cash burn.

26. The method of claim 3 further comprising enabling the sending of UserName specific alerts based upon resource consumer or provider criteria including specifically defined metrics including quick ratios.

27. A method for managing resource consumer information desired by one or more resource providers, comprising the steps of:
defining, by at least one processor, a data collection template of fields for a semi-homogenous profile of resource consumer information desired by a resource provider, the resource provider is a party that provides capital, assets or services, and the resource consumer is a company that wishes to share information with a resource provider;
sending to a device of at least one user, a webpage with user-fillable fields, wherein said device is at least one of a computer, telephone or PDA;
storing in the electronic database system, the information entered into the user-fillable fields of the template, wherein a semi-homogenous profile is stored for each resource consumer; and
storing authorization information that includes identification of at least one party authorized to access information stored in the system; enabling the definition and deployment of real-time, customizable, management audit, tracking and compliance data collection template portfolios by the steps of:
defining, by the at least one processor, portfolio categories;
for each defined portfolio category, creating, by the at least one processor portfolio records and the associating of profiles to the records;
storing, by the at least one processor, one or more user-selectable web-page links, which if selected cause the creation of portfolio records for each defined portfolio category;

defining, by the at least one processor, for each portfolio category, items that will be contained in a portfolio record;

sending to a party, by the at least one processor, a web-page having input information fields, and storing the information in records in the electronic database system;

associating, by the least one processor, at least one semi-homogenous profile with at least one of the portfolio records;

associating and appending, by the at least one processor, Watch List, Pending, or Active profiles to appropriate portfolio records; and storing access information identifying the party as having access to information stored in the electronic database system.

28. The method of claim 27 wherein authorized User-Names can create new portfolio records within portfolio categories.

29. The method of claim 27 wherein files of any type can be attached to each portfolio record.

30. The method of claim 27 wherein comments can be appended to each portfolio record.

31. The method of claim 27 further comprising the steps of indexing, sorting, tracking, calculating aggregate metrics, and reporting.

32. The method of claim 27 further comprising providing a summary list of the UserNames that have accessed a portfolio record, detailing the number of times a UserName has accessed a portfolio record and the date and time and elapsed time spent accessing a particular portfolio record.

33. The method of claim 27 further comprising providing a summary list of the profiles associated with a portfolio record that have been accessed by a particular UserName and each date and time that a particular profile was accessed.

34. The method of claim 27 further comprising enabling the sending of UserName specific alerts based upon resource provider's or regulator's defined criteria including the addition of new portfolio records, changes to existing portfolio records, new profile registrations, profile changes, profile deletions, or specifically defined metrics including less than timely updates of profiles, cash burn, cash remaining, or quick ratios.

35. The method of claim 27 further comprising enabling resource providers and other authorized third parties to see a list of UserNames who have been granted access to a portfolio records and their authorized activity permissions for each portfolio record.

36. The method of claim 27 further comprising the steps of:

recording a Change History log that indicates all accesses, activities and changes and the date and time that they are made to a particular portfolio record by any UserName; and recording a Site Audit log that indicates which UserName has accessed a portfolio record, the Internet address of the site from which the UserName accessed the portfolio record, the date and time, and what activities they have performed during the access.

37. The method of claim 36 wherein:

the Change History log identifies and records the former and new values of any information that was changed on a portfolio record; and the Site Audit log identifies and records the date and time of new portfolio record creations, portfolio record deletions, logins, portfolio records accessed, and logoffs.

38. The method of claim 27 further comprising enabling a deploying firm to manage their fiduciary responsibilities across their resource provider relationships by:

allowing the deploying firm to construct portfolio categories and to append portfolio records for each unique relationship along with that relationship's related profiles; and providing a mechanism enabling the association of consumer profiles to specific portfolio records.

39. The method of claim 27 further comprising enabling profile data to be updated and appended to portfolio records in real-time.

40. The method of claim 27 further comprising the steps of establishing access permissions which determine the specific portfolio categories, portfolio records, or specific section of items within sections on a portfolio record that a specific UserName is permitted to access; and establishing activity permissions which determine what a specific UserName is permitted to do with an accessed portfolio category or portfolio record.

41. The method of claim 27 wherein the electronic database system is maintained by a trusted third party, who is neutral to resource providers and to resource consumers, who implements the desired portfolio categories and portfolio records/data collection template and independently manages the UserName access and activity permissions specified by various resource providers, resource consumers, and any other deploying organization.

* * * * *